(12) United States Patent
Murakami

(10) Patent No.: US 7,564,765 B2
(45) Date of Patent: Jul. 21, 2009

(54) OPTICAL PICKUP DEVICE AND OPTICAL DISK APPARATUS

(75) Inventor: Kimihiro Murakami, Kumamoto (JP)

(73) Assignee: Panasonic Corporation, Osaka (JP)

( * ) Notice: Subject to any disclaimer, the term of this patent is extended or adjusted under 35 U.S.C. 154(b) by 505 days.

(21) Appl. No.: 11/512,202

(22) Filed: Aug. 30, 2006

(65) Prior Publication Data
US 2007/0053273 A1 Mar. 8, 2007

(30) Foreign Application Priority Data
Sep. 2, 2005 (JP) ............................ 2005-254792
Apr. 11, 2006 (JP) ............................ 2006-108463

(51) Int. Cl.
*G11B 7/00* (2006.01)
(52) U.S. Cl. .............................. 369/112.1; 369/112.15; 369/44.23; 369/44.28
(58) Field of Classification Search ................. None
See application file for complete search history.

(56) References Cited

U.S. PATENT DOCUMENTS

| 6,798,723 | B2 | 9/2004 | Hayashi et al. | |
|---|---|---|---|---|
| 7,016,269 | B2 | 3/2006 | Ogasawara et al. | |
| 2004/0062158 | A1* | 4/2004 | Arai et al. | 369/44.32 |
| 2006/0023608 | A1* | 2/2006 | Nishimoto et al. | 369/112.01 |
| 2007/0188835 | A1* | 8/2007 | Ohyama | 359/1 |

FOREIGN PATENT DOCUMENTS

| JP | 2002190132 | 7/2002 |
|---|---|---|
| JP | 200367949 | 3/2003 |
| JP | 200563621 | 3/2005 |

* cited by examiner

*Primary Examiner*—Muhammad N. Edun
(74) *Attorney, Agent, or Firm*—Dickinson Wright, PLLC

(57) ABSTRACT

An optical pickup device includes: a light source; a light receiving sensor, having main tracking light detection faces and sub-tracking light detection faces; and a hologram, having tracking areas that are divided into main tracking areas and sub-tracking areas along division lines in the tangential direction. In the hologram, each of the tracking areas is alternately divided into the main tracking areas and the sub-tracking areas along the division lines in the radial direction, and the same width is employed in the radial direction for the main tracking areas and the sub-tracking areas.

20 Claims, 39 Drawing Sheets

DIRECTION PARALLEL TO RADIUS OF DVD (RADIAL DIRECTION)

DIRECTION PARALLEL TO TANGENTIAL LINE OF CIRCUMFERENCE OF DVD (TANGENTIAL DIRECTION)

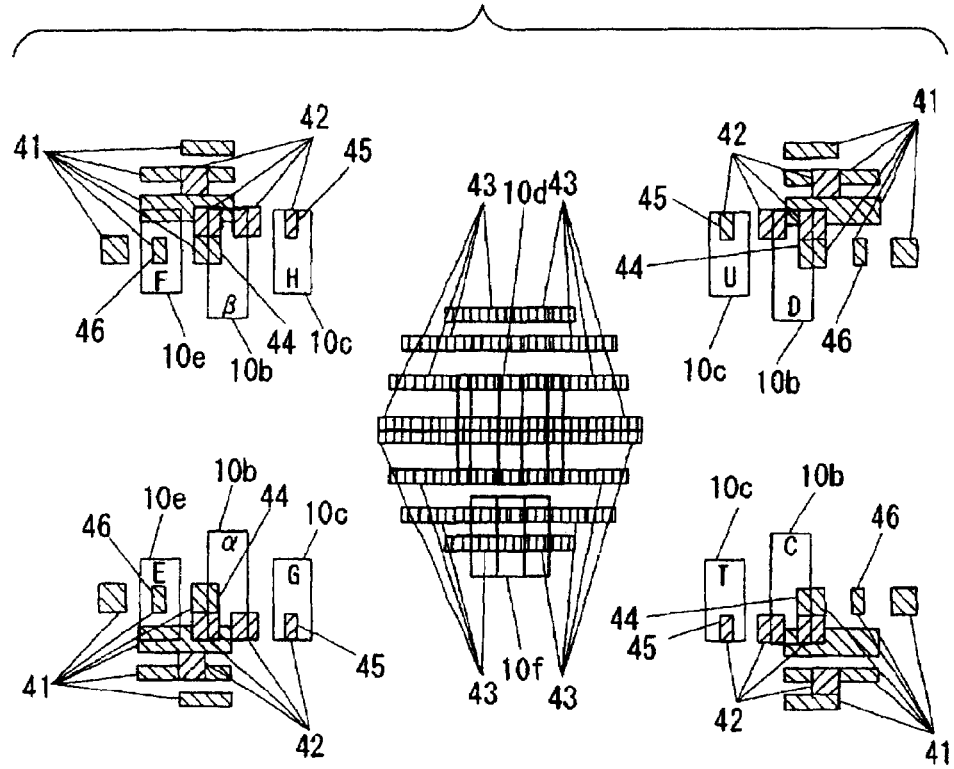
FIG. 19
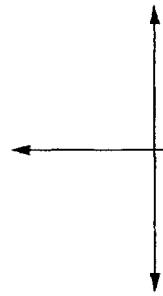
DIRECTION PARALLEL TO RADIUS OF DVD (RADIAL DIRECTION)
DIRECTION PARALLEL TO TANGENTIAL LINE OF CIRCUMFERENCE OF DVD (TANGENTIAL DIRECTION)

DIRECTION PARALLEL TO RADIUS
OF DVD (RADIAL DIRECTION)

DIRECTION PARALLEL
TO TANGENTIAL LINE OF
CIRCUMFERENCE OF DVD
(TANGENTIAL DIRECTION)

OPTICAL PICKUP DEVICE AND OPTICAL DISK APPARATUS

BACKGROUND OF THE INVENTION

1. Field of the Invention

The present invention relates to an optical pickup device and an optical disk apparatus mounted on electronic equipment, such as on a personal computer.

2. Description of the Related Art

Conventionally, DVDs (Digital Versatile Discs) have only a single layer data recording face on one side. Recently, however, to cope with recent increases in memory capacities and to enable data recording and reproduction, DVDs having two layer data recording faces on one side have become available on the market. FIG. 37 is a diagram showing the configuration of an optical system for a conventional optical pickup device. A light source 501 is a DVD laser light source, and included for it is a light emission point for a DVD to which a laser beam having a wavelength λ (of about 650 nm) is emitted. A prism 502 has an internal slope for which a polarizing separation film is provided. A collimating lens 503 alters the laser beam emitted by the light source 501 to provide an almost parallel beam. A beam splitter 504 reflects most of the laser beam emitted by the light source 501, and permits only a part of the laser beam to pass. The beam splitter 504 also reflects almost all the light reflected by an optical disk 500. A path elevating prism 505 is a prism that changes the laser beam path from a route substantially parallel to the optical disk 500 to one that is almost upright. A hologram element 506 is a combination of a hologram 506a and a quarter-wave plate 506b. In accordance with the polarized state of a laser beam, the hologram 506a passes the laser beam emitted by the light source 501, and separates the laser beam reflected by the optical disk 500 into light fluxes required for focus control and for tracking control. The quarter-wave plate 506b changes the polarized light of the laser beam emitted by the light source 501 from P polarized light to circularly polarized light, and changes the polarized light of the laser beam reflected by the optical disk 500 from circularly polarized light to S polarized light. The hologram element 506 is arranged in a lens holder, together with an object lens 507, and is movable in both the focal and the tracking directions. The object lens 507 changes the parallel light of the laser beam, which is a result provided by the collimating lens 503, to converged light, so that the light can be condensed at the optical disk 500. A light-receiving sensor 508 receives a portion of the laser beam reflected by the optical disk 500, alters the beam to produce various electric signals, and then outputs these signals. A fore light monitor 509 receives part of the laser light emitted by the light source 501 and passed through the beam splitter 504, and changes the laser beam into an electric signal in accordance with the quantity of light. This electric signal is employed as light quantity control for the light source 501.

An example division pattern for the hologram 506a is described in JP-A-2005-63621. FIG. 38A is a diagram showing example division areas within a division pattern for a conventional hologram. FIG. 38B is a diagram showing an example wherein many more division areas are formed. And FIG. 38C is a diagram showing an example wherein only peripheral portions are defined as division areas. According to JP-A-2005-63621, the hologram 506a is substantially divided into four areas by a division line, extending in the radial direction, that is parallel to the radius of the optical disk 500, and a division line 506c, extending in the tangential direction, that is tangentially parallel to the circumference of the optical disk 500. Further, the division areas are divided into areas for tracking detection and areas for focus detection. At the least, some of the areas for tracking detection are defined as division areas 506d along the tangentially aligned division line in the direction of the optical disk 500. In FIGS. 38A, 38B and 38C, only the division line 506c in the tangential direction and the division areas 506d are shown. The division areas 506d are symmetrically located along the division line 506c, and when light fluxes from the division areas 506d are employed as auxiliary light for tracking control, a tracking control signal can be stably obtained, even when a far-field pattern provided by the laser beam emitted by the light source 501 is shifted. Furthermore, when many more division areas 506d are established, as shown in FIGS. 38B and 38C, an adverse affect on light reflected by the optical disk 500, the result of a scratch thereon, could also be dispersed.

FIG. 39A is a diagram showing the state of an optical disk having a two layer data recording face wherein a laser beam is reflected by the front data recording face. FIG. 39B is a diagram showing the state wherein a laser beam is reflected by the rear data recording face. When a laser beam 510 is condensed and reflected by an L0 layer 500a, which is a front data recording face, part of the laser beam 51 passes through the L0 layer 500a and is reflected by an L1 layer 500b, which is the rear data recording face. Further, when the laser beam 510 is condensed and reflected by the L1 layer 500b, part of the laser beam 510 is reflected by the front L0 layer 500a. Therefore, when the laser beam 510 is condensed and strikes the L0 layer 500a, or is further condensed and strikes the L1 layer 500b, the part of the laser beam that has been reflected but has not been condensed is again reflected. Subsequently, the non-condensed and reflected laser beam enters a light-receiving sensor 508, together with the condensed and reflected laser beam that contains a signal element. Therefore, the element of the non-condensed and reflected laser beam is added as an offset to the signal that is output by the light-receiving sensor 508.

Therefore, according to JP-A-2002-190132, provided are a photo detector for 0-order diffracted light that is generated by the hologram 506a, a focus servo signal generation/operation circuit, a photo detector for ±1-order diffracted light and a focus servo signal generation/operation circuit. As a result, focal control can be stably performed. Further, according to JP-A-2003-67949, a diffraction grating that generates three beams is provided between a light source 501 and a prism 502, and the quantity of ±1-order light that has been condensed and reflected is equal to or greater than the quantity of 0-order light that has not been condensed and reflected. Therefore, while for the output of the light source 501 there is a slight loss, the offset for a tracking control signal can be reduced.

Assume that data recording or data reproduction is to be performed by condensing a laser beam at a predetermined data recording face of an optical disk having a plurality of layers, e.g., that data recording is to be performed for the L0 layer of an optical disk having a two layer data recording face and is then to be sequentially performed for the L1 layer. In this case, when the data recording state for other than the predetermined data recording face is unbalanced, an offset for a tracking control signal will occur.

SUMMARY OF THE INVENTION

To resolve this problem, the objective of the present invention is to provide an optical pickup device that can maintain a minimum offset that occurs for a signal used for tracking control, regardless of whether an optical disk is used that has a data recording face consisting of a plurality of layers, and an optical disk apparatus that includes this optical pickup device.

To achieve this objective, an optical pickup device condensing a laser beam toward a data recording face of an optical disk, recording data in the optical disk, and reproducing data from the optical disk, the optical pickup device comprises:

a light source configured to emit a laser beam toward the optical disk;

a light-receiving sensor that has a main tracking light detection portion and a sub-tracking light detection portion, the main tracking light receiving, of light reflected by the data recording face of the optical disk, light that is used for tracking control of the optical pickup device, and the sub-tracking light detection portion receiving light that is used as auxiliary light for tracking control; and a hologram that includes a tracking area having a main tracking area and a sub-tracking area, the main tracking area separating a light flux that impinges on the main tracking light detection portion from the light reflected by the data recording face of the optical disk, the sub-tracking area separating a light flux that impinges on the sub-tracking light detection portion from the light reflected by the data recording face, the main tracking area and the sub-tracking area being defined by a tangential division line extended in a tangential direction, the tangential direction being parallel to a line tangential to the circumference at a light condensing position of the optical disk, wherein the tracking area of the hologram is defined as the main tracking area and the sub-tracking area by a radical division line, the radical division line being extended in a radial direction that parallels a radius of the optical disk at the light condensing position, and wherein the main tracking area and the sub-tracking area have the same width in the radial direction.

BRIEF DESCRIPTION OF THE DRAWINGS

FIG. 19 is a diagram showing the incident position, on the light-receiving sensor, a laser beam that has been reflected by the L0 layer, which is a non-condensing face, according to the first embodiment.

DESCRIPTION OF THE PREFERRED EMBODIMENTS

First Embodiment

Figure 1:
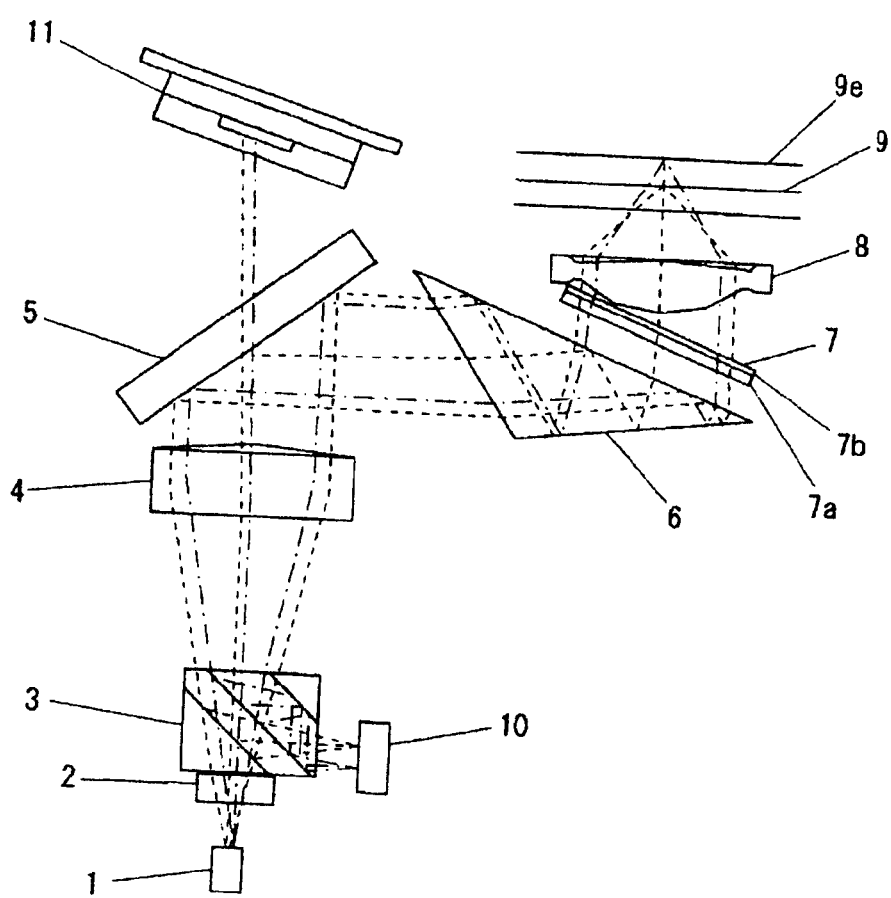
FIG. 1 is a diagram showing the structure of the optical system of an optical pickup device according to a first embodiment of the present invention.

A first embodiment of the present invention will now be described while referring to the accompanying drawings. FIG. 1 is a diagram showing the arrangement of the optical system of an optical pickup device 20 according to the first embodiment. FIG. 2A is a top view of the optical pickup device 20 for the first embodiment, and FIG. 2B is a bottom view thereof. In the first embodiment, a DVD 9 is employed as an optical disk that has a data recording face formed of a plurality of layers, and a CD 9e is employed as a second optical disk. However, other types of disks may be employed and generality still maintained. Furthermore, the optical pickup device 20 for the first embodiment employs a so-called double wavelength semiconductor laser for performing, at the least, either data recording or data reproduction for the DVD 9 and the CD 9e.

According to the first embodiment, in the optical pickup device 20, a light source 1, a diffraction element 2, an integrated prism 3 and a light-receiving sensor 10 are attached to a coupling base 13, which is attached to a carriage 12. A collimating lens 4, a beam splitter 5, a path elevating prism 6 and a forelight monitor 11 are mounted on the carriage 12 directly or via a mounting member. A hologram element 7 and an object lens 8 are mounted on a lens holder 15 of an actuator 14. The lens holder 15 is movably supported from a suspension holder 17 by a suspension wire 16, and the actuator 14 is fixed to the carriage 12.

For the light source 1, a light emission point for emitting a laser beam having a wavelength $\lambda 1$ (about 650 nm) for a DVD and a light emission point for emitting a laser beam having a wavelength $\lambda 2$ (about 780 nm) for a CD are provided near each other. The light source 1 may be a so-called monolithic double wavelength semiconductor layer, wherein points for emitting laser beams having two wavelengths are formed within a single semiconductor device, or a so-called hybrid double wavelength semiconductor laser, wherein two semiconductor devices having light emission points for different wavelengths are arranged near each other. In the first embodiment, a so-called monolithic double wavelength semiconductor laser is employed as the light source 1.

The diffraction element 2 is a wavelength selection diffraction element that passes a laser beam having a wavelength $\lambda 1$ for a DVD, and that diffracts a laser beam having a wavelength $\lambda 2$ for a CD and separates this light into three light fluxes, i.e., a 0-order light flux having a large quantity, which is called a main center beam used for tracking control, and ±1-order light fluxes having small quantities, which are called side beams. Conventionally, a one-beam tracking control method for emitting a light flux to a DVD is employed to provide tracking control for the DVD 9, while a three-beam tracking control method for emitting three light fluxes to a CD is employed to provide tracking control for the CD 9e. However, when the double wavelength semiconductor laser is employed as the light source, as in the first embodiment, it is difficult for a laser beam for a DVD to be emitted without the diffraction element 2, and only a laser beam for a CD is emitted via the diffraction element 2. Further, when a common diffraction element 2 is employed that does not include a wavelength selection function, a laser beam for a DVD is separated into three beams, and only the main beam is employed for recording and reproduction. When data are to be recorded on a DVD at a high multiple of speed, the light source 1 must output a laser beam having greater power in order to cover a loss occasioned by the side beams. Therefore, as the diffraction element 2, a diffraction element having a wave selection function is preferable.

Figure 3:
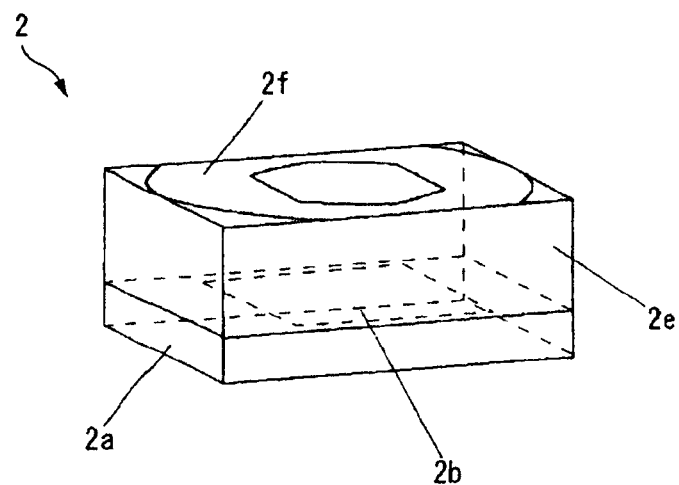
FIG. 3A is a diagram showing the structure of a diffraction element for the first embodiment.
FIG. 3B is a detailed diagram showing mainly a diffraction grating section.
Figure 3:
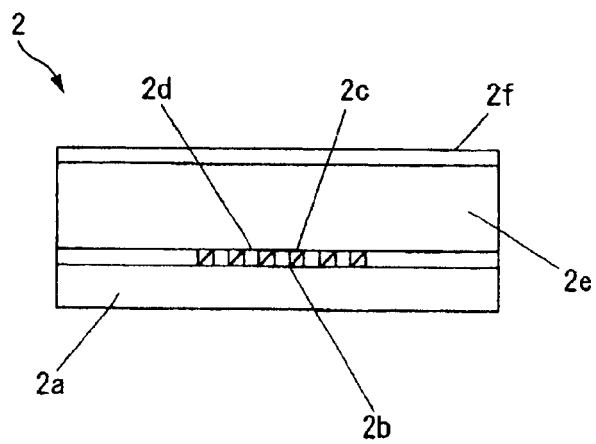

FIG. 3A is a diagram showing the structure of the diffraction element 2 of the first embodiment. FIG. 3B is a detailed structure diagram showing mainly a diffraction grating section. For the diffraction element 2, a diffraction grating 2b, formed of a convex member 2c and a filling member 2d, is deposited on the surface of a transparent substrate 2a, a transparent protective sheet 2e is overlaid, and in addition, an opening limit film 2f is deposited on the surface of the transparent protective sheet 2e. The convex member 2c contains an organic material having as a property the absorption of light in a predetermined wave band. This organic material is either a pigment or a dye when the light absorption property is provided for a visible light area. When such an organic material is supplied, compared with when the organic material is not supplied, the refractive index for the convex member 2c is changed in a neighboring wave band. The width of this change is increased near the wave band for light absorption. Assuming that the predetermined wave band is a wave band slightly shorter than the wavelength λ1, different refractive indexes, between those for the wavelength λ1 and for the wavelength λ2, can be employed for the convex member 2c. When appropriate materials for the convex member 2c, the filling member 2d and the organic material are selected, the reflective index can be equaled for the convex member 2c and the filling member 2d for the wavelength λ1, while the reflective index can be varied for the convex member 2c and the filling member 2d for the wavelength λ2. Therefore, the diffraction element 2 can be a wavelength selection diffraction element that passes a laser beam having the wavelength λ1 for a DVD, or that diffracts a laser beam having the wavelength λ2 for a CD and separates the laser beam to obtain three light fluxes that are used for tracking control. It should be noted that the organic material may be contained in the filling member 2d.

The transparent substrate 2a and the transparent protective sheet 2e are formed of optical glass or optical plastic. The convex member 2c and the filling member 2d are formed, for example, of a resist, or an ultraviolet setting or thermosetting adhesive. The opening limit film 2f is formed by alternately laminating, for example, an SiO$_2$ film and an Si film or a Ti film a plurality of times. There is an opening provided in the opening limit film 2f, and while the light that enters the opening limit film 2f is absorbed, the light that passes through the opening is transmitted. The shape of the opening may be a square, a circle, an ellipse, an oval or a polygon, in accordance with the optical design of the optical pickup device 20.

In the first embodiment, the diffraction element 2 is shaped almost the same as a rectangular parallelepiped; however, it may be formed, for example, like a cylindroid or a rounded-corner quadrangular prism. Or, the shape of the diffraction element 2 may be one such that C-chamfering or R-chamfering processing is performed at the end.

Figure 4:
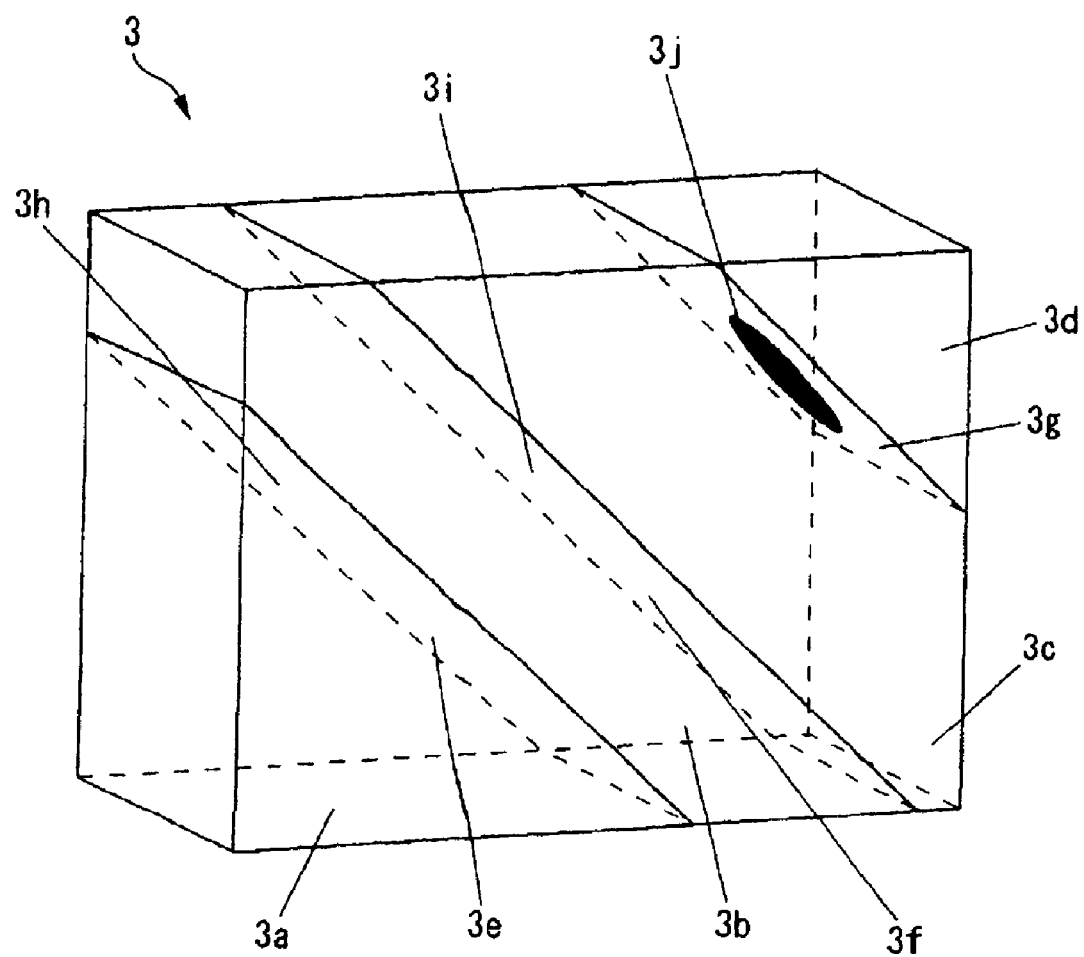
FIG. 4 is a diagram showing the structure of an integrated prism according to the first embodiment.

FIG. 4 is a diagram showing the structure of the integrated prism 3 for the first embodiment. The shape of the integrated prism 3, in its entirety, is a rectangular parallelepiped for which blocks 3a, 3b, 3c and 3d, formed from transparent optical glass or optical plastic, are bonded together using a glass or an ultraviolet setting adhesive. The integrated prism 3 includes inclined faces 3e, 3f and 3g that are substantially parallel. The inclined face 3e is located between the blocks 3a and 3b, and corresponds to an interface for the blocks 3a and 3b. A polarized light separation film 3h is deposed on the surface of at least one of the blocks 3a and 3b. The polarized light separation film 3h has a characteristic such that a P polarized laser beam having a wavelength λ1 is substantially permitted to pass, an S polarized laser beam having a wavelength λ1 is reflected, and both P polarized and S polarized laser beams having a wavelength λ2 are substantially permitted to pass. The inclined face 3f is located between the blocks 3b and 3c, and corresponds to an interface for the blocks 3b and 3c. A polarized light separation film 3i, which is deposited on the surface of at least one of the blocks 3b and 3c, has a characteristic such that both P polarized and S polarized laser beams having a wavelength λ1 are substantially permitted to pass, a P polarized laser beam having a wavelength λ2 is permitted to pass, and an S polarized laser beam having a wavelength λ2 is reflected. The inclined face 3g is located between the blocks 3c and 3d, and corresponds to an interface for the blocks 3c and 3d. A hologram 3j, for a CD, is provided for the surface of at least one of the blocks 3c and 3d.

Figure 5:
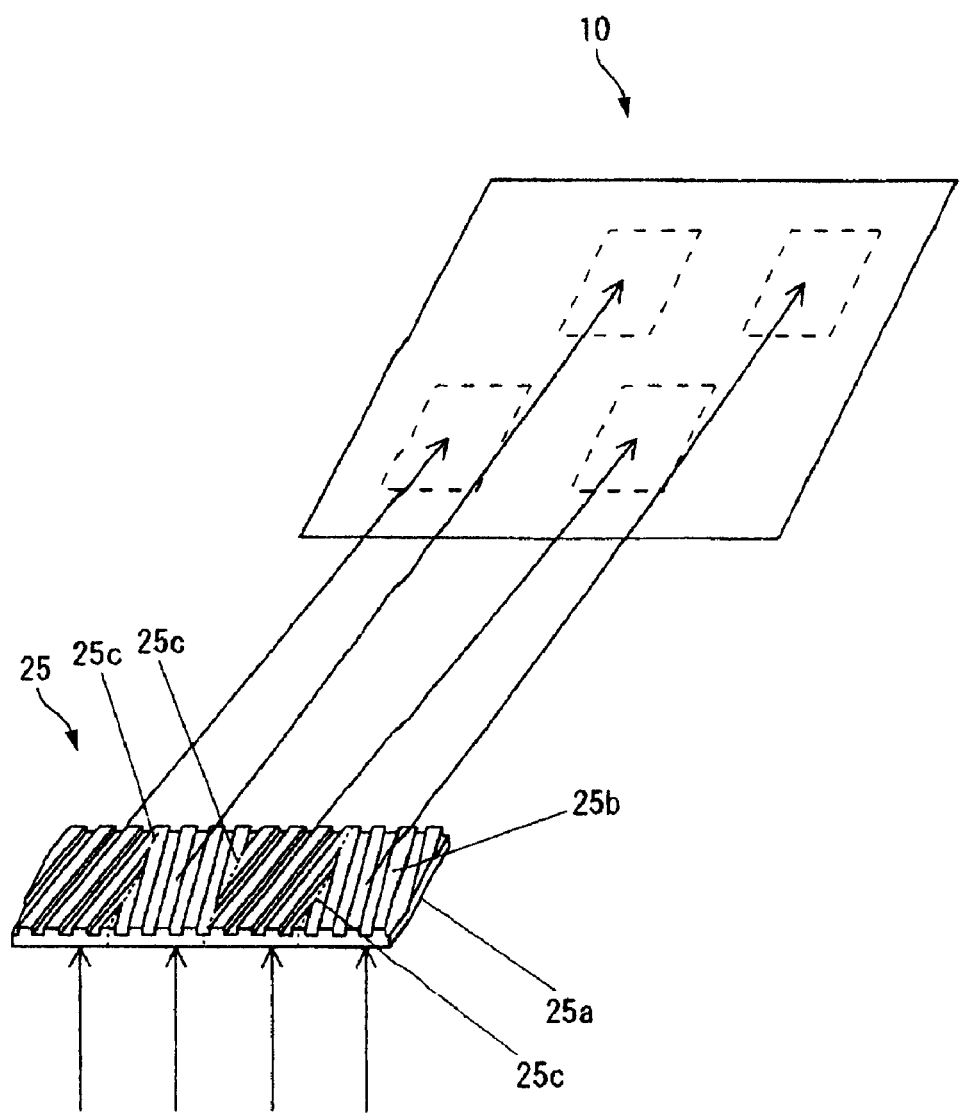
FIG. 5 is a diagram showing the operation of a hologram.

The operation of a hologram will now be explained. FIG. 5 is a diagram showing the operation of the hologram. A hologram 25 is an optical element that employs the diffraction and interference of light to guide incident light fluxes in a predetermined direction. In this explanation, assume that when incident light fluxes pass through a raised and recessed portion 25b, formed on the surface of a substrate 25a, the light fluxes are to be diffracted and interfered with and to be guided in a predetermined direction. In this instance, simply to simplify the explanation, a condensing lens is not shown between the hologram 25 and the light-receiving sensor 10. The raised and recessed portion 25b is formed by alternately forming raised and recessed portions that are almost parallel. Generally, at least the +1-order diffracted light or the −1-order diffracted light is employed by the optical pickup device. The quantity of the diffracted light is determined mainly by, and depends on the heights and the depths of the raised and recessed portions 25b, and the direction in which the diffracted light fluxes are transmitted is determined in accordance with the pitches of the raised and recessed portions 25b and the directions in which they are formed. The adjacent raised and recessed portions 25b are defined by virtual lines called division lines 25c. When raised portions and recessed portions are arranged in parallel, incident light fluxes are emitted via the hologram 25 while the shapes of the light fluxes are maintained. On the other hand, when the raised and recessed portions, as arranged, are not straight, the shapes of the light fluxes that are emitted are also changed. Therefore, when parallel light enters, converted light or scattered light can be emitted.

In FIG. 5, the hologram 25 is divided at the three division lines 25c. Light that enters the four divided areas is diffracted along the raised and recessed portions 25b, and the obtained light fluxes emitted via the hologram 25 enter the light-receiving sensor 10. Since the light detection faces are located at positions to which light fluxes from the individual areas are emitted, the light fluxes can be separated. A transmission type is employed as the hologram 25; however, a reflective type may be employed. Further, light fluxes may be transmitted from the reverse side. In this case, the raised and recessed portion 25b are exposed to the surface of the substrate 25a. However, the raised and recessed portions 25b may be covered with a filling material. At this time, the refractive index of the raised and recessed portions 25b should be equal to the refractive index for the filling material at the wavelength of the laser beam used for the hologram.

Figure 6:
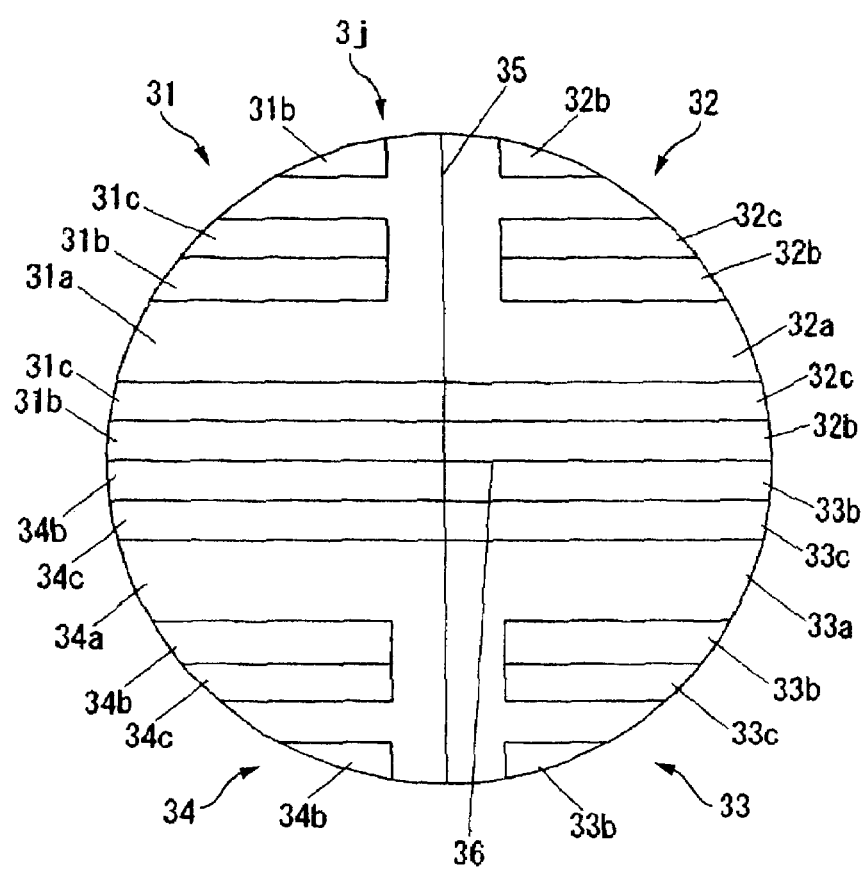
FIG. 6 is a diagram showing a division pattern for a CD hologram for the first embodiment.
Figure 6:
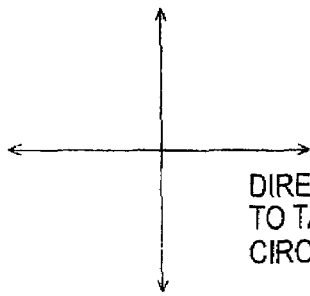

FIG. 6 is a diagram showing the division pattern for the CD hologram according to the first embodiment. The second hologram is used as the CD hologram 3*j*. The CD hologram 3*j* includes four areas 31, 32, 33 and 34 of the same size that are defined along a division line 35, which is extended parallel to the radius of the CD 9*e*, and along a division line 36, which is extended parallel to the tangent line of the circumference of the CD 9*e*. The areas 31, 32, 33 and 34 are respectively divided into second tracking areas 31*a*, 32*a*, 33*a* and 34*a*, to separate light fluxes required for tracking control, and second focus areas 31*b* and 31*c*, 32*b* and 32*c*, 33*b* and 33*c*, and 34*b* and 34*c* to separate light fluxes required for focus control. Light fluxes that are separated in the second focus areas 31*b*, 32*b*, 33*b* and 34*b* are transmitted to the light-receiving sensor 10 after focusing is performed. The light fluxes that are separated in the second focus area 31*c*, 32*c*, 33*c* and 34*c* are transmitted to the light-receiving sensor 10 before focusing is performed. The focusing state of the light fluxes may be inverted between the second focus areas 31*b*, 32*b*, 33*b* and 34*b* and the second focus areas 31*c*, 32*c*, 33*c* and 34*c*.

In the first embodiment, the integrated prism 3 has been formed of four blocks. However, depending on the optical design specifications, the integrated prism 3 may be formed of three or fewer blocks, or five or more blocks, and accordingly, two or fewer inclined faces, or four or more inclined faces may be included in the integrated prism 3.

The collimating lens 4 changes a scattering laser beam emitted by the light source 1 to substantially parallel light, and changes, to converged light, a substantially parallel laser beam reflected by the data recording face of the DVD 9 or the CD 9*e*. The collimating lens 4 is made of optical glass or optical plastic.

The beam splitter 5 is formed of optical glass or optical plastic. A polarized separation film is deposited on the surface of the beam splitter 5 near the light source 1. The polarized separation film reflects most of a laser beam that is emitted by an arbitrary light emitting point of the light source 1, and permits only a part of the laser beam to pass. Further, the polarized separation film reflects almost all of the laser beam reflected by the data recording face of the DVD 9 or the CD 9*e*. The path elevating prism 6 is a prism that raises, almost perpendicular to the face of the DVD 9 or the CD 9*e*, the light axis that is located in a plane almost parallel to the plane of the DVD 9 or the CD 9. The path elevating prism 6 may be a mirror.

Figure 7:
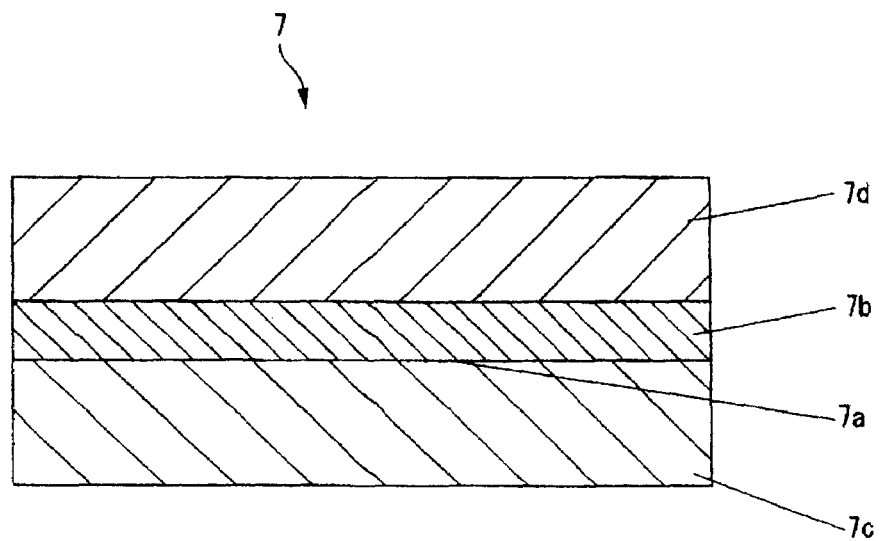
FIG. 7 is a cross-sectional view of the structure of a hologram element for the first embodiment.

FIG. 7 is a cross-sectional view of the structure of the hologram element according to the first embodiment. According to the structure of a hologram element 7, between a substrate 7*c*, which is made, for example, of optical glass and is located near the light source 1, and a substrate 7*d*, which is located near the DVD 9 or the CD 9*e*, a hologram 7*a* for a DVD is arranged on the light source 1 side, and a quarter-wave plate 7*b* is arranged on the DVD 9 or CD 9*e* side. The DVD hologram 7*a* is deposited on the surface of the substrate 7*c* and includes a wave selection function and a polarization function so that it reacts only to a laser beam having a wavelength λ1 that is reflected by and returned from the DVD 9. Further, a refractive index and the thickness of the quarter-wave plate 7*b* are so set that the quarter-wave plate 7*b* reacts to light having both wavelengths λ1 and λ2.

Figure 8:
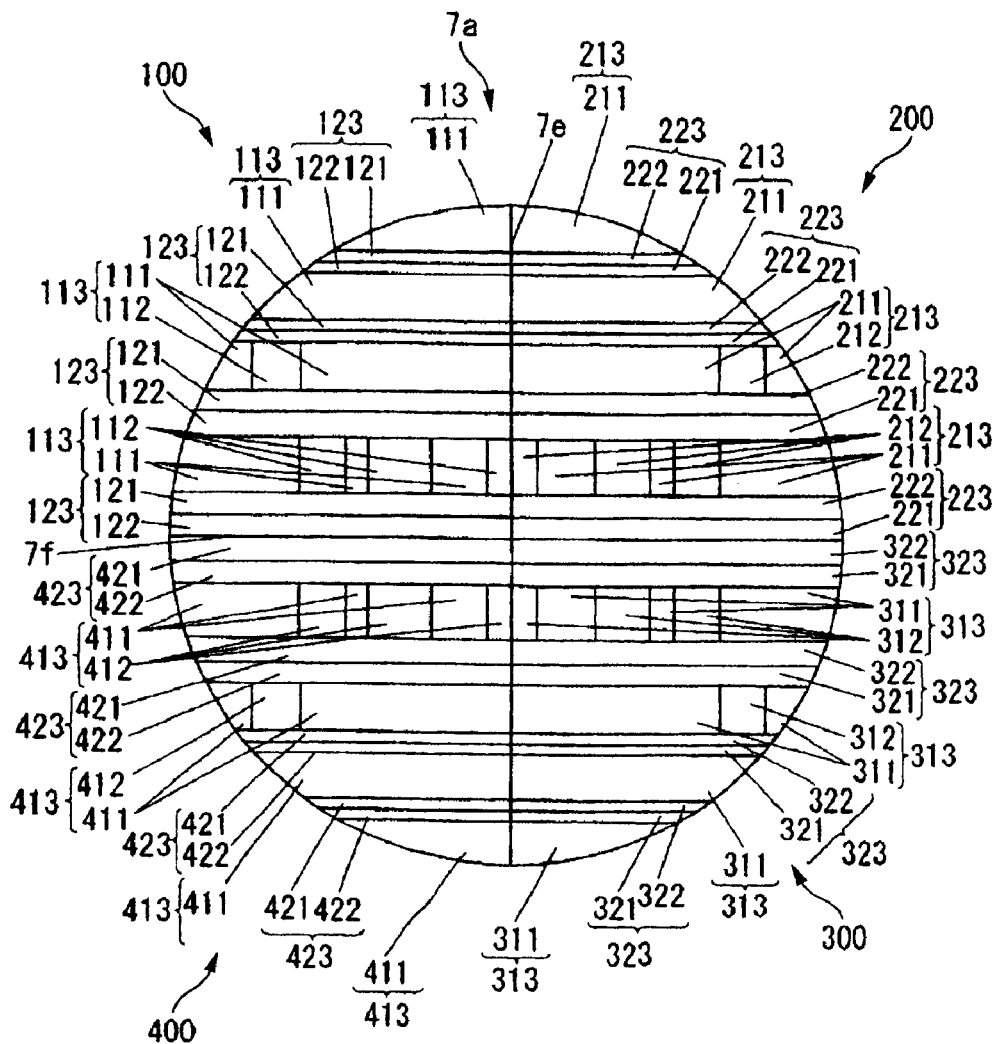
FIG. 8 is a diagram showing a division pattern for a DVD hologram for the first embodiment.

FIG. 8 is a diagram showing the division pattern of the DVD hologram 7*a*. The DVD hologram 7*a* divides a laser beam reflected by the DVD 9 into a light flux that is a +1-order diffracted light required for tracking control and a light flux required for focus control. The DVD hologram 7*a* includes four areas 100, 200, 300 and 400 having almost the same size that are defined along a first division line 7*e*, which is extended in the radial direction parallel to the radius of the DVD 9, and along a second division line 7*f*, which is extended in the tangential direction parallel to the tangential line of the circumference of the DVD 9. The radial direction and the tangential direction are defined by employing, as a reference, the position at which the laser beam emitted by the light source 1 enters the DVD 9. The first division line 7*e* is almost a center line in the tangential direction of the hologram 7*a*, and the second division line 7*f* is almost a center line in the radial direction of the hologram 7*a*. The individual areas 100, 200, 300 and 400 are respectively divided into tracking areas 113, 213, 313 and 413 and focus areas 123, 223, 323 and 423 along the division lines in the tangential direction.

The tracking areas 113, 213, 313 and 413 near the center in the radial direction of the DVD hologram 7*a* are alternately divided into main tracking areas 111, 211, 311 and 411 and sub-tracking areas 112, 212, 312 and 412 along the division lines in the radial direction. That is, the main tracking areas 111, 211, 311 and 411 and the sub-tracking areas 112, 212, 312 and 412 have the same width in the radial direction. Since only a small amount of tracking information is included near the center of a spot that is collected on the data forming face of the DVD 9, the sub-tracking areas 112, 212, 312 and 412 are arranged in the center of the DVD hologram 7*a* in the radial direction, and light fluxes in the area where there is little tracking information are employed to support tracking control. Therefore, the strength of the tracking control signal can be increased. The tracking areas 113, 213, 313 and 413 in the peripheral portion of the DVD hologram 7*a* in the radial direction respectively include only the main tracking areas 111, 211, 311 and 411. Further, of the tracking areas 113, 213, 313 and 413, the end portions of the DVD hologram 7*a* in the tangential direction also include only the main tracking areas 111, 211, 311 and 411.

The focus areas 123, 223, 323 and 423 are divided into focus areas 121, 221, 321 and 421 and focus areas 122, 222, 322 and 422 along the division lines in the tangential direction. Light fluxes that are separated in the focus areas 121, 221, 321 and 421 are guided to the light-receiving sensor 10 after focusing is performed. Further, light flues that are separated in the focus areas 122, 222, 322 and 422 are guided to the light-receiving sensor 10 before focusing is performed. It should be noted that the focusing state of the light fluxes may be inverted between the focus areas 121, 221, 321 and 421 and the focus areas 122, 222, 322 and 422. When light fluxes are separated in the focus areas 121, 122, 221, 222, 321, 322, 421 and 422 defined along the division lines in the tangential direction, by using such light fluxes, a focus control signal can be generated for which, in the waveform, there is less irregularity, and stable focus control can be provided.

The object lens 8 is formed, for example, of optical glass or optical plastic, and can be focused on both the DVD 9 and the CD 9*e*. The object lens 8, which is a double-focusing object lens, can be, for example, a combination of a condensing lens and a Fresnel lens or a hologram lens, or opening limit means may be provided for a DVD condenser to perform CD reproduction, so that a difference in the thicknesses of the DVD 9 and the CD 9*e* and a difference in the numbers of openings for the two can be adjusted.

The DVD 9 is, for example, a DVD-ROM, a DVD±R/RW or a DVD-RAM. The CD 9*e* is a CD, a CD-ROM or a CD-R/RW. The DVD 9 and the CD 9*e* are data recording and reproduction enabled media, except for those that are read only media. Furthermore, these media include an optical disk having a data recording face formed of a plurality of layers, including an optical disk having a two layer data recording face. Further, not only the DVD 9 and the CD 9*e*, but also a so-called BD (Blu-ray Disc) and an HD DVD (High Definition DVD), or other combinations may be employed, and in this case, generality can still be maintained.

Figure 9:
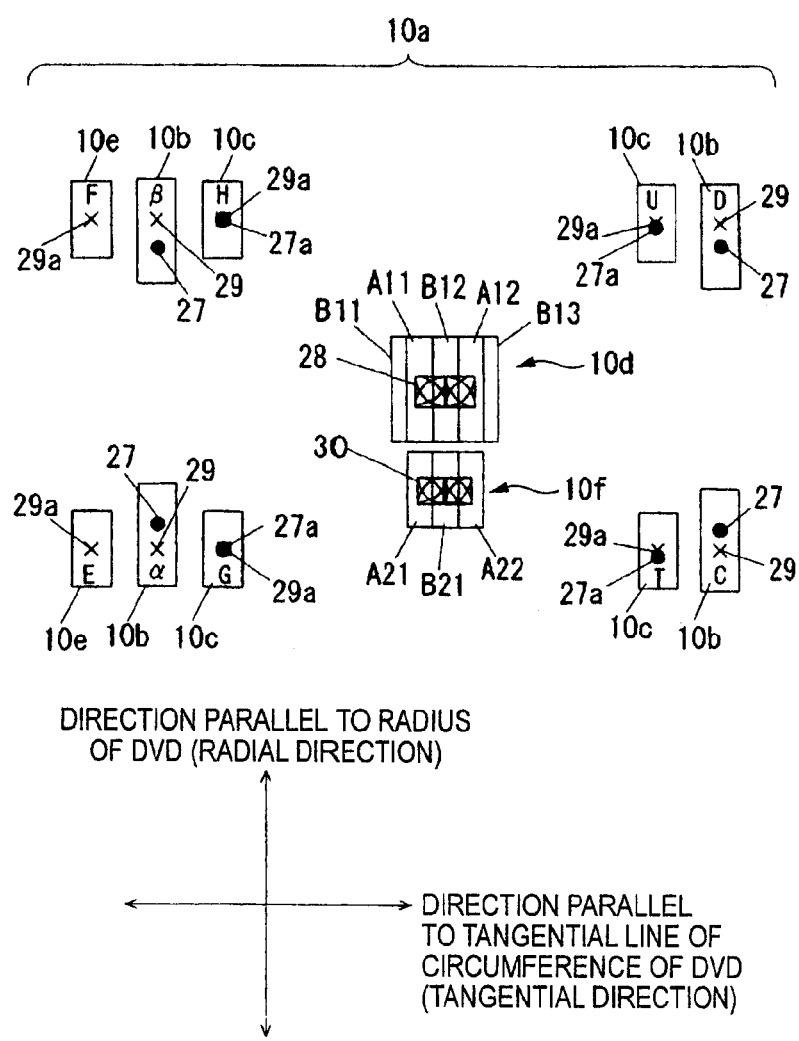
FIG. 9 is a diagram showing the arrangement of light detection faces for a light-receiving sensor of the first embodiment.

For the light-receiving sensor 10, light detection faces 10*a*, into which light reflected by the DVD 9 or the CD 9*e* enters, are internally provided within a case made of a molded resin, and the light detection faces 10*a* are arranged in a predetermined pattern, in accordance with the specifications. FIG. 9 is a diagram showing the light detection faces of the light-receiving sensor 10 for the first embodiment. According to the first embodiment, the light-receiving sensor 10 is employed for the DVD 9 and the CD 9*e*. Since the light-receiving sensor 10 is used for both a DVD and a CD, a dedicated light-receiving sensor for a CD need not be provided, and the number of parts can be reduced. Further, the dimensions of the location wherein the light detection faces 10*a* are arranged can be reduced, and a thin, compact optical pickup device 20 can be made. In addition, since the number of terminals used for the external connection of the light detection faces 10*a* can be reduced, the size of the light-receiving sensor 10 can be reduced, and accordingly, a small, thin optical pickup device 20 can be provided. Depending on the contents, the light detection faces 10*a* can be sorted into main tracking light detection faces 10*b*, sub-tracking light detection faces 10*c*, DVD focus light detection face 10*d*, CD sub-tracking light detection faces 10*e* and CD focus light detection face 10*f*. The main tracking light detection faces 10*b* are also used as the second main tracking light detection faces. The sub-tracking light detection faces 10*c* are also used as the second sub-tracking light detection faces, and the CD sub-tracking light detection faces 10*e* are also used as the third sub-tracking light detection faces. The DVD focus light detection faces 10*d* are also used as the focus light detection faces, and the CD focus light detection faces 10*f* are also used as the second focus light detection faces.

The light detection faces 10*a* are so arranged that the DVD focus light detection faces 10*d* are placed in the center of a rectangle, and the main tracking light detection faces 10*b* are placed at the vertexes of the rectangle. The sub-tracking light detection faces 10*c* are arranged parallel to the main tracking light detection faces 10*b*, inward, in the tangential direction. The CD sub-tracking light detection faces 10*e* are respectively arranged beside the main tracking light detection faces 10*b* in the radial direction, i.e., parallel to the main tracking light detection face 10*b*, outward in the tangential direction. The CD focus light detection face 10*f* is placed adjacent to the DVD focus light detection faces 10*d* in the radial direction. The segments B11, A11, B12, A12 and B13 of the DVD focus light detection face 10*d* are arranged so they contact each other in the tangential direction. The segments A21, B21 and A22 of the CD focus light detection face 10*f* are also arranged so they contact each other in the tangential direction. Since the focus light detection face 10*f* is prepared that is optimal for a CD, focus control for the CD 9*e* can be provided. The outside edges in the radial direction of the main tracking light detection faces 10*b*, the sub-tracking light detection faces 10*c* and the CD sub-tracking light detection faces 10*e* are located substantially at the same position in the radial direction. The lengths in the radial direction of the sub-tracking light detection faces 10*c* and the CD sub-tracking light detection faces 10*e* are equal, while the lengths in the radial direction of the main tracking light detection faces 10*b* are longer. It should be noted that when sufficient space is available, the CD sub-tracking light detection faces 10*e* maybe arranged outside all the main tracking light detection faces 10*b* in the tangential direction.

The outputs of the segments A11, A12, B11, B12 and B13 of the DVD focus light detection face 10*d* are employed to provide focus control for the DVD 9. Further, the outputs of the segments A21, A22 and B21 of the CD focus light detection face 10*f* are employed to provide focus control for the CD 9*e*. The DVD focus light detection face 10*d* may also be used as the CD focus light detection face 10*f*; however, when a special CD focus light detection face 10*f* is provided, an optimal focus control signal can be obtained. The segments A11, A12, A21 and A22 of the DVD focus light detection face 10*d* and the CD focus light detection face 10*f* are electrically connected. Similarly, the segments B11, B12, B13 and B21 of the DVD focus light detection face 10*d* are electrically connected to the CD focus light detection face 10*f*. To provide tracking control for the DVD 9, the outputs of the α, β, C and D main tracking light detection faces 10*b* are employed, and the outputs of the G, H, T and U sub-tracking light detection faces 10*c* are employed to provide auxiliary tracking control. Further, to provide tracking control for the CD 9*e*, not only are the outputs of the α, β, C and D main tracking light detection faces 10*b* and the outputs of the G, H, T and U sub-tracking light detection faces 10*c* employed, but also the outputs of the E and F CD sub-tracking light detection faces 10*e*. The G, T and E sub-tracking light detection faces 10*c*, the CD sub-tracking light detection faces 10*e*, and the H, U and F sub-tracking light detection faces 10*c* are electrically connected.

Figure 10:
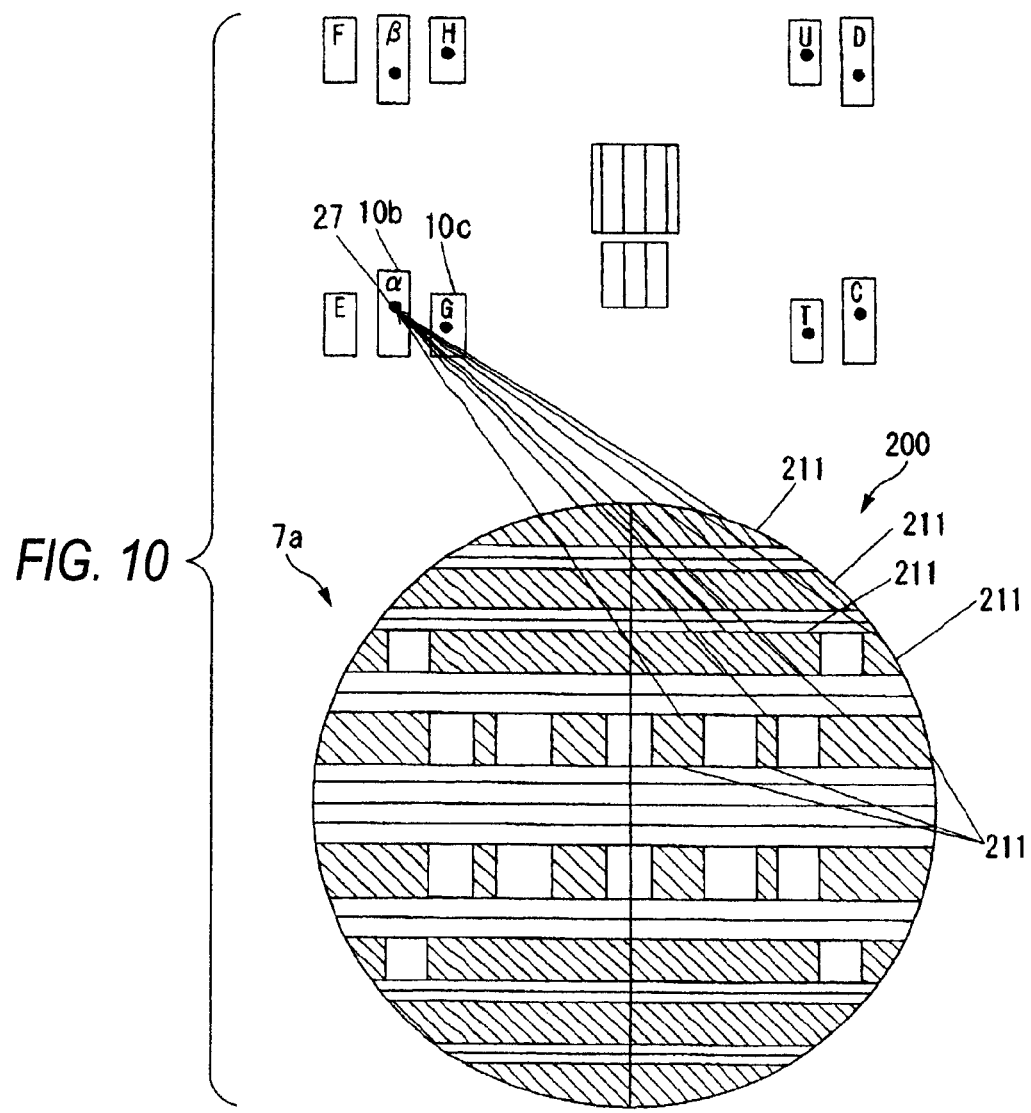
FIG. 10 is a diagram showing a state wherein light fluxes are separated, by main tracking areas of the DVD hologram for the first embodiment, and enter a main tracking light detection face.
Figure 11:
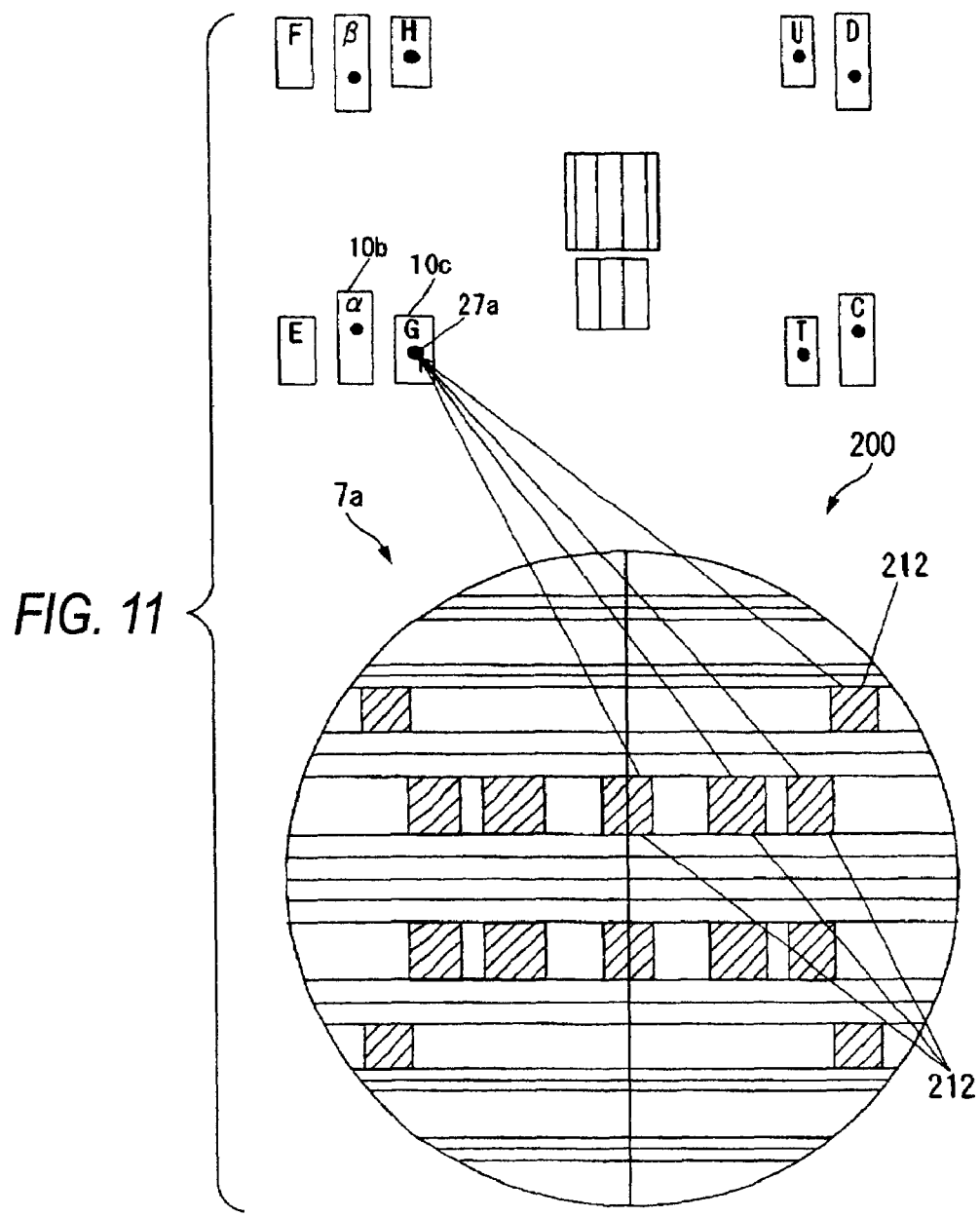
FIG. 11 is a diagram showing a state wherein light fluxes are separated by sub-tracking areas of the DVD hologram for the first embodiment, and enter a sub-tracking light detection face.

FIG. 10 is a diagram showing the state wherein light fluxes separated in the main tracking areas of the DVD hologram for the first embodiment enter the main tracking light detection faces. FIG. 11 is a diagram showing the state wherein light fluxes separated in the sub-tracking areas of the DVD hologram for the first embodiment enter the sub-tracking light detection faces. According to the structure of the DVD hologram 7*a*, after light is condensed at the DVD 9, light fluxes are reflected by the DVD 9 and enter the main tracking areas 211 of the area 200. These light fluxes are thereafter separated, and are all transmitted as a spot 27 in a substantially focused state to a position indicated by a ● on the α main tracking light detection face 10*b*. The "●" in FIG. 10 is the same as the "●" in FIG. 9. The main tracking areas 211 in the area 200 and the α main tracking light detection area 10*b* are arranged so as to intersect in the radial direction and in the tangential direction. Further, according to the DVD hologram 7*a*, after light has been condensed at the DVD 9, and when light fluxes are reflected by the DVD 9 and enter the sub-tracking area 212 of the area 200, the light fluxes are separated and are all transmitted in a substantially focused state, as a spot 27, to a position indicated by ● in the G sub-tracking light detection face 10*c*. The "●" in FIG. 11 is the same as the "●" in FIG. 9. The G sub-tracking light detection face 10*c* is adjacent to the α main tracking light detection face 10*b*. The sub-tracking area 212 of the area 200 and G sub-tracking light detection face 10*c* intersect each other in the radial direction and in the tangential direction. The light fluxes separated in the sub-tracking area 212 enter the centers of the sub-tracking light detection faces 10*c*. The light fluxes separated in the main tracking areas 211 are transmitted inward, in the radial direction, distances equivalent to the lengths of the main tracking light detection faces 10*b*, which are extended farther in the radial direction than are the sub-tracking light detection faces 10*c*.

Similarly, as shown in FIG. 9, individual light fluxes separated in the main tracking areas 111, 211, 311 and 411 are transmitted as spots 27, in a substantially focused state, to the C, α, β and D main tracking light detection faces 10*b*. Likewise, the light fluxes separated in the sub-tracking areas 112, 212, 312 and 412 are transmitted as spots, substantially in a focused state, to the T, G, H and U sub-tracking light detection faces 10*c*. In this manner, light fluxes, which are separated in the tracking areas 113, 213, 313 and 413 of the areas 100, 200, 300 and 400 of the DVD hologram 7a, intersect in the radial direction and in the tangential direction, and enter the main tracking light detection faces 10b and the sub-tracking light detection faces 10c. Through this processing, the widths of all the light fluxes are reduced along the optical path, so that increases in the widths of all the light fluxes is avoided, and the blocking of the ends of the light fluxes by other optical parts can be prevented. The direction in which the light fluxes intersect may be one direction, either the radial direction or the tangential direction. Since the widths of all the light fluxes are narrowed in the intersecting direction, the blocking of the ends of the light fluxes can be prevented in that direction. The light fluxes separated in the focus areas 121, 122, 221, 222, 321, 322, 421 and 422 of the DVD hologram 7a enter as spots 28 the segments A11, A12, B11, B12 and B13 of the DVD focus light detection face 10d, and are converted into focus control signals. The light fluxes separated in the focus areas 121, 221, 321 and 421 enter the DVD focus light detection face 10d after focusing is completed, and light fluxes separated in the focus areas 122, 222, 322 and 422 enter the DVD focus light detection face 10d before focusing is performed. Thus, a spot 29 becomes a little wide.

Similarly, in the case of the CD 9e, as shown in FIG. 9, of the light fluxes separated in the second tracking areas 31a, 32a, 33a and 34a of the CD hologram 3j, main beams separated by the diffraction grating 2b of the diffraction element 2 enter as spots 29, in substantially a focused state, at positions "X" on the C, α, β and D main tracking light detection faces 10b. Further, the side beams enter as spots 29a, in substantially a focused state, positions "X" on the T, G, E, H, F and U sub-tracking light detection faces 10c and positions "X" on the CD sub-tracking light detection faces 10e. The incident position of a spot 29 in the radial direction is almost equal to the incident position of a spot 29a in the radial direction. As described above, originally, the CD sub-tracking light detection faces 10e should be arranged outside the C and D main tracking light detection faces 10b in the tangential direction; however, they are not so arranged for the following reasons. Were the light detection faces to be arranged at these positions, the width of the light-receiving sensor 10 would be increased, and accordingly, the thickness of the optical pickup device 20 would be increased. Further, as will be described, without arranging light detection faces, an appropriate tracking control signal can be obtained. In addition, since the number of light detection faces 10a is reduced, the absolute value can also be reduced for the quantity of light that is reflected, by a portion other than a predetermined data recording face used for data recording or reproduction, and that enters the light detection faces 10a. Furthermore, as well as for the DVD, light fluxes separated in the second tracking areas 31a, 32a, 33a and 34a of the areas 31, 32, 33 and 34 of the CD hologram 3j intersect in the direction parallel to the radius of the CD 9e and to the tangential line of the circumference of the CD 9e, and are transmitted to the main tracking light detection faces 10b, the sub-tracking light detection faces 10c and the CD sub-tracking light detection faces 10e. Through this processing, the widths of all the light fluxes are reduced along the optical path, so that increases in the widths of all the light fluxes along the optical path are avoided, and the blocking of the ends of the light fluxes by the side face of the integrated prism 3 can be prevented. The direction in which the light fluxes intersect may be one direction, either the direction parallel to the radius of the CD 9e, or the direction parallel to the tangential line of the circumference of the CD 9e. Since the widths of all the light fluxes are narrowed in the intersecting direction, the blocking of the ends of the light fluxes can be prevented in that direction. Further, the light fluxes separated in the second focus areas 31b, 2b, 32c, 33b, 33c, 34b and 34c of the CD hologram 3j are transmitted as spots 30c to the segments A21, A22 and B21 of the CD focus light detection face 10f, and are converted into CD focus control signals. The light fluxes separated in the second focus areas 31b, 32b, 33b and 34b are transmitted to the CD focus light detection face 10f after focusing is performed, while the light fluxes separated in the second focus areas 31c, 32c, 33c and 34c are transmitted to the CD focus light detection face 10f before focusing is performed. Thus, the spots 30c become a little wide.

Figure 12:
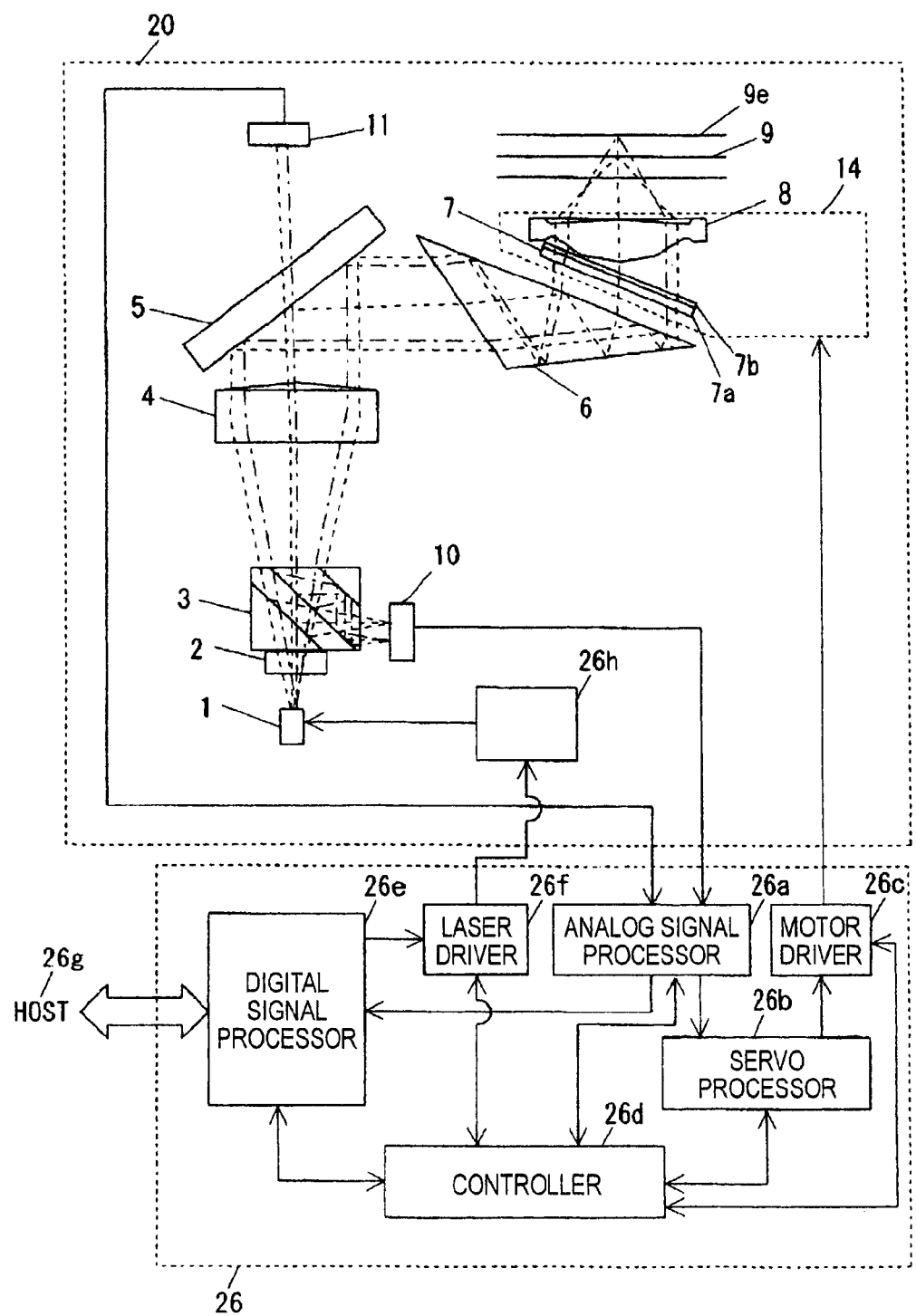
FIG. 12 is a diagram showing the control processing performed by the optical pickup device.

The tracking control processing and the focus control processing performed by the optical pickup device 20 will now be described. FIG. 12 is a diagram showing the control processing performed by the optical pickup device 20. Light received by the light-receiving sensor 10 is converted into an electric signal for DVD tracking control, DVD focus control, CD tracking control or CD focus control, and is transmitted to an analog signal processor 26a of an optical disk apparatus main body 26. The analog signal processor 26a performs the computation and band processing for the received signal, and outputs the results to a servo processor 26b. The servo processor 26b generates a focus error signal and a tracking error signal based on the signal received from the analog signal processor 26a, and outputs these signals to a motor driver 26c. The focus error signal indicates a shift in the focus of light fluxes condensed at the data recording face of the DVD 9 or the CD 9e. The tracking error signal indicates a shift, from an information track in the radial direction of the DVD 9 or the CD 9e, of light fluxes condensed at the data recording face of the DVD 9 or the CD 9e. The motor driver 26c employs the received focus error signal and the tracking error signal to generate a current that drives the actuator 14 on which the object lens 8 is mounted. Thus, the shift from the focus for the light flux condensed at the data recording face of the DVD 9 or the CD 9e, and the shift from the information track are adjusted so that there is minimum displacement.

Further, a controller 26d receives signals from the analog signal processor 26a, the servo processor 26b, the motor driver 26c, a digital signal processor 26e and a laser driver 26f. The controller 26d then performs computations for these signals and transmits the results (signal) to the individual sections, and permits the sections to perform processes.

The forelight monitor 11 is a sensor that receives part of a laser beam emitted by the light source 1, converts the quantity of light into an electric signal, and outputs this signal. As shown in FIG. 12, this electric signal is transmitted to the analog signal processor 26a of the optical disk apparatus main body 26. The analog signal processor 26a performs the computation and band processing for the received signal, and outputs the resultant signal to the digital signal processor 26b. The digital signal processor 26e generates a laser modulation signal based on the signal received from the analog signal processor 16a and data received from a host, and transmits the laser modulation signal to the laser driver 26f. A laser drive source 26h, which is arranged near the light source 1 of the optical pickup device 20, supplies a drive current to the light source 1 upon receiving a signal from the laser driver 26f. Through this process, a constant quantity of light fluxes is condensed at the data recording face of the DVD 9 or the CD 9e.

Figure 2:
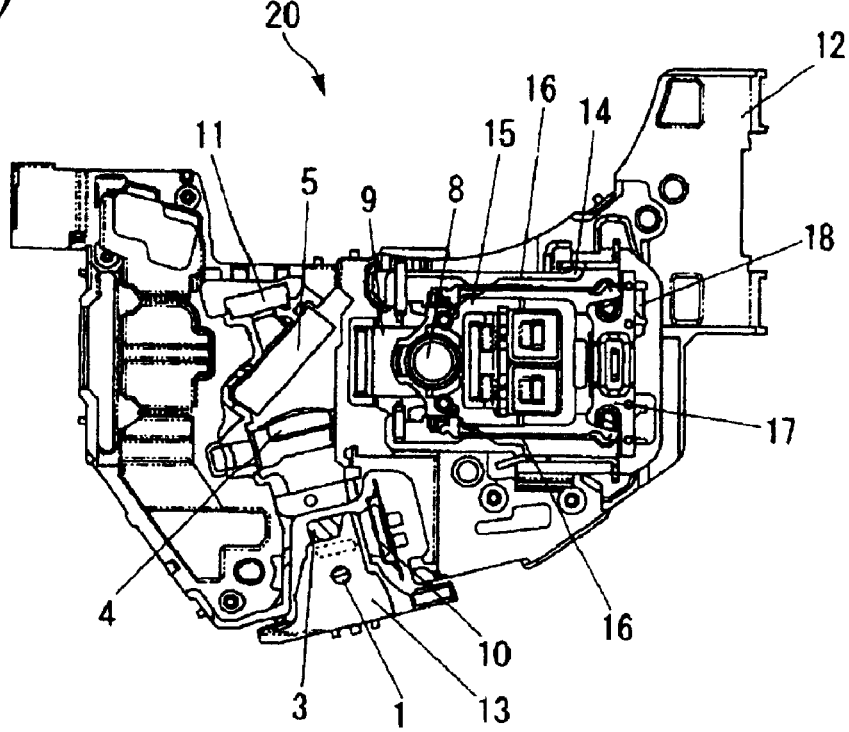
FIGS. 2A and 2B are a top view and a bottom view of the structure of the optical pickup device of the first embodiment.
Figure 2:
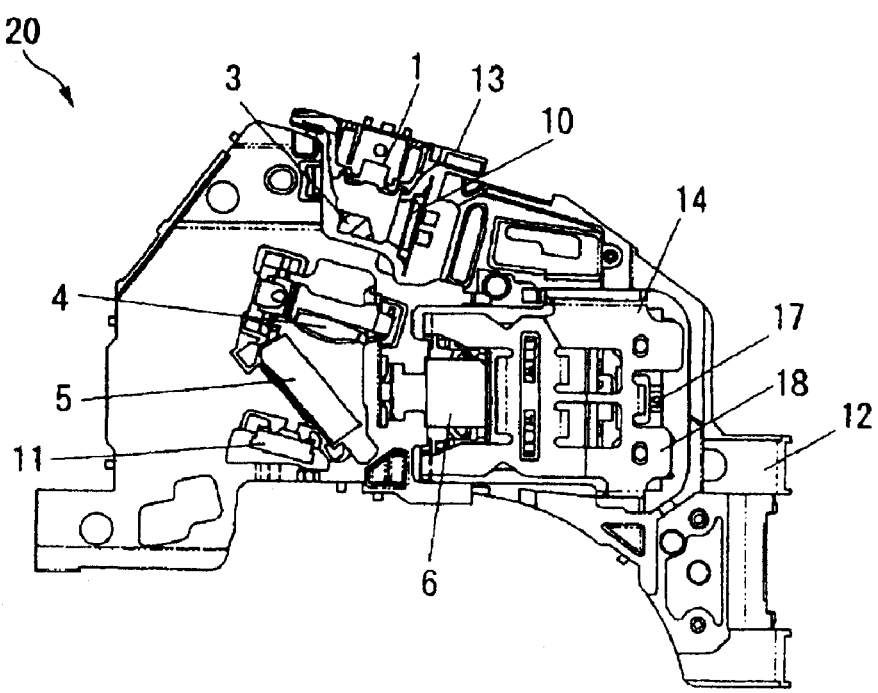

In FIG. 2, the carriage 12 serves as the framework for the optical pickup device 20, and as previously described, parts, such as various optical parts, that constitute the optical pickup device 20 are mounted on the carriage 12 directly or via other parts. The carriage 12 is made of an alloy material, such as a Zn alloy or a Mg alloy, or a hard resin material.

A material that forms the coupling base 13 should be comparatively light and should include a shape machining property that can provide an accurate finishing size, and include a satisfactory heat discharge property. For example, Zn, a Zn alloy, Al, an Al alloy, Ti or a Ti alloy can be employed. In the first embodiment, while taking the manufacturing cost into account, the coupling base 13 is formed using Zn die casting. The portion of the coupling base 13 where the light source 1, the diffraction element 2, the integrated prism 3 and the light-receiving sensor 10 are to be mounted is formed at a predetermined position and at a predetermined angle relative to the portion to be mounted on the carriage 12.

The hologram element 7 and the object lens 8 are fixed to the lens holder 15, which includes a coil. The lens holder 15 is movably supported by the suspension holder 17 via the suspension wire 16. The suspension holder 17 is fixed to a yoke 18, which includes a magnet. At this time, the lens holder 15 is prevented from contacting anything other than the suspension wire 16. The actuator 14 includes the object lens 8, a coil and a magnet, and is fixed to the carriage 12 by an adhesive. The actuator 14 contacts the carriage 12 only via the adhesive. The actuator 14 drives the object lens 8, so that, through focus control or tracking control, a condensed spot is focused on the information track on the data recording face of the DVD 9.

An optical path will now be explained. In FIG. 1, a DVD laser beam having a wavelength λ1, emitted by the light source 1, passes through the diffraction element 2, which is a wave selection diffraction element, without being substantially diffracted. Hereinafter, a laser beam emitted by the light source 1 is called forward light, a laser beam obtained through the reflection of the forward light by the DVD 9 or the CD 9e is called return light. Since the forward light is P polarized, the light is passed through the integrated prism 3 and enters the collimating lens 4. In the collimating lens 4, the forward light, which is scattering light, is changed substantially to parallel light. The forward light then enters the beam splitter 5 and part of this light passes through, while most of the light is reflected. The light that passes through is transmitted to the forelight monitor 11 to be employed to control the output of the forward light. Most of the forward light reflected by the beam splitter 5 is transmitted to the path elevating prism 6, and the optical path, which is almost parallel to the DVD 9, is changed until almost perpendicular to the DVD 9. The forward light that has entered the hologram element 7 passes through the DVD hologram 7a without being changed, and the P polarized light is converted to circularly polarized light by the quarter-wave plate 7b. The circularly polarized light is further converted into converged light by the object lens 8, and the converged light enters, in the focused state, the data recording face of the DVD 9.

When the forward light is reflected by the data recording face of the DVD 9, the return light is converted substantially into parallel light by the object lens 8, and this parallel light enters the hologram element 7. The return light is changed from circularly polarized light to S polarized light by the quarter-wave plate 7b. Further, the DVD hologram 7a separates the S polarized light into light fluxes required for tracking control and light fluxes for focus control. The return light separated by the DVD hologram 7a passes through the path elevating prism 6, is almost fully reflected by the beam splitter 5 and is converted into converged light by the collimating lens 4, after which the converted light enters the integrated prism 3. The return light that has entered the integrated prism 3 passes through the polarized light separation film 3i, and is reflected by the polarized light separation film 3h, following which the reflected light is transmitted from the integrated prism 3 to the light-receiving sensor 10.

The forward light of a CD laser beam having a wavelength λ2, which is emitted by the light source 1, is divided by the diffraction element 2 into three beams used for tracking control, and the three beams enter the integrated prism 3. Thereafter, the forward light is transmitted to the CD 9e along the same path as that of the forward light for the DVD 9. Return light obtained though the reflection of the laser beam by the data recording face of the CD 9e is converted into almost parallel light by the object lens 8, and the parallel light enters the hologram element 7. The return light is changed from circularly polarized light to S polarized light by the quarter-wave plate 7b, and the S polarized light passes though the DVD hologram 7a. The return light also passes through the path elevating prism 6, and is almost fully reflected by the beam splitter 5. The reflected light is converted into converged light by the collimating lens 4, and the converged light enters the integrated prism 3. The return light that has entered the integrated prism 3 is reflected by the polarized light separation film 3i, and is separated by the CD hologram 3j into light fluxes required for tracking control and light fluxes required for focus control. Thereafter, the light is again reflected by the polarized light separation film 3i, and the reflected light is transmitted from the integrated prism 3 to the light-receiving sensor 10.

When light fluxes of a laser light for CD tracking control have been diffracted by the diffraction grating 2b and have been separated by the CD hologram 3j, these light fluxes enter as spots 29 and 29a at positions, indicated by "X" in FIG. 9, of the light-receiving sensor 10. The main beam spots 29 and the side beam spots 29a are located almost at the same positions in the radial direction. The spots 29a are located substantially in the center of the sub-tracking light detection faces 10c and the CD sub-tracking light detection faces 10e. On the other hand, when light fluxes of a laser beam for DVD tracking control have been separated in the tracking areas 113, 213, 313 and 413 of the DVD hologram 7a, these light fluxes enter at positions, indicated by "●" in FIG. 9, of the light-receiving sensor 10. As well as in the case of the CD, the light fluxes separated in the sub-tracking areas 112, 212, 312 and 412 enter substantially the center of the sub-tracking light detection faces 10c, and the positions of the spots 27a are almost the same as those of the spots 29a. However, when light fluxes separated in the main tracking areas 111, 211, 311 and 411 enter the main tracking light detection faces 10b, their spots 27 are positioned inward in the radial direction. Accordingly, the radial lengths of the main tracking light detection faces 10b are increased inward. As will be described later, when a DVD having a two layer data recording face is employed, an offset occurs due to light reflected by a portion other than a predetermined data recording face used for data recording or data reproduction. In this case, in order to minimize the offset, an increase in the radial length of the main tracking light detection faces 10b is required. The length may be extended outward in the radial direction. In this case, light fluxes should enter the main tracking light detection faces 10b further outward in the radial direction.

The focus control processing will now be described. For the first embodiment, the spot size method is employed for the DVD 9 and the CD 9e. Therefore, the DVD hologram 7a is so designed that light fluxes separated in the focus areas 121, 221, 321 and 421 enter the DVD focus light detection faces 10d after focusing is performed, while light fluxes separated in the focus areas 122, 222, 322 and 422 enter the DVD focus light detection face 10d before focusing is performed. Further, the CD hologram 3j is so designed that light fluxes separated in the second focus areas 31b, 32b, 33b and 34b enter the CD focus light detection face 10f after focusing is performed, while light fluxes separated in the second focus areas 31c, 32c, 33c and 34c enter the CD focus light detection face 10f before focusing is performed. When the output of the DVD focus light detection face 10d is denoted by IA11, IA12, IB11, IB12 and IB13, a focus error signal FES used to perform DVD focus control is represented as follows.

FES=(IA11+IA12)−(IB11+IB12+IB13)

In the same manner, when the output of the focus light detection face 10f is denoted by IA21, IA22 and IB21, a CD focus error signal FES is represented as follows.

FES=(IA21+IA22)−IB21

It is preferable, for the focus error signal FES, that the focus areas 121, 122, 221, 222, 321, 322, 421 and 422 of the DVD hologram 7a have a uniform belt shape in the tangential direction relative to the DVD 9. This is because the focus error signal FES is thus prevented from becoming irregular. For the DVD hologram 7a in the first embodiment, the focus areas 121, 122, 221, 222, 321, 322, 421 and 422 of the areas 100, 200, 300 and 400 are defined only along the division lines in the tangential direction. As well as for the CD hologram 3j, from the external portion to the portion near the center of the CD hologram 3j, the second focus areas 31b, 31c, 32b, 32c, 33b, 33c, 34b and 34c are defined only along division lines that are parallel to the tangential line of the circumference of the CD 9e.

The tracking control processing will now be explained. According to the first embodiment, the tracking control for the CD 9e is to be performed using the three-beam differential push-pull method (hereinafter referred to as the DPP method), and when an optical disk of an inferior quality is employed, the DPP method is changed to a phase difference method. Further, a different method for data recording and data reproduction is employed that depends on the type of DVD 9, i.e., for a DVD-RAM, a one-beam push-pull method is employed for both data reproduction and data recording, and for the other types of DVDs, a phase difference method is employed for data reproduction and a one-beam advanced push-pull method is employed for data recording.

A tracking error signal TES, which is used for CD tracking control using the DPP method for the CD 9e, is represented as follows. In this case, the outputs of the main tracking light detection faces 10b, the sub-tracking light detection faces 10c and the CD sub-tracking light detection faces 10e are denoted by Iα, Iβ, IC, ID, IG, IH, IT, IU, IE and IF.

TES=(IC+Iα)−(ID+Iβ)−k2{(IE+IG+IT)−(IF+IH+IU)} where k2 is a constant defined in accordance with the operation setup.

Generally, k2 is ideally designed so that k2=*1 can be established. Further, since near several times the gains are added to IE, IG, IT, IF, IH and IU, only a small quantity of light enters the sub-tracking light detection faces 10c and the CD sub-tracking light detection faces 10e. As previously described, the CD sub-tracking light detection faces 10e are not prepared for the entry of light fluxes for side beams that are paired with light fluxes that enter T and U. However, the tracking error signal TES can be obtained.

Furthermore, the tracking error signal TES obtained by phase difference method for a CD is represented as follows.

TES=∠{(IC+Iβ)−(ID+Iα)} where ∠ is a voltage obtained through conversion of a detected phase difference.

Generally, the DPP method, whereby tracking control can be more stably performed, is employed. However, when data reproduction is performed for an optical disk of an inferior quality, having a pit height that does not conform to the standards, a tracking error signal TES may not be output properly by the DPP method. Even in this case, however, since by using the phase difference method a tracking error signal TES can be appropriately output, the phase difference method can be used as an extra tracking control method. As described above, when data is to be reproduced from a CD 9e of an inferior quality, for which tracking control can not be appropriately performed and which does not conform to the standards, tracking control can be performed. Thus, the optical disk device can cope with a wide range of CDs 9e.

The tracking error signal TES for a DVD-RAM is represented as follows. It should be noted that a method using only a single beam is employed for the tracking control of the DVD 9.

TES=(IC+Iα)−(ID+Iβ)

Further, for data reproduction of a DVD 9 other than a DVD-RAM, a tracking error signal TES is represented as follows.

TES=∠(IC−ID)+∠(Iβ−Iα)

or

TES=∠{(IC+Iβ)−(ID+Iα)}

The tracking error signal TES obtained using either expression may be employed.

For recording data on a DVD 9 other than a DVD-RAM, a tracking error signal TES is represented as follows.

TES=(IC+Iα)−(ID+Iβ)−k1{(IG+IT)−(IH+IU)} where k1 is a constant defined in accordance with the operation setup.

In this case only, the outputs of the G, H, T and U sub-tracking light detection faces 10c are employed as auxiliaries for tracking control. Generally, k1 is ideally designed so that k1=*1 can be established. Further, since near several times the gains are added to IG, IT, IH and IU, only a small quantity of light enters the sub-tracking light detection faces 10c. However, since the CD sub-tracking light detection faces 10e are also electrically connected, if light enters these faces, the light is added as an output. As described above, since the optimal tracking error signal is obtained in accordance with the type of DVD 9 that is employed and the data recording or reproduction operation that is used, optimal tracking control can be provided.

Figure 13:
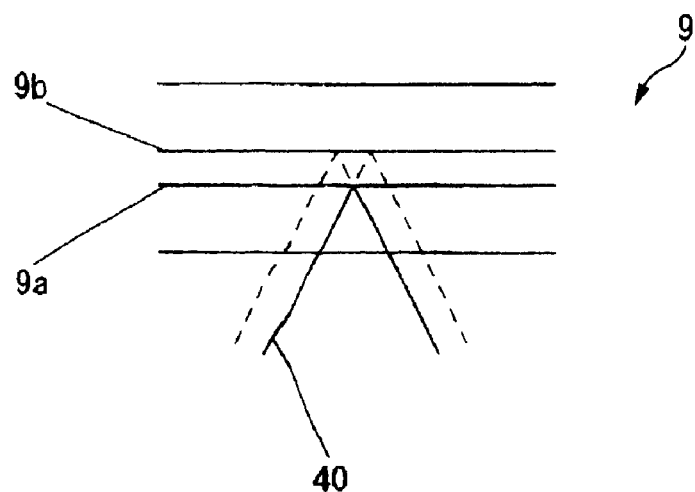
FIG. 13A is a diagram showing the state according to the first embodiment wherein a laser beam is reflected by a front data recording face of a DVD having a two-layer data recording face.
FIG. 13B is a diagram showing the state wherein a laser beam is reflected by the rear data recording face.
Figure 13:
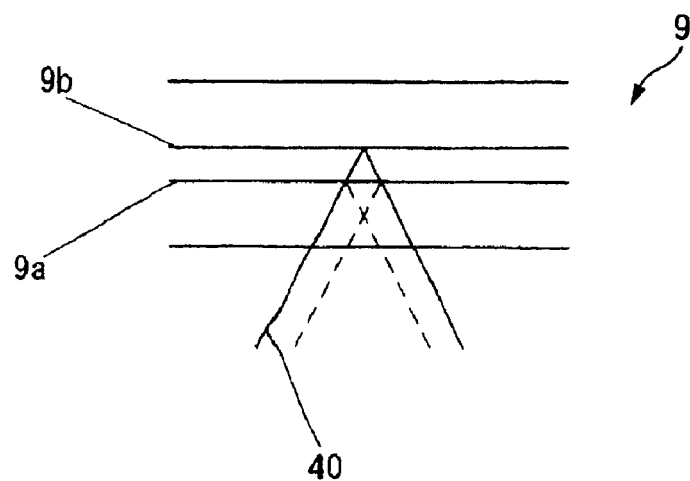

For the first embodiment, an explanation will be given for a case wherein a DVD having a two layer data recording face is employed as the DVD 9. FIG. 13A is a diagram showing the state wherein a laser beam is reflected by the front data recording face of a DVD having a two layer data recording face, and FIG. 13B is a diagram showing the state wherein a laser beam is reflected by the rear data recording face. The front data recording face is an L0 layer 9a, and the rear data recording face is an L1 layer 9b. When a laser beam 40 is condensed at and reflected by the L0 layer 9a, part of the laser beam 40 passes through the L0 layer 9a, and is reflected by the rear L1 layer 9b. When the laser beam 40 is condensed at and reflected by the L1 layer 9b, part of the laser beam is reflected by the L0 layer 9a. Therefore, when the laser beam is condensed at the L0 layer 9a and when it is condensed at the L1 layer 9b, the laser beam that has not been condensed and reflected is reflected. The data recording face at which a laser beam is condensed and reflected is called a condensing face, and the data recording face at which a laser beam is not condensed and reflected is called a non-condensing face. In FIG. 13A, the L0 layer 9a is a condensing face and the L1 layer 9b is a non-condensing face. In FIG. 13B, the L0 layer 9a is a non-condensing face, and the L1 layer 9b is a condensing face. The laser beam reflected by the non-condensing data recording face enters the light-receiving sensor 10, together with the laser beam that includes a signal element and is reflected by the condensing data recording face. The laser beam that has been reflected by the non-condensing data recording face becomes a noise element when tracking control is to be provided, and will cause the tracking control to become unstable.

Figure 14:
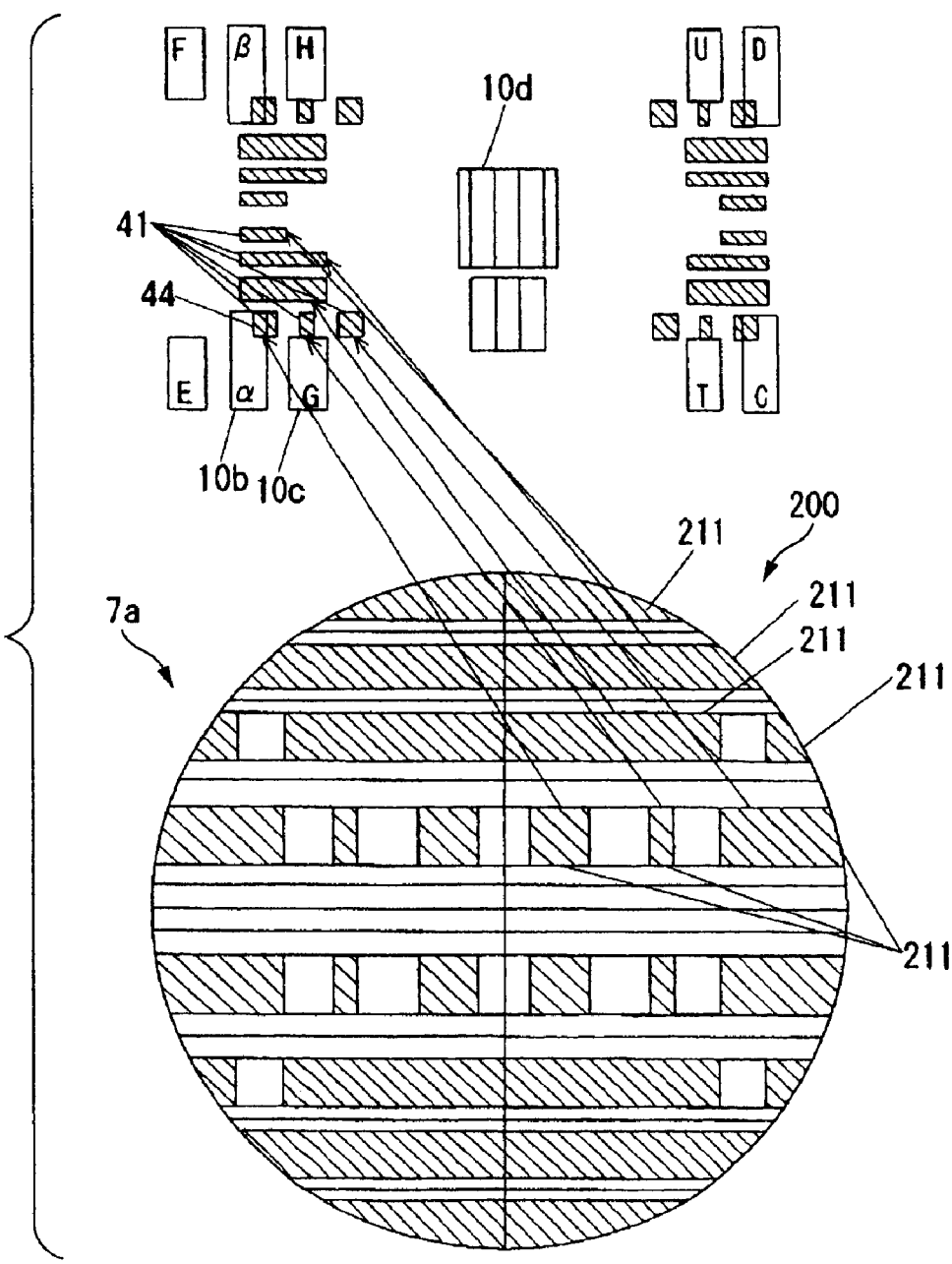
FIG. 14 is a diagram showing the state for the first embodiment wherein, when light has been reflected by an L1 layer, which is a non-condensing face, and has been separated into light fluxes by the main tracking areas of the DVD hologram, the light fluxes enter the light-receiving sensor.
Figure 15:
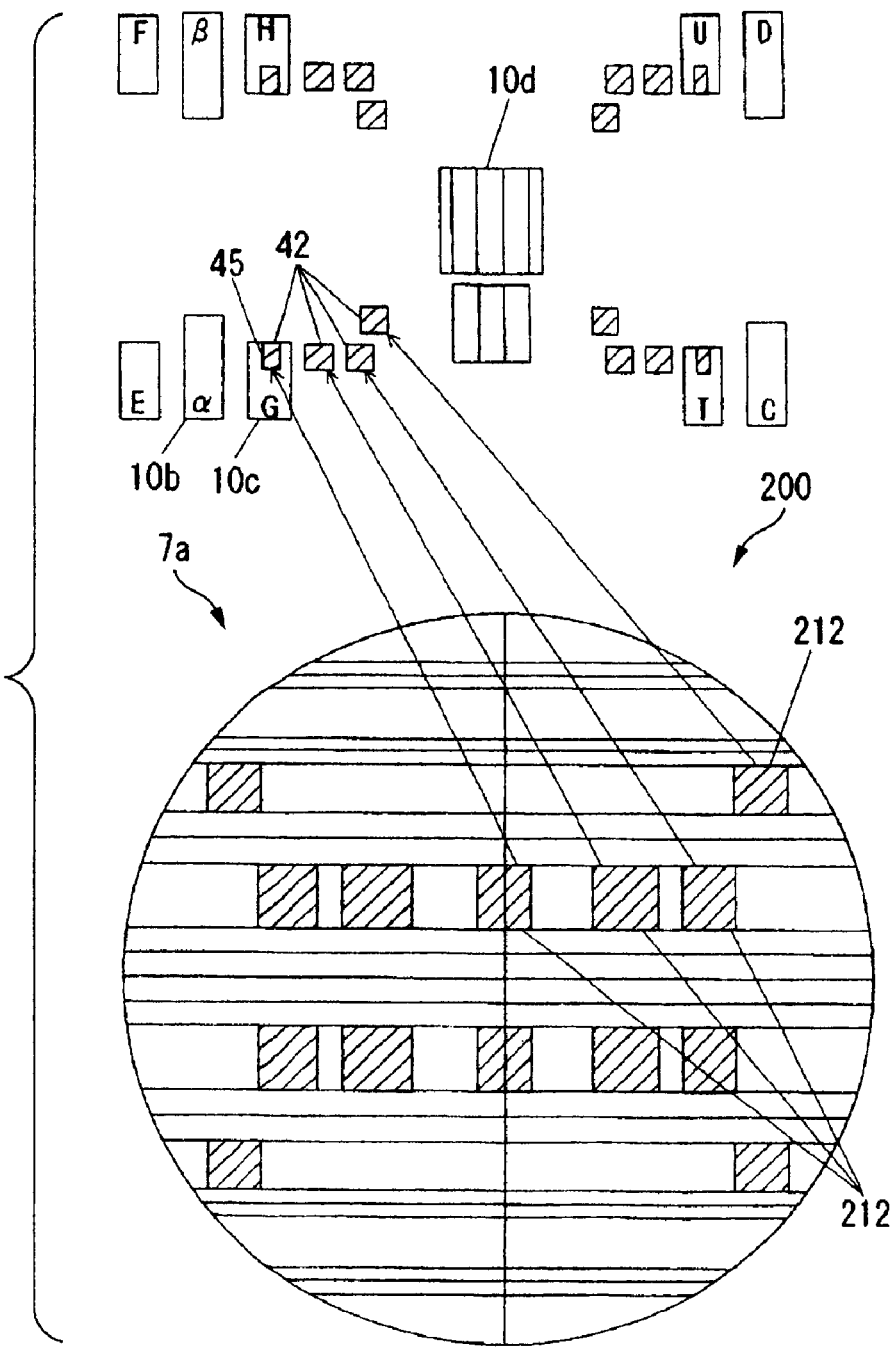
FIG. 15 is a diagram showing the state for the first embodiment wherein, when light has been reflected by the L1 layer, which is a non-condensing face, and has been separated into light fluxes by the sub-tracking areas of the DVD hologram, the light fluxes enter the light-receiving sensor.

In FIG. 14, the laser beam reflected by the L1 layer 9b, which is a non-condensing face, is separated in the main tracking areas 211 of the area 200. When the light enters the light-receiving sensor 10, instead of being condensed at one point, the light is scattered as spots 41 in the non-focused state. The incident positions of the light are between the main tracking light detection faces 10b and the DVD focus light detection face 10d. The individual spots 41 correspond to the main tracking areas 211, and the position of the spot 41 that corresponds to the center of the DVD hologram 7a is substantially the position of the spot 27 in FIG. 10. When a light flux is separated in the main tracking area 211 that is nearest the center in the radial direction of the DVD hologram 7a and that is nearest the center in the tangential direction of the DVD hologram 7a, this light flux is transmitted as a spot 44 to the main tracking light detection face 10b. Similarly, in FIG. 15, when a laser beam is reflected by the L1 layer, which is a non-condensing face, the reflected light is separated in the sub-tracking areas 212 of the area 200. Then, instead of being condensed at one spot, separated light fluxes scatter and enter the light-receiving sensor 10 as spots 42 in the non-focused state. The incident positions are between the sub-tracking light detection faces 10c and the DVD focus light detection face 10d. The individual spots 42 correspond to the sub-tracking areas 212. The position of the spot 42 that corresponds to the center of the DVD hologram 7a is substantially the position of the spot 27a in FIG. 11. Further, when a light flux is separated in the sub-tracking area that is nearest the center in the radial direction of the DVD hologram 7a and that is nearest the center in the tangential direction of the DVD hologram 7a, this light flux enters, as a spot 45, the sub-tracking light detection face 10c.

Figure 16:
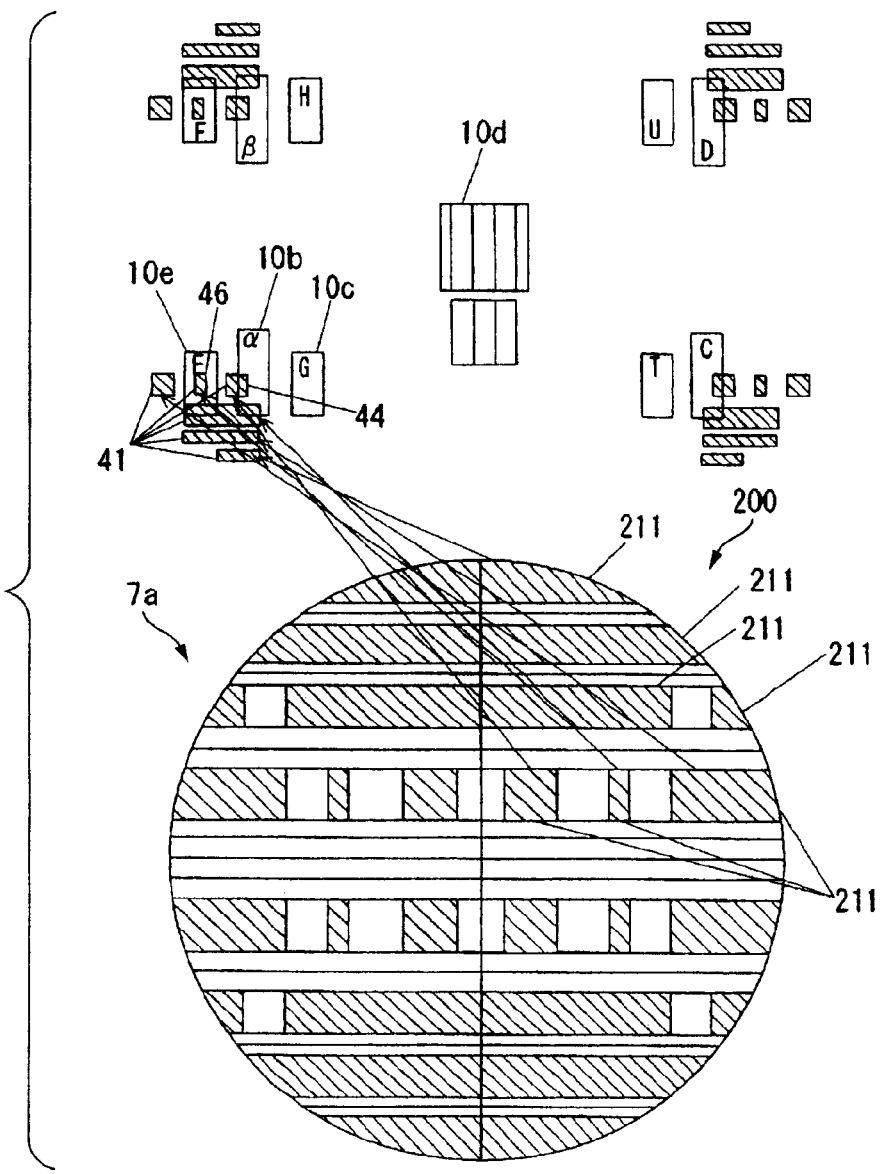
FIG. 16 is a diagram showing the state for the first embodiment wherein, when light has been reflected by an L0 layer, which is a non-condensing face, and has been separated into light fluxes by the main tracking areas of the DVD hologram, the light fluxes enter the light-receiving sensor.
Figure 17:
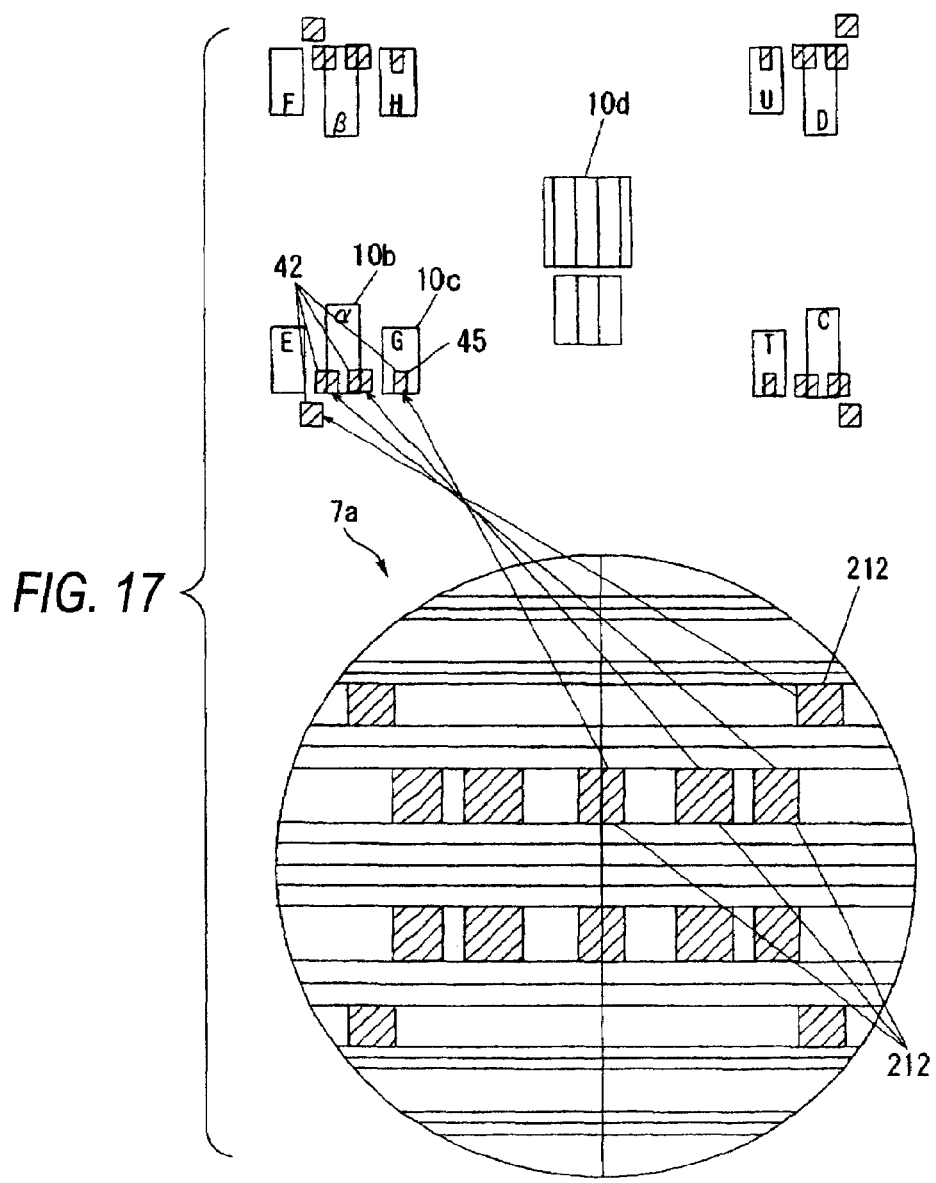
FIG. 17 is a diagram showing the state for the first embodiment wherein, when light has been reflected by the L0 layer, which is a non-condensing face, and has been separated into light fluxes by the sub-tracking areas of the DVD hologram, the light fluxes enter the light-receiving sensor.

On the other hand, while referring to FIG. 16, a laser beam reflected by the L0 layer, which is a non-condensing face, is separated in the main tracking area 211 of the area 200. And instead of being condensed at one spot, the separated light fluxes scatter and enter the light-receiving sensor 10 as spots 41 in the non-focused state. The incident positions are opposite the DVD focus light detection faces 10d. Further, when a light flux is separated in the main tracking area 211 that is nearest the radial center of the DVD hologram 7a and that is nearest the tangential center of the DVD hologram 7a, this light flux enters the main tracking light detection face 10b as a spot 44. Further, when a light flux is separated in the main tracking area 211 that is closest nearest the radial center of the DVD hologram 7a and that is second nearest the tangential center of the DVD hologram 7a, the light flux enters, as a spot 46, the tangential center portion of the CD sub-tracking light detection face 10e. Similarly, while referring to FIG. 17, when a laser beam reflected by the L0 layer, which is a non-condensing face, is separated in the sub-tracking areas 212 of the area 200, instead of being condensed at one point, the separated light fluxes scatter and enter, as spots 42, the light-receiving sensor 10 in the non-focused state. The incident positions are opposite the DVD focus light detection face 10d. The individual spots 42 correspond to the sub-tracking areas 212. The position of the spot 42 that corresponds to the center of the DVD hologram 7a is substantially the position of the spot 27a in FIG. 11. And when a light flux is separated in the sub-tracking area that is nearest the radial center of the DVD hologram 7a and that is nearest the tangential center of the DVD hologram 7a, the light flux enters the sub-tracking light detection face 10c as a spot 45.

Figure 18:
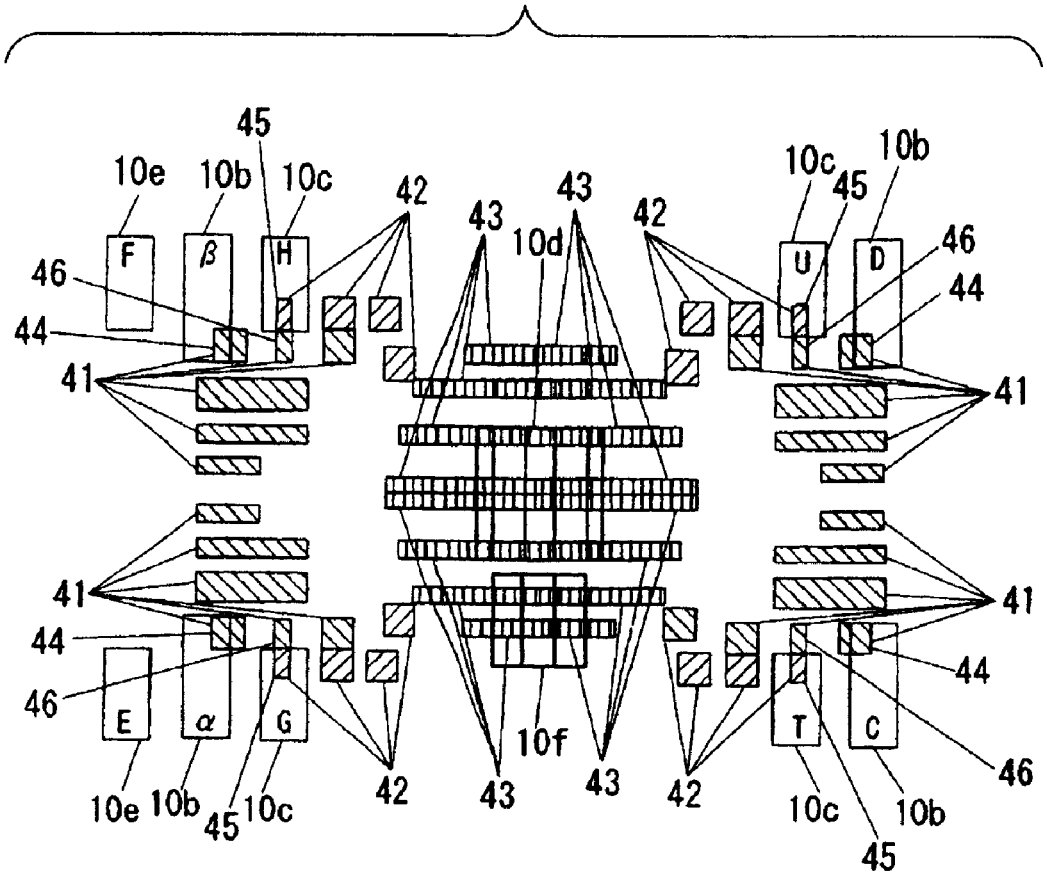
FIG. 18 is a diagram showing the incident position, on the light-receiving sensor, of a laser beam that has been reflected by the L1 layer, which is a non-condensing face, according to the first embodiment.
Figure 18:
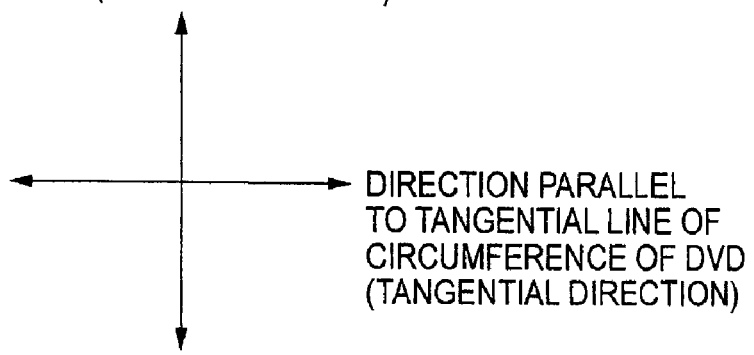

FIG. 18 is a diagram showing the incident positions, on the light-receiving sensor, of the laser beam that has been reflected by the L1 layer, which is a non-condensing face, for the first embodiment. The reflection state corresponds to that shown in FIG. 13A. The positions shown in FIGS. 14 and 15 at which the laser beam enters the light-receiving sensor 10 are also shown in FIG. 18. FIG. 19 is a diagram showing the incident positions, on the light-receiving sensor, of the laser beam that has been reflected by the L0 layer, which is a non-condensing face for the first embodiment. The reflection state corresponds to that shown in FIG. 13B. The positions shown in FIGS. 16 and 17 at which the laser beam enters the light-receiving sensor 10 are also shown in FIG. 19. For both the laser beam 40 reflected by the L1 layer 9b, which is a non-condensing face, and the laser beam 40 reflected by the L0 layer 9a, which is also a non-condensing face, light fluxes obtained through the main tracking areas 111, 211, 311 and 411 enter the light-receiving sensor 10 as the spots 41. The light fluxes separated in the focus areas 121, 122, 221, 222, 321, 322, 421 and 422 are transmitted to the light-receiving sensor 10 as spots 43. As for the spots 41, the incident position for the case wherein the laser beam has been reflected by the L1 layer 9b, and the incident position for the case wherein the laser beam is reflected by the L0 layer 9a are symmetrical at the spot 27 in FIG. 9, whereat the laser beam reflected by the condensing face is transmitted to the light-receiving sensor 10. Furthermore, as for the spots 42, the incident position for the case wherein the laser beam has been reflected by the L1 layer 9b, and the incident position for the case wherein the laser beam is reflected by the L0 layer 9a are symmetrical at the spot 27a in FIG. 9, whereat the laser beam reflected by the condensing face is transmitted to the light-receiving sensor 10.

In addition, a distance between the L0 layer 9a and the L1 layer 9b of the DVD 9 should be varied, or the refractive index for the entire DVD 9 will not be consistent. In this case, a light flux that passes through near the center of the DVD hologram 7a enters the light-receiving sensor 10 at an almost fixed position, but a light flux that passes through a position at a distance from the center enters at a position that fluctuates greatly. Therefore, it is very difficult for the entry, of the spots 41 and 42, into the light detection faces 10a to be prevented. Therefore, it is necessary, for the generation of the tracking error signal TES, that the affects produced by the spots 41 and 42 be minimized. Especially, since there are several amplifiers, provided for a detection circuit, that are connected to the sub-tracking light detection faces 10c and the CD sub-tracking light detection faces 10e in order to satisfy constants k1 and k2, the affects produced by the spots 41 and 42 are very great. Therefore, when the tracking error signal TES, generated by the spots 41 and 42 that enter the light detection faces 10a, should still be well-balanced while taking k1 into account, i.e., when the tracking error signal TES is substantially set to 0, the affects produced by the spots 41 and 42 can be minimized. That is, a constant ratio is maintained between the quantity of light received by the main tracking light detection faces 10b and the sum of the quantities of the light received by the sub-tracking light detection faces 10c and the light received by the CD sub-tracking light detection faces 10e. When for a DVD the light-receiving sensor 10 is not dedicated, or when the sub-tracking light detection faces 10c are not electrically connected to the CD sub-tracking light detection faces 10e, the following equation is established. That is, a fixed ratio is maintained between the quantity of light received by the main tracking light detection faces 10b and the quantity of light received by the sub-tracking light detection faces 10c. Further, it is preferable that this state be maintained while taking into account variances of the DVD 9 having the two layer data recording face, or discrepancies in the optical system of the optical pickup device 20. In other words, the tracking error signal TES, generated using the spots 41 and 42, is represented as follows.

$$TES=(IC+I\alpha)-(ID+I\beta)-k1\{(IG+IT)-(IH+IU)\}=*0$$

Thus, the main tracking light detection face 10b is so arranged that predetermined parts of the spots 41 enter the main tracking light detection face 10b. Similarly, the sub-tracking light detection face 10c is so arranged that predetermined parts of the spots 42 enter the sub-tracking light detection face 10c. Further, the DVD focus light detection face 10d is so arranged that parts of the spots 43 enter the DVD focus light detection face 10d.

On the other hand, the light detection faces 10a are so arranged that the spots 41 and 42 do not enter the main tracking light detection faces 10b, the sub-tracking light detection faces 10c and the DVD focus light detection faces 10d, which are other than the predetermined main tracking light detection faces 10b and the predetermined sub-tracking light detection faces 10c. In order to provide this arrangement, for the light reflected by the condensing face, the incident positions of light fluxes separated by the main tracking areas 111, 211, 311 and 411 are radially shifted from the incident positions for light fluxes separated by the sub-tracking areas 112, 212, 312 and 412. And for light reflected by a non-condensing face, the incident positions of the light fluxes are shifted in the same manner. In this way, the entry into the light detection faces 10a of unnecessary light fluxes can be prevented. Further, when light fluxes have been separated by the tracking areas 113, 213, 313 and 413, which are located in the peripheral portion in the radial direction of the DVD hologram 7a, these light fluxes are transmitted outside the light detection faces 10a of the light-receiving sensor 10. For a light flux that passes through the area near the end of the DVD hologram 7a, the incident position fluctuates greatly. Therefore, when a light flux that originally includes many fluctuation factors is guided outside the light detection faces 10a of the light-receiving sensor 10, the quantities of the light received by the main tracking light detection faces 10b and the light received by the-sub-tracking light detection faces 10c can be stably balanced. On the other hand, a light flux separated by the area near the end of the DVD hologram 7a enters the light-receiving sensor 10 at a distance from the spot 27 or 27a. Thus, this light flux is easily guided outside the light detection faces 10a. Moreover, the light detection faces 10a are so arranged that the spots 43 will not enter the main tracking light detection faces 10b, the sub-tracking light detection faces 10c and the CD sub-tracking light detection faces 10e.

Furthermore, although not shown, an optical system is so arranged that when a laser beam is not diffracted by the DVD hologram 7a and passes through as 0-order light, this light is prevented from entering the main tracking light detection faces 10b and the sub-tracking light detection faces 10c. Further, the light detection faces 10a are so arranged that a laser beam that is diffracted as −1-order light by the DVD hologram 7a is prevented from entering the DVD focus light detection faces 10d, the main tracking light detection faces 10b and the sub-tracking light detection faces 10c. Further, spots 41 having almost the same light quantity are formed on the α, β, C and D main tracking light detection faces 10b, and spots 42 having almost the same light quantity are formed on the G, H, T and U sub-tracking light detection faces 10c. In addition, spots 41 having almost the same light quantity are formed on the E and F CD sub-tracking light detection faces 10e. Therefore, a constant ratio is obtained between the quantity of light received by the main tracking light detection face 10b and the quantity of light received by the sub-tracking light detection face 10c, and while taking k1 into account, the tracking error signal TES becomes almost 0. In order to obtain this configuration, (α, G, E), (β, H, F), (C, T), (D, U) and (B11, A11, B12, A12, B13) of the light detection faces 10a are located at a distance from each other. Therefore, as previously described, the light fluxes of the laser beam transmitted by the DVD hologram 7a intersect each other, and enter the corresponding, diagonally located light detection faces 10a. In this manner, blocking of part of the light fluxes along the optical path is prevented.

As described above, the spots 44 are formed by light fluxes that are separated in the main tracking areas 111, 211, 311 and 411 that are nearest the center of the DVD hologram 7a in the radial direction and that are nearest the center of the DVD hologram 7a in the tangential direction. For the spots 44, both light reflected by the L1 layer 9b and light reflected by the L0 layer 9a are transmitted to the main tracking light detection faces 10b. The spots 45 are formed by light fluxes that are separated in the sub-tracking areas 112, 212, 312 and 412 that are nearest the center of the DVD hologram 7a in the radial direction and that are nearest the center of the DVD hologram 7a in the tangential direction. For the spots 45, both the light reflected by the L1 layer 9b and the light reflected by the L0 layer 9a are transmitted to the sub-tracking light detection faces 10c. The spots 46 are formed by light fluxes that are separated in the main tracking areas 111, 211, 311 and. 411 that are nearest the center of the DVD hologram 7a in the radial direction and that are nearest the center of the DVD hologram 7a in the tangential direction. For the spots 46, only the light reflected by the L0 layer 9a is transmitted to the center portion of the CD sub-tracking light detection face 10e in the tangential direction. As described above, the spots 44 are formed by light fluxes that are separated in the main tracking areas 111, 211, 311 and 411 that are nearest the center of the DVD hologram 7a, while the spots 45 are formed by light fluxes that are separated in the sub-tracking areas 112, 212, 312 and 412 that are nearest the center of the DVD hologram 7a. Therefore, while there may be a variance in the DVD 9, the incident positions of the spots 44 and 45 are almost consistent, so that these positions are seldom outside the main tracking light detection faces 10b and the sub-tracking light detection faces 10c. According to this structure, the spots 46 enter the center of the CD sub-tracking light detection faces 10e in the tangential direction. Therefore, when there is but little variance in a DVD 9 having a data recording face formed of a plurality of layers, the spots 46 are appropriately located in the CD sub-tracking light detection faces 10e. Thus, a tracking control signal can be stably obtained.

As for light reflected by a non-condensing data recording face of the DVD 9, it is important that, when the light passes through a specific area among the tracking areas 113, 213, 313 and 413, that the light enter the main tracking light detection face 10b, and that, when the light passes through another area among the tracking areas 113, 213, 313 and 413, the light enters the sub-tracking light detection face 10c. For example, assume that light reflected by a non-condensing data recording face of a DVD 9 enters only the main tracking light detection faces 10b. When the incident position of the light flux is shifted in the radial direction, due to a variance in the DVD 9, which has a data recording face formed of a plurality of layers, or a variance in the optical system of the DVD 9, the quantity of light fluxes that enter the main tracking light detection face 10b is changed. However, the quantity of light received by the main tracking light detection face 10b is unchanged. Therefore, for light reflected by the non-condensing data recording face of the DVD 9, the balance between the output of the main tracking light detection face 10b and the output of the sub-tracking light detection face 10c is lost. However, when light fluxes are transmitted to both the main tracking light detection face 10b and the sub-tracking light detection face 10c, the quantities of light received by the main tracking light detection face 10b and by the sub-tracking light detection face 10c are changed at the same time, due to the variance in the DVD 9. Thus, the loss in balance for the outputs of the main tracking light detection face 10b and the sub-tracking light detection face 10c can be prevented.

When, as in the first embodiment, the sub-tracking light detection face 10c and the CD sub-tracking light detection face 10e are electrically connected, reflected light should be considered in the following manner. That is, for light reflected by the non-condensing data recording face of the DVD 9, it is important that, when light passes through a specific area of the tracking areas 113, 213, 313 and 413 that the light enter the main tracking light detection face 10b, and that, when the light passes through another area of the tracking areas 113, 213, 313 and 413 the light enter either the sub-tracking light detection area 10c or the CD sub-tracking light detection area 10e. Thus, it is possible to prevent a loss of balance between the output of the main tracking light detection face 10b and the sum of the outputs of the sub-tracking light detection face 10c and the CD sub-tracking light detection face 10e.

The width of a spot 44 in the radial direction is defined as being equal to or smaller than a difference in the length, in the radial direction, between the main tracking light detection face 10b and the sub-tracking light detection face 10c. As a result, when a laser beam is reflected by the non-condensing L1 layer 9b, light fluxes are passed through the main tracking areas 111, 211, 311 and 411 nearest the center of the DVD hologram 7a in the radial direction. These light fluxes that spread to a widthwise limit in the radial direction can be received as the spots 44 on the main tracking light detection faces 10b. At the same time, the spots 41 in the same row as the spots 44 can be prevented from entering the sub-tracking light detection faces 10c. Further, the widths of the spots 45 in the radial direction are substantially the same as those of the spots 44, and as previously described, a difference in the incident positions in the radial direction of the spots 27 and the spots 27a is almost equal to the difference in the lengths of the main tracking light detection faces 10b and the sub-tracking light detection faces 10c. Thus, when light is reflected by the non-condensing L1 layer 9b, light fluxes pass through the sub-tracking areas 112, 212, 312 and 412 that are nearest the center of the DVD hologram 7a in the radial direction. These light fluxes that spread to the widthwise limit in the radial direction can be received as the spots 45 on the sub-tracking light detection faces 10c. Similarly, when light is reflected by the non-condensing L0 layer 9a, light fluxes are passed through the sub-tracking areas 112, 212, 312 and 412 that are nearest the center of the DVD hologram 7a in the radial direction. In this case, these light fluxes that spread to the widthwise limit in the radial direction can be received as the spots 45 on the sub-tracking light detection faces 10c.

In FIG. 19, the spots 42 arranged in the same row as the spots 45 are transmitted to the main tracking light detection faces 10b. However, while there is a variance in the DVD 9, the quantity of light received on the main tracking light detection face 10b is substantially unchanged. Further, a part of the spot 42 on the row adjacent to the spots 44 is transmitted at the same time to the main tracking light detection face 10b and the CD sub-tracking light detection face 10e. However, in this case, when a variance is present in the DVD 9 and the position of the spot 42 is shifted, the ratio of the quantities is still almost unchanged between the light received by the main tracking light detection face 10b and the light received by the sub-tracking light detection face 10e.

As described above, for light reflected by the non-condensing data recording face, without being adversely affected by the variance in the DVD 9, a fixed ratio is substantially maintained between the quantity of light received by the main tracking light detection face 10b and the sum of the quantities of light received by the sub-tracking light detection face 10c and the light received by the CD sub-tracking light detection face 10e. This is applicable for light reflected by the L1 layer 9b, which is a non-condensing face, as shown in FIG. 18, or for light reflected by the L0 layer 9a, which is a non-condensing face, as shown in FIG. 19.

Since the main tracking light detection face 10b is extended in the radial direction, incident light fluxes may enter at a plurality of condensing points, instead of being condensed at a single point, or may be condensed linearly. Then, the entry of the spots 41 and 42 at the main tracking light detection faces 10b can be efficiently avoided, or a value, almost of 0, can be easily maintained for the tracking error signal TES that is generated using the spots 41 and 42. For this purpose, the lengths of the main tracking light detection faces 10b and the sub-tracking light detection faces 10c may also be arbitrarily designated. Further, the distribution of the spots 41 and 42 will be broader or narrower, depending on the optical magnification. Thus, it is important that, by using this technique, the affect on the tracking error signal TES be minimized. Furthermore, when extra output points for the light-receiving sensor 10 are available, the outputs of the main tracking light detection faces 10a and the sub-tracking light detection faces 10c may be even further separated. Thus, the influence of the spots 41 and 42 on the tracking error signal can be reduced.

It should be noted that, when a reproduction signal RF includes information concerning the edge of a recording mark in the direction of the recording mark row, jitter can be improved. The reproduction signal RF is defined as follows.

RF=IA11+IA12+IB11+IB12+IB13+Iα+Iβ+IC+ID. Actually, it is preferable that the outputs of the sub-tracking light detection face 10c and the CD sub-tracking light detection face also be added. However, because of limitations in the size of the light-receiving sensor 10, the above equation is used as defined. According to the first embodiment, the ends of the DVD hologram 7a in the tangential direction are allocated as the main tracking areas 111, 211, 311 and 411, and light fluxes that enter the main tracking light detection faces 10b are obtained as a reproduction signal RF. The reproduction signal RF, therefore, includes a preferable jitter.

Figure 20:
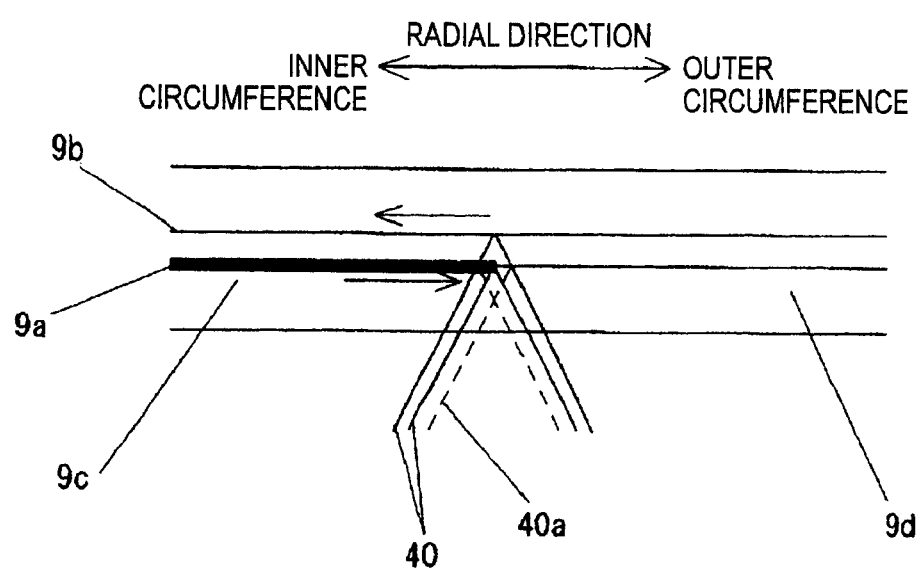
FIG. 20 is a diagram showing the status of an optical disk according to the first embodiment when recording is performed for the L0 layer and is then initiated for the L1 layer.
Figure 21:
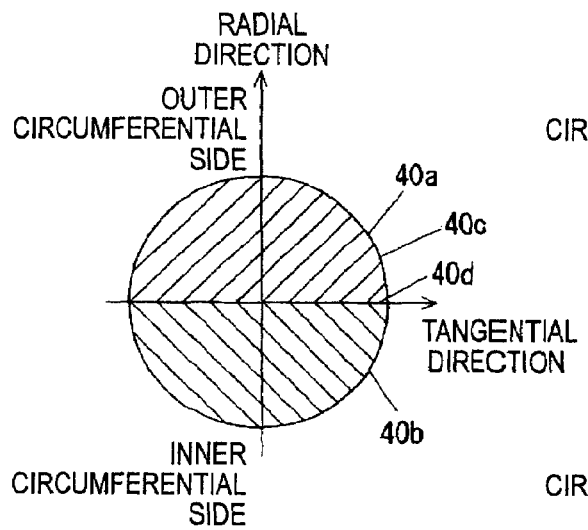
FIG. 21A is a diagram showing the light quantity distribution of a laser beam reflected by the L0 layer for a case wherein recording is performed for the L0 layer and is then initiated for the L1 layer, and showing an example wherein recording was just initiated for the L1 layer and a laser beam was emitted to the L1 layer at the boundary between the recording area and the non-recording area of the L0 layer.
FIG. 21B is a diagram showing an example wherein the laser beam was emitted to the L1 layer at a portion slightly inside the recording area in the L0 layer.
FIG. 21C is a diagram showing an example wherein the laser beam was emitted to the L1 layer at a portion completely included in the recording area of the L0 layer.
FIG. 21D is a diagram showing the status of the DVD hologram for the example in FIG. 21B.
Figure 21:
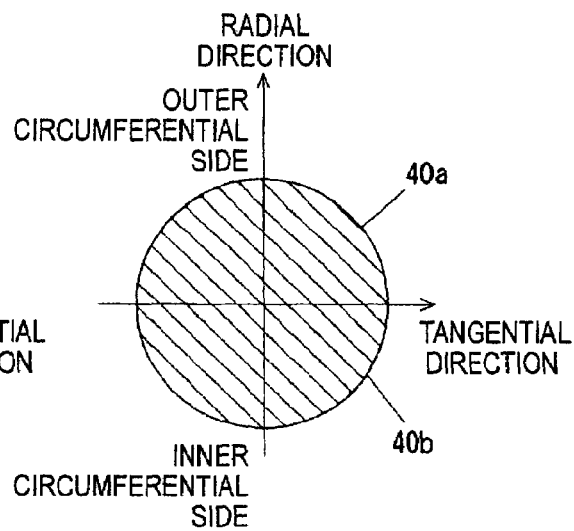
Figure 21:
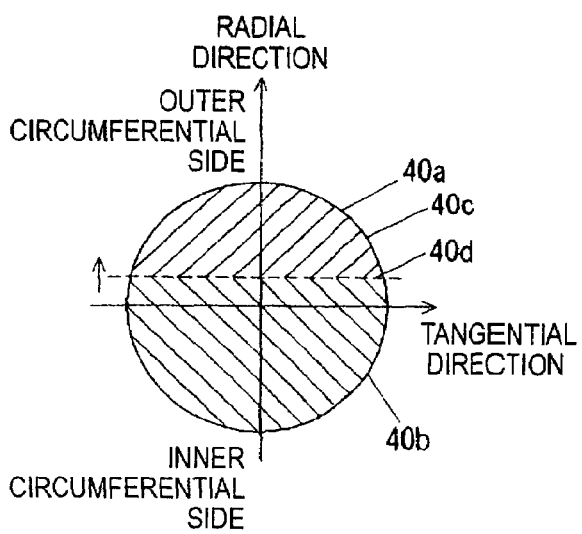
Figure 21:
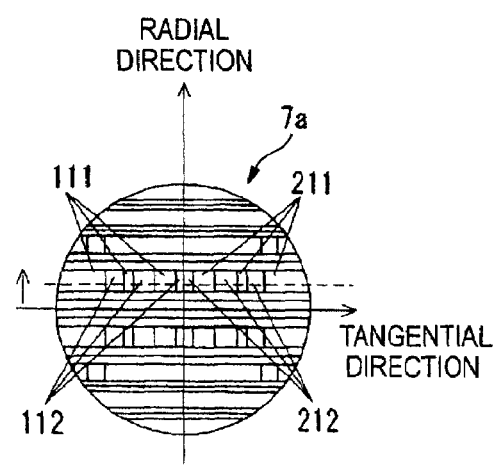

An explanation will be given for an example wherein data are recorded on the L0 layer 9a of a DVD having a two layer data recording face, and recording is then initiated for the L1 layer 9b. FIG. 20 is a diagram showing the status of an optical disk when recording is performed for the L0 layer and then for the L1 layer of the first embodiment. FIG. 21A is a diagram showing a distribution for the light quantity of a laser beam reflected by the L0 layer when data have been recorded for the L0 layer and recording is then initiated for the L1 layer, in accordance with the first embodiment, and showing an example wherein, immediately after recording was initiated for the L1 layer, a laser beam is emitted to the L1 layer from the boundary between the recording area and the non-recording area of the L0 layer. FIG. 21B is a diagram showing a case wherein a laser beam is emitted to the L1 layer from a portion slightly inside the recording area of the L0 layer. FIG. 21C is a diagram showing a case wherein a laser beam is emitted to the L1 layer from a portion completely inside the recording area of the L0 layer. And FIG. 21D is a diagram showing the status of a DVD hologram in the case shown in FIG. 21B.

Generally, when data are to be recorded on a DVD 9 having a two layer data recording face, recording is started at the inner side of the L0 layer 9a and is continued until the outermost recordable side is reached. Then, the focus jumps to the L1 layer 9b, and recording is again started from the outermost side to the innermost side of the L1 layer 9b. During the recording for the L0 layer 9a, light reflected by the L1 layer 9b, which is a non-condensing face, includes half of the recording area 9c of the L0 layer 9a on the inner side and half of the non-recording area 9d on the outer side. The reflectance properties of the recording area 9c differ from the reflectance properties of the non-recording area 9d, and the boundary between these areas faces in the tangential direction.

When recording of the L0 layer 9a has ended and the focus has jumped to the L1 layer 9b, as shown in the distribution in FIG. 21A, light 40a, reflected by the non-condensing L0 layer 9a, includes half of the light 40b reflected by the recording area 9c of the L0 layer 9a on the inner side and the light 40c reflected by the non-recording area 9d on the outer side. A boundary 40d faces the in tangential direction. When recording is started toward the inner side, as shown in the distribution in FIG. 21B, the light 40a reflected by the non-condensing L0 layer 9a increases the content of the light 40b reflected by the recording area 9c on the inner side, and reduces the content of the light 40c reflected by the non-recording area 9d on the outer side. At this time, the boundary 40d still faces in the tangential direction. When the recording advances on the inner side, as shown in the uniform distribution in FIG. 21C, the light 40a reflected by the non-condensing L0 layer 9a includes only the light 40b reflected by the recording area 9c. The case wherein the reflected light 40a having the distribution shown in FIG. 21B enters the DVD hologram 7a is indicated by a broken line, in the tangential direction, shown in FIG. 21D. At this time, since the light is passing across the main tracking areas 111 and 211 and the sub-tracking areas 112 and 212, the division lines between the main tracking areas 111 and 211 and the sub-tracking areas 112 and 212 are parallel in the radial direction, and their widths in the radial direction are the same. Thus, the ratio of quantities of light received by the main tracking light detection face 10b and by the sub-tracking light detection face 10c is almost unchanged. Therefore, the offset of the tracking error signal TES is changed little due to the light 40a that is reflected by the non-condensing L0 layer 9a. Thus, in this case, the tracking error signal TES is also stable.

When, for example, the division lines between the main tracking areas 111 and 211 and the sub-tracking areas 112 and 212 are parallel in the tangential direction, the ratio of the quantities of light received by the main tracking light detection face 10b and light received by the sub-tracking light detection face 10c is greatly changed, depending on the position indicated by the broken line in FIG. 21D. Therefore, the tracking error signal TES is not stable.

However, when a laser beam is separated in the tracking areas 113, 213, 313 and 413 (in the first embodiment, the tracking areas farther than the tracking area third closest to the center of the DVD hologram 7a in the radial direction) located in the peripheral portion of the DVD hologram 7a in the radial direction, the obtained light fluxes do not enter either the main tracking light detection face 10b or the sub-tracking light detection face 10c. When the division lines that separate the main tracking areas 111, 211, 311 and 411 and the sub-tracking areas 112 and 212, 312 and 412 of the above tracking areas 113, 213, 313 and 413 are parallel in the tangential direction, the ratio of the light quantities is seldom changed, and the tracking error signal TES does not become unstable. As described above, it is preferable that the DVD hologram 7a be so designed that, for the light that is not condensed and reflected by the L0 layer 9a, the fixed ratio for the light quantities of the main tracking light detection face 10b and for the sub-tracking light detection face 10c can be obtained.

Further, while referring to FIG. 18, when light fluxes are separated in the tracking areas 113, 213, 313 and 413 that are nearest the center of the DVD hologram 7a in the radial. Direction, they enter both the main tracking light detection face 10b and the sub-tracking light detection face 10c. However, the light fluxes separated in the other tracking areas 113, 213, 313 and 413 do not enter the main tracking light detection faces 10b, the sub-tracking light detection faces 10c and the CD sub-tracking light detection faces 10e. In this case, even when the incident positions of the spots 41 and 42 are radially shifted a little due to the variance in the DVD 9 having a two layer data recording face or the variance in the optical system, the balance is almost unchanged between the quantity of light received by the main tracking light detection face 10b and light received by the sub-tracking light detection face 10c. Therefore, a stable state can be maintained. Further, when there is a balance loss between the light 40b reflected by the recording areas of the non-condensing face and the light 40c reflected by the non-recording area 9d, this unbalanced state appears as the light quantity distribution in the radial direction. Therefore, the balance between the output of the main tracking light detection face 10b and the quantity of light received by the sub-tracking light detection face 10c is almost unchanged. Thus, a stable state can be maintained. Further, as will be described later in a second embodiment of the invention, when a filter is also employed, this unbalanced state appears as the light quantity distribution in the radial direction. Therefore, since the balance is almost unchanged between the quantity of light received by the main light detection face 10b and the quantity of light received by the sub-tracking light detection face 10c, a stable state can be maintained.

It is preferable that the raised portions and the recessed portions be formed at a small pitch for the DVD hologram 7a, because the DVD focus light detection faces 10d and the main tracking light detection faces 10b can be arranged at a distance. In this embodiment, the pitch for the DVD hologram 7a is equal to or greater than 8 μm. As described above, the DVD hologram 7a permits a CD laser beam having a wavelength λ2 to pass. However, when the pitch is equal to or smaller than 9 μm, the transmittance of a laser beam having a wavelength λ2 is started lower, and when the pitch is equal to or smaller than 8 μm, the reduction in the light quantity of a CD is increased and usability is deteriorated.

As described above, according to the optical pickup device of the first embodiment, when data recording or data reproduction is to be performed by condensing a laser beam at a predetermined data recording face of an optical disk having a data recording face formed of a plurality of layers, the ratio can be a constant between the output of the main tracking light detection face and the output of the sub-tracking light detection face, by which light reflected by a portion other than the predetermined data recording face is received. Therefore, the offset can be minimized, while light reflected by a portion other than the data recording face is substantially canceled out as a signal used for tracking control. Thus, stable recording and reproduction can be performed for an optical disk having a data recording face formed of a plurality of layers.

Second Embodiment

Figure 22:
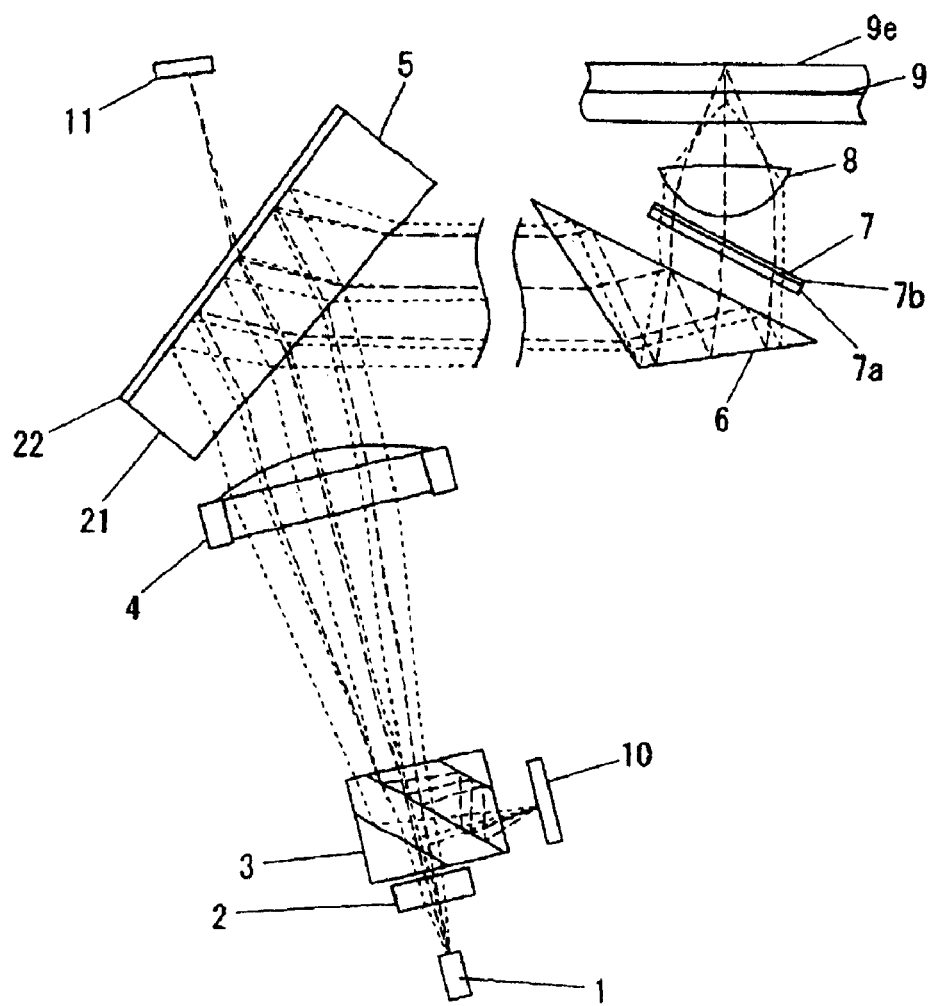
FIG. 22 is a diagram showing the structure of the optical system of an optical pickup device according to a second embodiment of the present invention.
Figure 23:
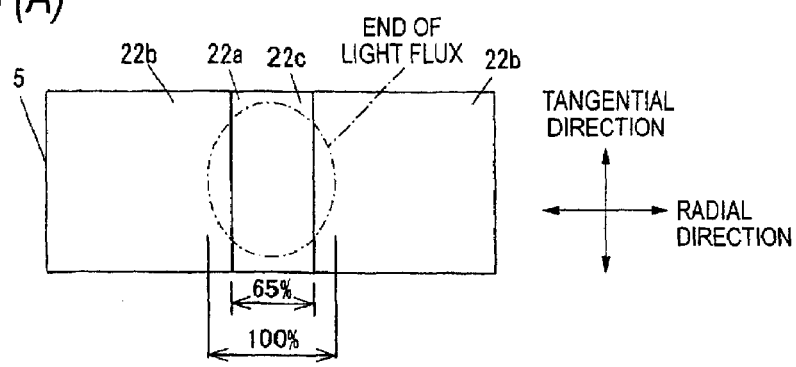
FIG. 23A is a diagram showing the structure of a beam splitter and an example shape for a filter according to the second embodiment.
FIG. 23B is a diagram showing another example for the filter.
FIG. 23C is a diagram showing the structure of the filter and the path of a laser beam.
Figure 23:
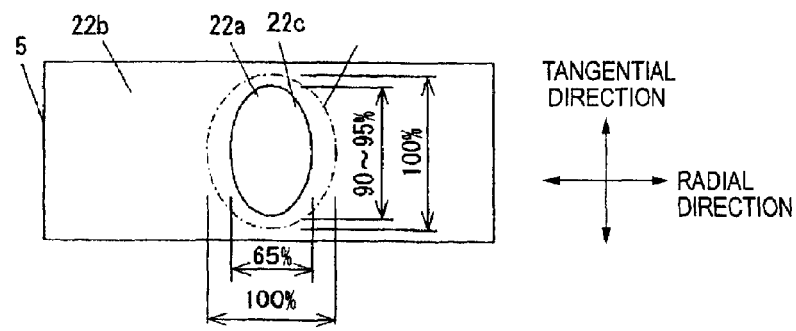
Figure 23:
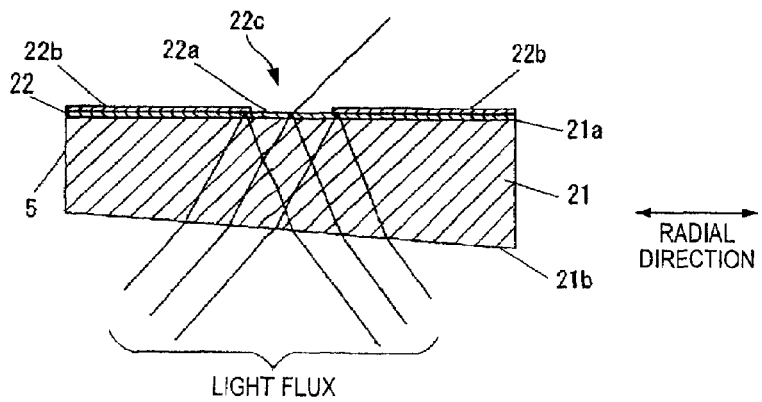

A second embodiment of the present invention will now be described while referring to the accompanying drawings. FIG. 22 is a diagram showing the structure of the optical system of an optical pickup device according to the second embodiment. FIG. 23A is a diagram showing an example shape of a filter for the structure of a beam splitter for the second embodiment. FIG. 23B is a diagram showing another example filter shape. FIG. 23C is a diagram showing the structure of the filter and a path for a laser beam. Since parts other than a beam splitter are the same as those for the first embodiment, no further explanation for them will be given.

The beam splitter 5 is so designed that a filter 22 is mounted on a face 21a of a light transmitting member 21. The face 21a does not face a light source 1. As well as in the first embodiment, the beam splitter 5 is either directly attached to a carriage 12 or is attached via a mounting member.

The light transmitting member 21 is made of optical glass or an optical plastic, and includes the face 21a and a face 21b that faces the light source 1. The face 21a and the face 21b are not parallel to each other and form an angle, for example, of about 1.1°, so as to prevent interference by light that passes through the light transmitting member 21. Further, in a case wherein the face 21a and the face 21b are perpendicular to a plane that includes a light axis, a light emission point whereat a DVD laser beam having a wavelength $\lambda 1$ is emitted, and a light emission point whereat a CD laser beam having a wavelength $\lambda 2$ is emitted, these faces 21a and 21b are not parallel, so that the astigmatism of laser beams, emitted at both light emission points that are not present along the light axis of the optical system, can be reduced. When the above described light interference and the astigmatism are not really problems, the face 21a and the face 22b should be arranged parallel to each other, so that the manufacturing costs can be reduced.

The filter 22 is formed on the face 21a of the light transmitting member 21. The filter 22 includes: a wavelength selection, polarized light separation film 22a, which is deposited on the face 21a of the light transmitting member 21; and a total reflection film 22b, which is deposited on the surface of the wavelength selection, polarized light separation film 22a in accordance with a predetermined light intensity distribution. The wavelength selection, polarized light separation film 22a is a dielectric, multilayer film having 28 to 48 layers, and is produced by alternately laminating films having a high refractive index and films having a low refractive index. Example films having a high refractive index are $TiO_2$, $Nb_2O_5$, $Ta_2O_5$ and $Al_2O_3$ and example films having a low refractive index are $SiO_2$ and $MgF_2$. The thicknesses of the individual films are 100 to 200 nm. The reflectance of the wavelength selection, polarized light separation film 22a corresponds to the laminated reflectance of the film having a high refractive index and the film having a low refractive index. For the second embodiment, the film characteristic of the wavelength selection, polarized light separation film 22a is so designed that, for example, the reflectance of P polarized light having a wavelength $\lambda 1$ is about 50%, the reflectance of S polarized light having a wavelength $\lambda 1$ is almost 100%, the reflectance of P polarized light having a wavelength $\lambda 2$ is about 90%, and the reflectance of S polarized light having wavelengths both of $\lambda 1$ and of $\lambda 2$ is almost 100%. However, these rates vary in accordance with the constants carried by the components of the optical system and the design constant of the optical system, and the optimal film characteristics differ, depending on the individual optical systems.

The total reflection film 22b is a dielectric multilayer film or a metallic film. When the total reflection film 22b is a dielectric multilayer film, the total reflection film 22b has 20 layers or less and is produced by alternately laminating a film having a high refractive index and a film having a low refractive index. Example filmshaving a high refractive index are $TiO_2$, $Nb_2O_5$, $Ta_2O_5$ and $Al_2O_3$, and example films having a low refractive index are $SiO_2$ and $MgF_2$. The thicknesses of the individual films are 100 to 200 nm. When the total reflection film 22b is a metallic film, the total reflection film 22b has only a single, metallic film layer. An example metallic film is Au, Ag, Al or Pt. In order to protect the metallic film, a protective film formed of a dielectric material, such as $SiO_2$, may be deposited on the surface of the metallic film. Further, so long as a required optical characteristic can be obtained, this protective film may be deposited, as the last layer for the wavelength selection, polarized separation film 22a, entirely across the wavelength selection, polarized light separation area 22a and the total reflection film 22b. Either this, or a film may be deposited across a portion that corresponds to the wavelength selection, polarized light separation film 22a and the total reflection film 22b. Further, to obtain the wavelength selection, polarized light separation film 22a, an area may be removed that is equivalent to the size of the total reflection film 22b, from the pertinent portion to the wavelength selection, polarized light separation film 22a. In this case, the total reflection film 22b must be formed of a dielectric layer that has the same composition and the same thickness as those for the wavelength selection, polarized light separation film 22a, and a necessary optical characteristic must be obtained.

At a position corresponding to the center of the light emitted by the light source 1, an area 22c of a predetermined size and having a predetermined shape is formed in which the total reflection film 22b is not deposited. As shown in FIGS. 23A and 23B, for the second embodiment, the area 22c is defined as an area near the light axis of the optical system. The film exposed in the area 22c is the wavelength selection, polarized light separation film 22a. As shown in FIG. 23A, when P polarized light having a wavelength $\lambda 1$, for the wavelength selection, polarized light separation film 22a, has a reflectance of about 50%, the area 22c is assigned as being within about 65% of the area in which light fluxes are distributed, in a direction that corresponds to the radial direction of the DVD 9. And the boundary between the area 22c and the total reflection film 22b is defined as a linear line in a direction that corresponds to the tangential direction. That is, the area 22c is formed like a thin rectangle. Furthermore, when the P polarized light having a wavelength $\lambda 1$ for the wavelength selection, polarized light separation film 22a has a reflectance of about 75%, it is preferable that the area 22c be located within 45% of the area wherein light fluxes are distributed in a direction that corresponds to the radial direction of the DVD 9. In addition, instead of the thin rectangular area, an elliptic area, which is located within about 90 to 95% of the area wherein light fluxes are distributed in a direction that corresponds to the tangential direction of the DVD 9, may be employed as the area 22c.

In the second embodiment, the face 21a and the face 21b of the light transmitting member 21 are substantially formed like a rectangle. However, these faces may be C chamfered or R chamfered. Further, so long as there are available the minimum areas required to enter light fluxes and to emit light fluxes, an arbitrary shape can be employed for the area, and an elliptic shape or a rounded-corner quadrilateral shape may be employed.

Figure 24:
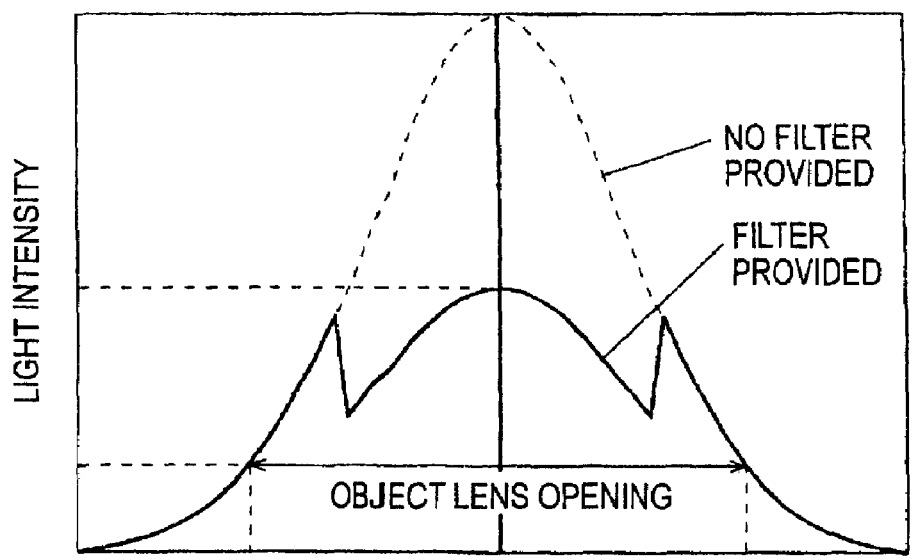
FIG. 24A is a graph showing a light intensity distribution, at the opening face of an object lens, of a laser beam that passes through the filter according to the second embodiment.
FIG. 24B is a graph showing a light intensity distribution at the recording face of an optical disk.
Figure 24:
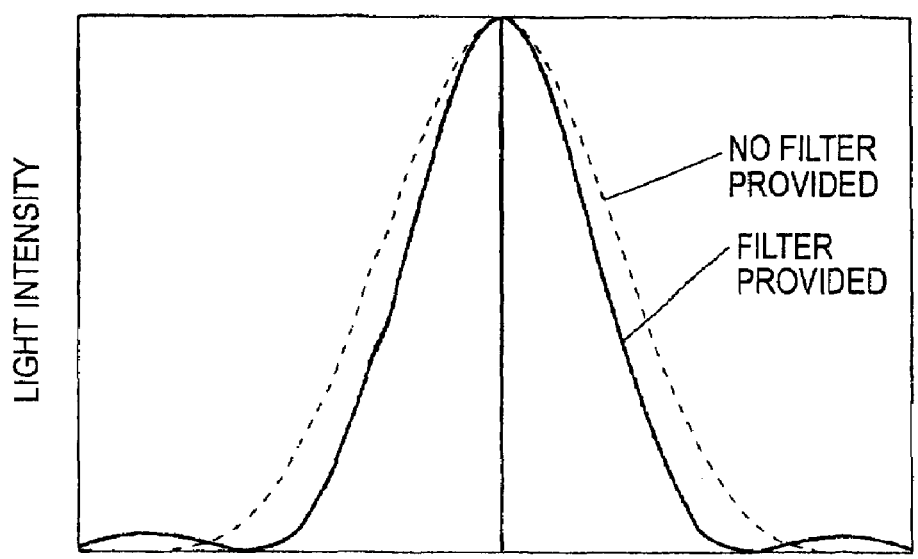

The operation of the filter 22 will now be described. FIG. 24A is a graph showing a light intensity distribution, at the opening face of an object lens, of a laser beam that passes through the filter 22 of the second embodiment. FIG. 24B is a graph showing a light intensity distribution for the recording face of an optical disk. A laser beam, which has been emitted by the light source 1 and has entered the beam splitter 5, passes through the light transmitting member 21 and enters the filter 22. In this case, this laser beam is P polarized light. In a case wherein the laser beam has a wavelength $\lambda 1$, as described above, when the laser beam enters the area 22c, which is the wavelength selection, polarized light separation film 22a, about 50% of the light is reflected. And when the laser beam has entered the total reflection film 22b, almost 100% of the light is reflected, and again passes through the light transmitting member 21 and is transmitted to the DVD 9. The laser beam is converted into condensed light by the object lens 8, and the condensed light is transmitted to the data recording face of the DVD 9. At this time, the laser beam has a light intensity distribution, as indicated by a solid line in FIG. 24A, where the center portion is dropped. When the laser beam having such a light intensity distribution is condensed on the data recording face of the DVD 9, as shown in FIG. 24B, the light intensity distribution becomes smaller, compared with when the filter 22 is not included. That is, the size of a spot for a laser beam to be converged on the data recording face of the DVD 9 can be reduced. This phenomenon is called a super resolution phenomenon. When the light intensity distribution at the opening face of the object lens 8 is optimized, in accordance with the optical system, a small, converged light spot can be obtained, and bulging, called a side lobe, in the peripheral portion can also be reduced. Therefore, the astigmatism at the converged spot on the DVD 9 can be reduced.

In a case wherein there is a laser beam having a wavelength $\lambda 2$, as described above, when a laser beam enters the area 22c, which is the wavelength selection, polarized light separation film 22a, about 90% of the light is reflected, and when the laser beam enters the total reflection film 22b, almost 100% of the light is reflected and again passes through the light transmitting member 21 and is transmitted to the CD 9e. That is, for a laser light having a wavelength $\lambda 2$, the light intensity is little reduced due to the wavelength selection, polarized light separation film 22a. Further, the laser beam is converted into converged light by the object lens 8, and the converged light is transmitted to the data recording face of the CD 9e. Therefore, the light intensity distribution at the opening face of the object lens 8 is similar to the distribution indicated by a broken line in FIG. 24A when a filter 22 is not provided. In addition, the light intensity distribution of the converged spot on the data recording face of the CD 9e is also similar to the distribution indicated by a broken line in FIG. 24B, when the filter 22 is not provided. Therefore, the use of the converged light spot for the CD 9e is efficient.

A laser beam reflected by the data recording face of the DVD 9 and a laser beam reflected by the data recording face of the CD 9e are S polarized light, and as described above, almost 100% of the light is reflected and is transmitted to the light-receiving sensor 10. That is, the light intensity distribution is unchanged. Further, the laser beam, which has passed through the wavelength selection, polarized light separation film 22a in the area 22c, is transmitted to the forelight monitor 11, and is used to provide control for the light quantity. Thus, the light can be efficiently employed.

According to the second embodiment, as described above, the filter 22 is securely mounted on the carriage 12. A DVD hologram 7a is attached, together with the object lens, to a lens holder 15 of an actuator, so that it is movable relative to the carriage 12. Therefore, when data are to be recorded on the DVD 9, or when data on the DVD 9 are to be reproduced, the center of the light intensity distribution of a laser beam that has passed through the area 22c of the filter 22 does not always match the center of the DVD hologram 7a. The shift in the center positions corresponds to the shift of the center of the light intensity distribution to enter the DVD hologram 7a. Furthermore, the light intensity distribution is changed, regardless of the direction. The DVD hologram 7a in the second embodiment is the same as that for the first embodiment.

When the shift in the center positions occurs in the tangential direction, the focus error signal FES is seldom adversely affected, because, as shown in FIG. 8, the focus areas 121, 122, 221, 222, 321, 322, 421 and 422 of the DVD hologram 7a are defined along the division lines in the tangential direction. Furthermore, the tracking error signal TES is seldom adversely affected by the shift in the center positions in the tangential direction, because the main tracking areas 111, 211, 311 and 411 and the sub-tracking areas 112, 212, 312 and 412 are separated along the division lines in the radial direction and are alternately arranged in the tangential direction.

When the shift in the center positions occurs in the radial direction, the focus error signal FES is seldom adversely affected, because, as shown in FIG. 8, the focus area pairs (121, 122), (221, 222), (321, 322) and (421, 422) and the tracking areas 113, 213, 313 and 413 are alternately arranged in the radial direction. Further, since the main tracking areas 111, 211, 311 and 411 and the sub-tracking areas 112, 212, 312 and 412 are separated along the division lines in the radial direction, and have the same width in the radial direction, the ratio of the light quantities is almost unchanged between the light received by the main tracking light detection faces 10b and the light received by the sub-tracking light detection faces 10c. Therefore, the tracking error signal TES is also seldom affected by the shifting of the center positions in the radial direction.

It is preferable that the DVD hologram 7a be symmetrical along a second division line 7f. Further, it is also preferable that the boundary portions between the area 22c of the filter 22 and the total reflection film 22b correspond to the focus areas 123, 223, 323 and 423 of the DVD hologram 7a, and that the peripheral portions between the area 22c and the total reflection film 22b correspond to the tracking areas 113, 213, 313 and 413. In this manner, the affect of a step difference on the reflectance of the filter 22 rarely appears during the tracking control procedure.

As described above., the optical pickup device 20 of the second embodiment includes the filter 22 that is fixed to the carriage 12. When the center of the light intensity distribution of the laser beam that passes through the area 22c of the filter 22 is shifted away from the center of the DVD hologram 7a, a tracking error signal TES and a focus error signal FES can be stably generated. Further, since the filter 22 is provided, the effect of an aberration that affects the converged spot on the DVD can be reduced, and the converged spot on the CD can be highly efficiently employed.

Third Embodiment

Figure 25:
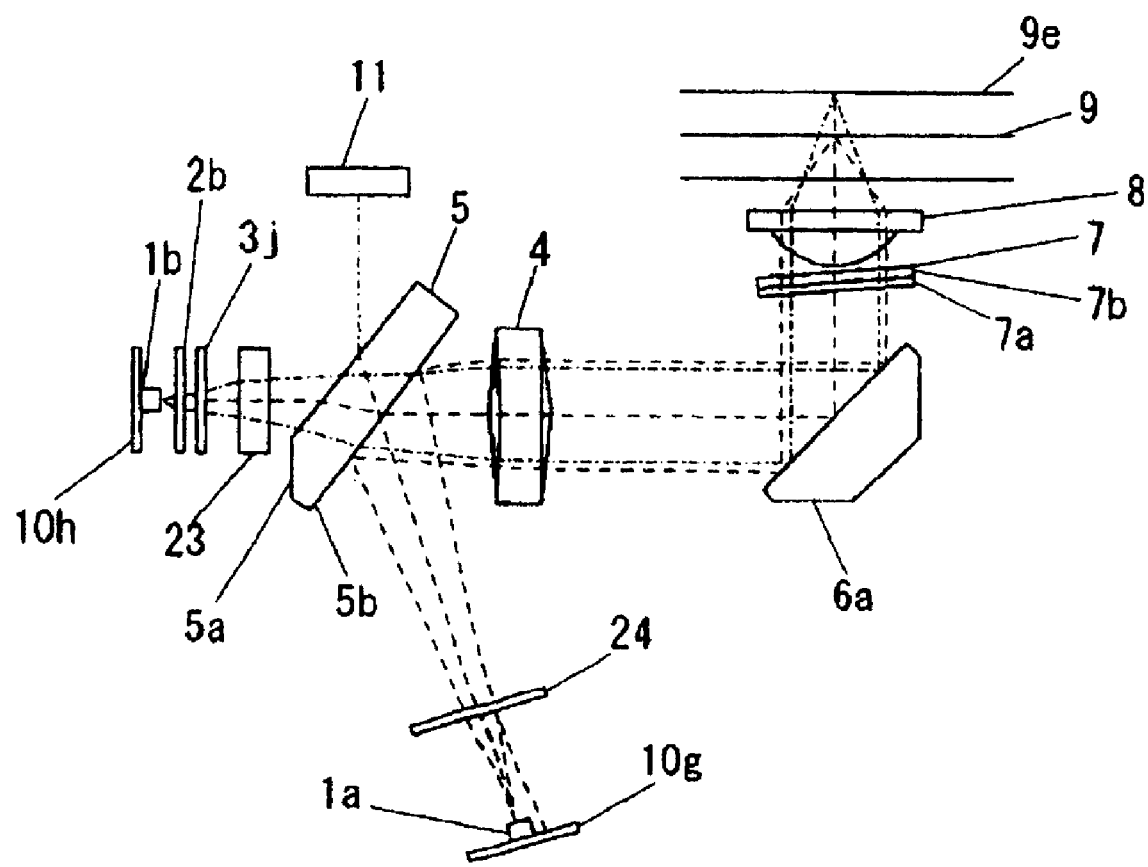
FIG. 25 is a diagram showing the structure of the optical system of an optical pickup device according to a third embodiment of the present invention.
Figure 26:
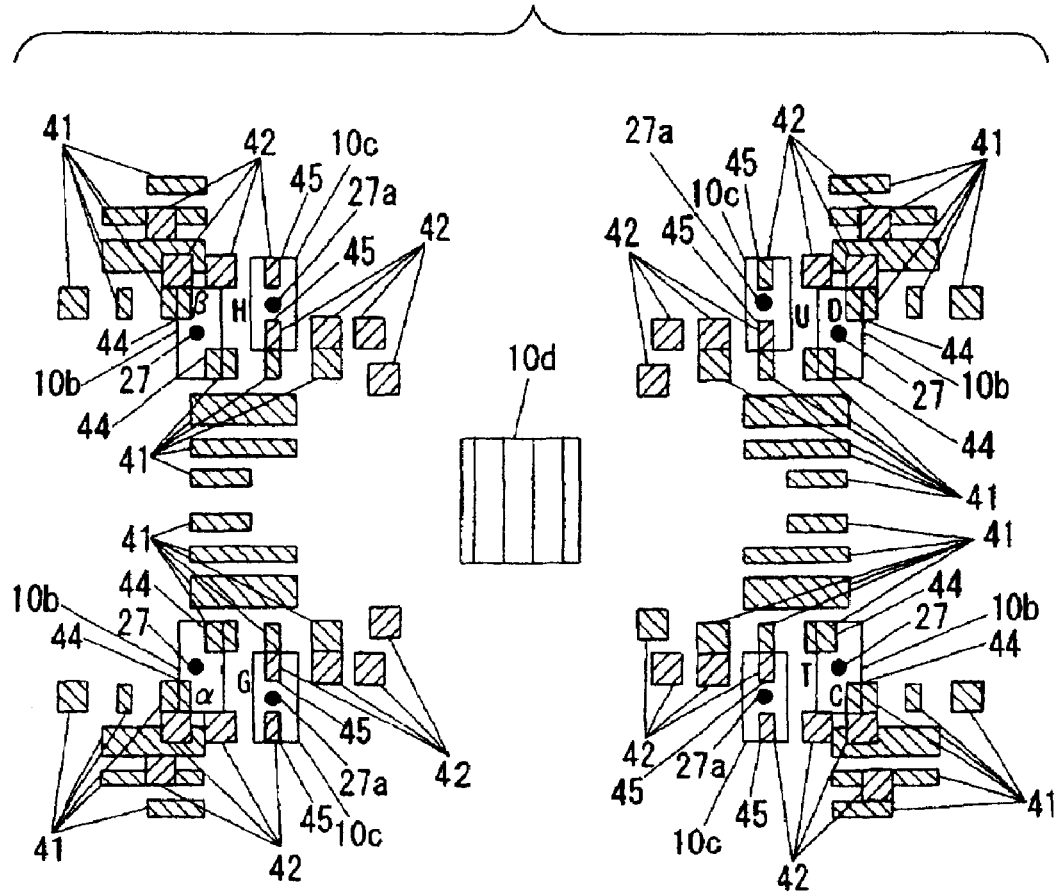
FIG. 26 is a diagram showing the arrangement of light detection faces of a DVD light-receiving sensor according to the third embodiment.
Figure 26:
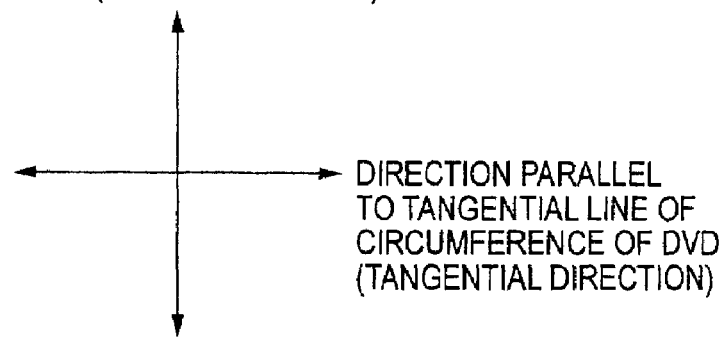

A third embodiment of the present invention will now be described while referring to the accompanying drawings. FIG. 25 is a diagram showing the structure of the optical system of an optical pickup device according to the third embodiment. FIG. 26 is a diagram showing the arrangement of the light detection faces of a DVD light-receiving sensor for the third embodiment. For an optical pickup device 20 in the third embodiment, a DVD light source 1a and a CD light source 1d are located at a distance from each other, and a DVD light-receiving sensor 10g and a CD light-receiving sensor 10h are separately prepared.

The semiconductor laser element of the DVD light source 1a is located on a substrate where light detection faces 10a of the DVD light-receiving sensor 10g are formed, so that a single package can be provided. The DVD light source 1a emits, to a DVD 9, a laser beam required for the performance, at the least, of data recording or data reproduction for the DVD 9. Similarly, the semiconductor laser element of the CD light source 1b is located on a substrate where light detection faces 10a of the CD light-receiving sensor 10h are formed, so that a single package is provided. The CD light source 1a emits, to a CD 9e, a laser beam required to perform, at the least, data recording or data reproduction for the CD 9e.

For the third embodiment, in the package wherein the CD light source 1b is stored, a diffraction element 2b is located on the face, on the CD light source 1b side, of a window through which a laser beam is emitted. Since the DVD light source 1a and the CD light source 1b are located at a distance, only a CD laser beam can enter to the diffraction grating 2b. Thus, the diffraction grating 2b separates a laser beam into three light fluxes for dedicated CD tracking control, i.e., a main beam that is center 0-order light having a large light quantity, and on either side, side beams that are ±1-order light having small light quantities. Transparent plastic is employed for the window portion, and an inverted pattern, of a predetermined pattern for the diffraction element 2b is prepared in advance using dies, so that the diffraction element 2b can be formed by injecting the material for the window portion onto the dies and letting it set. When the diffraction grating 2b is thus obtained, as a part of the package in which the CD light source 1b is stored, the size and the weight of the optical pickup device 20 can be reduced.

For the diffraction element 2, the diffraction grating 2b may be formed on the face of a transparent substrate 2a near the CD light source 1b, and an opening limit film 2f may be deposited on the opposite side. Since the transparent substrate 2a and the opening limit film 2f are the same as those used for the first embodiment, no further explanation for them will be given. For the diffraction grating 2b, the surface of the transparent substrate 2a near the CD light source 1b is formed in a predetermined convex and concave pattern. For example, the inverted pattern of the predetermined convex and concave pattern is formed in dies, and the material of the transparent substrate 2a may be injected onto and set in the dies to obtain the transparent substrate 2a. Either this, or the surface of the transparent substrate 2a may be etched, in a predetermined convex and concave pattern, and thereafter, the transparent substrate 2a may be cut in accordance with a predetermined shape. Or instead, the diffraction element 2 explained in the first embodiment may be employed.

Further, in the package in which the CD light source 1b is stored, a CD hologram 3j is located on the face, opposite the CD light source 1b, of the window through which the laser beam is emitted. Since the inverted convex and concave pattern of the CD hologram 3j is prepared on the faces of the dies that form the window, where the CD hologram 3j is to be molded, the CD hologram 3j can be fabricated at the same time as the diffraction grating 2b, during the process for the manufacture of the window portion. That is, in the third embodiment, since the CD light source 1b, the CD light-receiving sensor 10h, the diffraction grating 2b and the CD hologram 3j are stored in a single package, a reduction in the size and in the weight of the optical pickup device 20 can be obtained. Unlike the CD hologram 3j in the first embodiment, the CD hologram 3j for this embodiment is a hologram of a transmission type. However, as does the CD hologram 3j in the first embodiment, the CD hologram 3j of the third embodiment separates a laser beam into a light flux used for focus tracking and a light flux used for tracking control.

It should be noted that the CD hologram 3j need not be formed in the window portion of the package. The CD hologram 3j may be arranged as an independent element on an optical glass plate or an optical plastic plate. For the CD hologram 3j may be formed on the face where the opening limit film 2f of the diffraction element 2 is to be deposited, and the opening limit film 2 may be overlaid. In this embodiment, the division pattern shown in FIG. 6 is employed for the CD hologram 3j.

A relay lens 23 is made of optical glass or optical plastic. The relay lens 23 is a lens for changing the divergence angle of a laser beam emitted by the CD light source 1b, and for adjusting the light so that parallel light can be obtained by a collimating lens 4. Since the relay lens 23 is so located, the laser beam emitted by the CD light source 1b can easily be fetched, including the level indicated at the base of the light intensity distribution. As a result, the laser beam can be efficiently employed. Furthermore, since the opening limit function can be performed, the opening limit film 2f, which is deposited when the diffraction element 2 is employed, is not required.

A forelight hologram 24 is deposited on the surface of optical glass or optical plastic, so that a part of a laser beam emitted by the DVD light source 1a is emitted to the DVD light-receiving sensor 10g to obtain a DVD light quantity control signal. Actually, the hologram is formed for the end of a light flux that is not used for recording and reproduction, and this portion is employed for light quantity control. A hologram is not formed for the light flux portion that is actually employed for data recording and reproduction.

For a beam splitter 5, a wavelength selection, polarized light separation film 5b is deposited on the surface, opposite the DVD light source 1a, of a transparent substrate 5a that is made of optical glass or of optical plastic. The wavelength selection, polarized light separation film 5b totally reflects a laser beam having a wavelength λ1, regardless of whether the light is P polarized or S polarized, transmits most of a P polarized laser beam having a wavelength λ2 and reflects part of this light, and totally transmits an S polarized laser beam having a wavelength λ2. The wavelength selection, polarized light separation film 5b is a dielectric multilayer film.

Since the collimating lens 4, a hologram element 7, an object lens 8 and a forelight monitor 11 are the same as those in the first embodiment, the explanation used in the first embodiment will be applied. Further, the path elevating prism 6 in the first embodiment is replaced with a path elevating mirror 6a. And the division pattern in FIG. 8 is employed for the DVD hologram 7a.

Light detection faces 10a for the DVD light-receiving sensor 10 are as shown in FIG. 9, and CD sub-tracking light detection faces 10e and CD focus light detection face 10f are not shown. Further, the length of the main tracking light detection faces 10b in the radial direction equals the length of the sub-tracking light detection faces 10c in the radial direction. At this time, the outer edges of the main tracking light detection faces 10b in the radial direction are cut down. Therefore, the positions of the main tracking light detection faces 10b are shifted in the radial direction away from the positions of the sub-tracking light detection faces 10c. It should be noted that the arrangement is not shown for the DVD light source 1a and light detection faces for receiving light fluxes that are separated by the forelight hologram 24.

In FIG. 26, light reflected by the data recording face, which is a light condensing face, is transmitted as spots 27 and 27a to the center positions of the main tracking light detection faces 10b and the sub-tracking light detection faces 10c. Therefore, the incident positions of the spots 27 and 27a in the radial direction are shifted a distance equivalent to the position shift between the main tracking light detection faces 10b and the sub-tracking light detection faces 10c in the radial direction. Further, when a laser beam is reflected by an L0 layer 9a or an L1 layer 9b, which is a non-condensing face, and is separated into light fluxes by the main tracking areas 111, 211, 311 and 411, the light fluxes form spots 41. Furthermore, when a laser beam is reflected by the L0 layer 9a or the L1 layer 9b, which is a non-condensing face, and is separated into light fluxes by the sub-tracking areas 112, 212, 312 and 412, the light fluxes form spots 42. Only spots 44 enter the main tracking light detection faces 10b. These spots 44 are formed by light fluxes that are separated by the main tracking areas 111, 211, 311 and 411 that are nearest the center of the DVD hologram 7a in the radial direction and that are nearest the center in the tangential direction. Further, only spots 45 enter the sub-tracking light detection faces 10c. These spots 45 are formed by light fluxes that are separated by the sub-tracking areas 112, 212, 312 and 412 that are nearest the center of the DVD hologram 7a in the radial direction and that are nearest the center in the tangential direction.

This is done for the following reasons. The width of a spot 44 is defined as being equal to or smaller than a difference in the positions in the radial direction between a main tracking light detection face 10b and a sub-tracking light detection face 10c. As a result, when the laser beam is reflected by the non-condensing L1 layer 9b, light fluxes are spread to the widthwise limit in the radial direction and pass through the main tracking areas 111, 211, 311 and 411, which are nearest the center of the DVD hologram 7a in the radial direction. These light fluxes can be fetched as the spots 44 in the main tracking light detection faces 10b. At the same time, the spots 41, located in the same row as the spots 44, can be prevented from entering the sub-tracking light detection faces 10c. Furthermore, the width of a spot 45 in the radial direction is almost equal to the width of a spot 44 in the radial direction. In addition, as described above, the difference in the incident positions in the radial direction, between the spots 27 and 27a, is substantially equal to the difference in the lengths of the main tracking light detection faces 10b and the sub-tracking light detection faces 10c. Therefore, when the light fluxes are spread to the widthwise limit in the radial direction and pass through the sub-tracking areas 112, 212, 312 and 412 that are nearer the center of the DVD hologram 7a in the radial direction, these light fluxes can be fetched as spots 45 to the sub-tracking light detection faces 10c. At the same time, the spots 42 in the same row as the spots 45 can be prevented from entering the main tracking light detection faces 10b.

In a case wherein a laser beam is reflected by the non-condensing L0 layer 9a, when light fluxes are spread to the widthwise limit in the radial direction and pass through the main tracking areas 111, 211, 311 and 411, which are nearest the center of the DVD hologram 7a in the radial direction, these light fluxes can be fetched as the spots 44 to the main tracking light detection faces 10b. At the same time, the spots 41 in the same row as the spots 44 can be prevented from entering the sub-tracking light detection faces 10c. Furthermore, when light fluxes are spread to the widthwise limit in the radial direction and pass through the sub-tracking areas 112, 212, 312 and 412, which are nearest the center of the DVD hologram 7a in the radial direction, these light fluxes can be fetched as the spots 45 to the sub-tracking light detection faces 10c. At the same time, the spots 42 in the same row as the spots 45 can be prevented from entering the main tracking light detection faces 10b.

As described above, since the dedicated light detection faces 10a for a DVD are so arranged, light fluxes that are to enter the CD sub-tracking light detection faces 10e need not be considered. In addition, it is possible to prevent the entry, into the main tracking light detection faces 10b, of light fluxes that enter the main tracking light detection faces 10b and that tend to include a fluctuation factor. Therefore, when a DVD having a two layer data recording face is employed, the offset that occurs in a tracking error signal TES can be reduced, and a more stabilized focus error signal TES can be obtained.

The CD light-receiving sensor 10h may be employed as a second light-receiving sensor, and in this case, the DVD focus light detection face 10d in FIG. 9 need only be eliminated from the pattern for light detection faces 10a of the CD light-receiving sensor 10. The main tracking light detection faces 10b are replaced with second main tracking light detection faces; the sub-tracking light detection faces 10c are replaced with second sub-tracking light detection faces; the CD sub-tracking light detection faces 10e are replaced with third sub-tracking light detection faces; and the CD focus light detection face 10f of is replaced with a second focus light detection face. Of the light that is reflected by the data recording face of the CD 9e and passes through second tracking areas 31a, 32a, 33a and 34a of the CD hologram 3j, a main beam, which is a 0-order light separated by the diffraction grating 2d, is received by the second main tracking light detection face. Of the light that is reflected by the data recording face of the CD 9e and passes through the second tracking areas 31a, 32a, 33a and 34a of the CD hologram 3j, one of side beams, which are ±1-order light, separated by the diffraction grating 2d is received by the second sub-tracking light detection face. The other side beam is received by the third sub-tracking light detection face. The light that is reflected by the data recording face of the CD 9e and passes through the second focus areas 31b, 31c, 32b, 32c, 33b, 33c, 34b and 34c of the CD hologram 3j is received by the second focus light detection face. The size of the second main tracking light detection face may be consonant with the size of the second sub-tracking light detection face or the third sub-tracking light detection face. Further, the third sub-tracking light detection faces may be located beside all the second main tracking light detection faces.

According to the optical pickup device of the third embodiment, the DVD light source 1a and the CD light source 1b are arranged at a distance. However, in a case wherein the light source 1 used in the first embodiment is employed, and wherein CD tracking control is provided by the one-beam method, without using the diffraction element 2, the DVD hologram 7a and the DVD light-receiving sensor 10g described above can also be employed. In this case, the configuration in FIG. 1, which does not include a diffraction element 2, is employed for the optical system. The DVD hologram 7a for the third embodiment can be employed; however, a CD hologram 3j must be separately designed. Further, the light detection faces 10a of the DVD light-receiving sensor 10 may be arranged as shown in FIG. 26, or the CD focus light detection face 10f may be so arranged.

Fourth Embodiment

Figure 27:
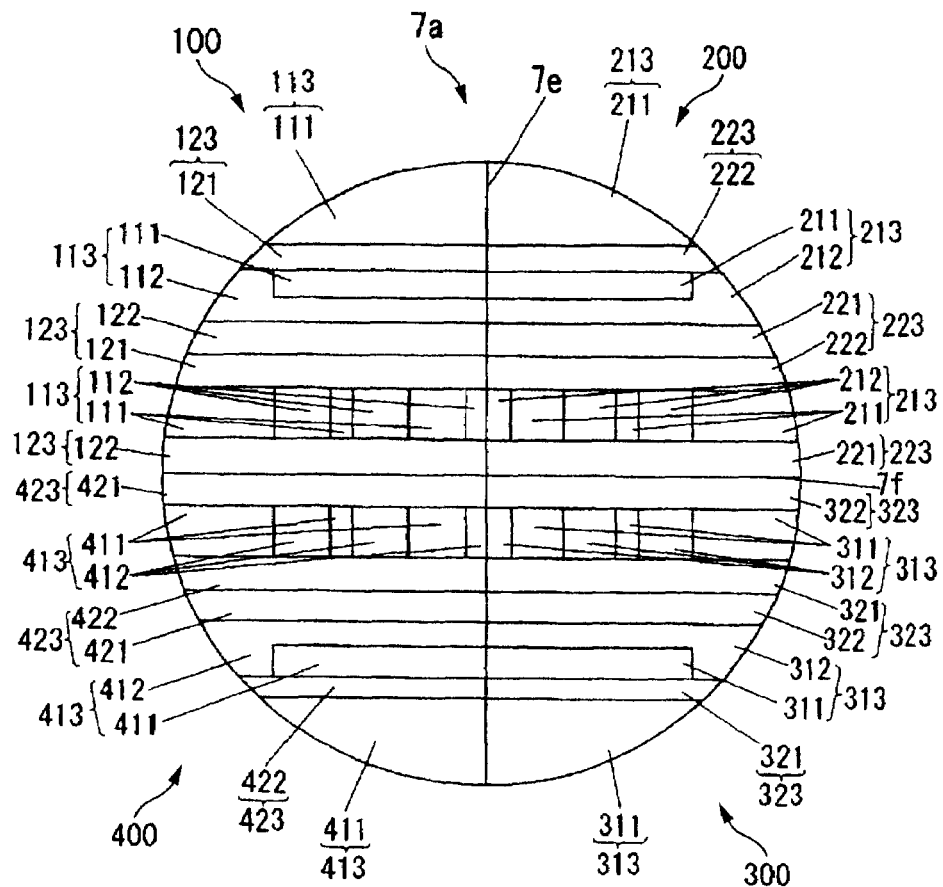
FIG. 27 is a diagram showing a division pattern for a DVD hologram according to a fourth embodiment of the present invention.
Figure 27:
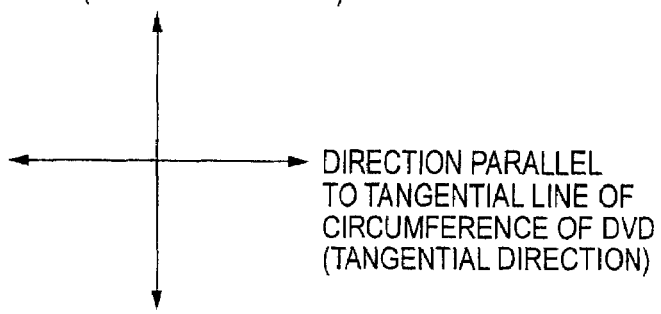
Figure 28:
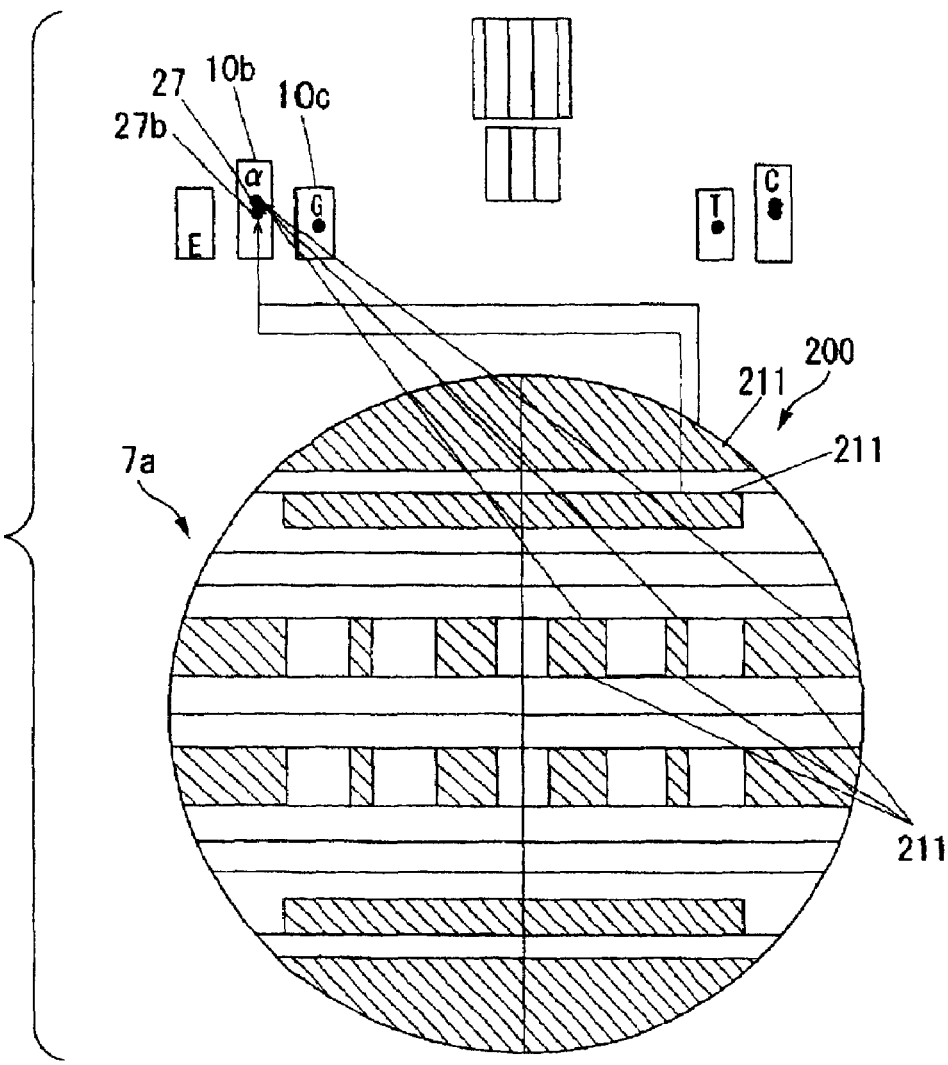
FIG. 28 is a diagram showing the state of the fourth embodiment wherein light fluxes that are separated by the main tracking areas of the DVD hologram enter a main tracking light detection face.
Figure 29:
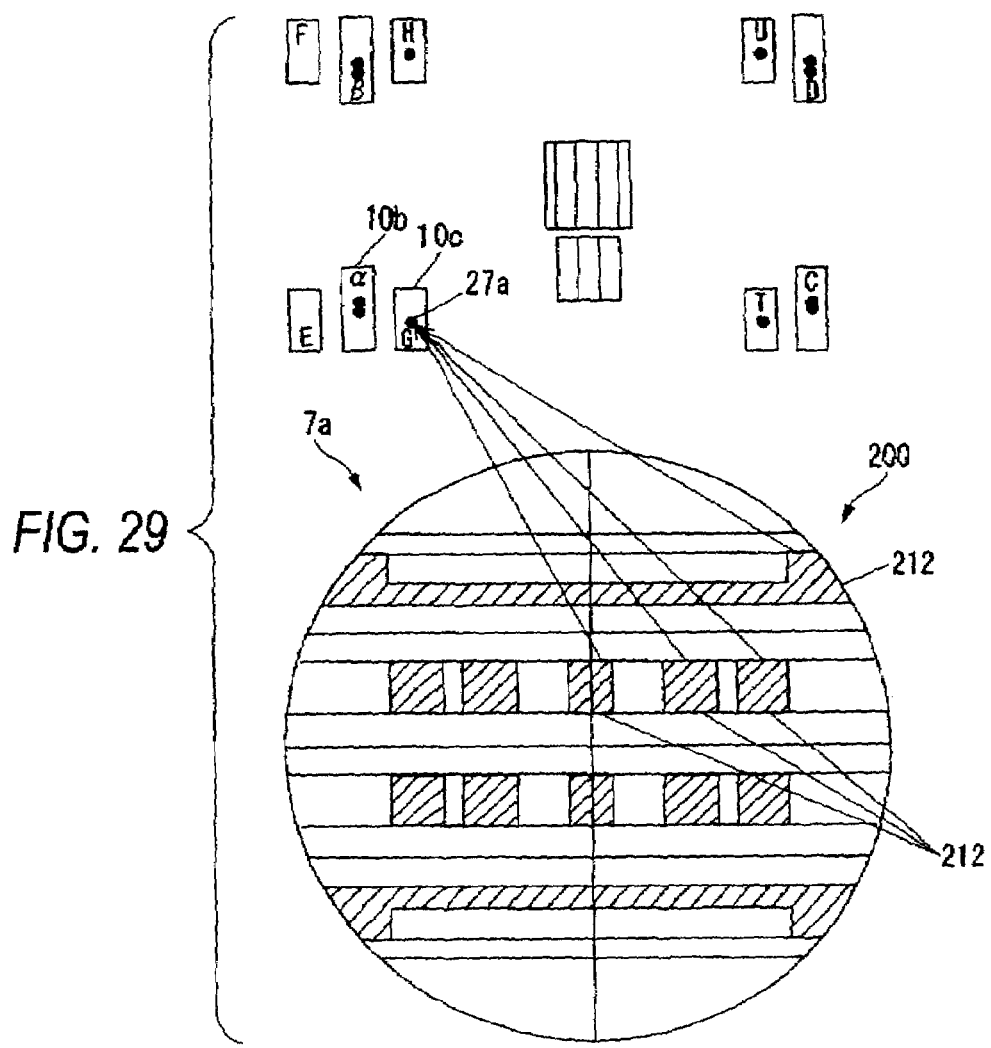
FIG. 29 is a diagram showing the state of the fourth embodiment wherein light fluxes that are separated by the sub-tracking areas of the DVD hologram enter a sub-tracking light detection face.
Figure 30:
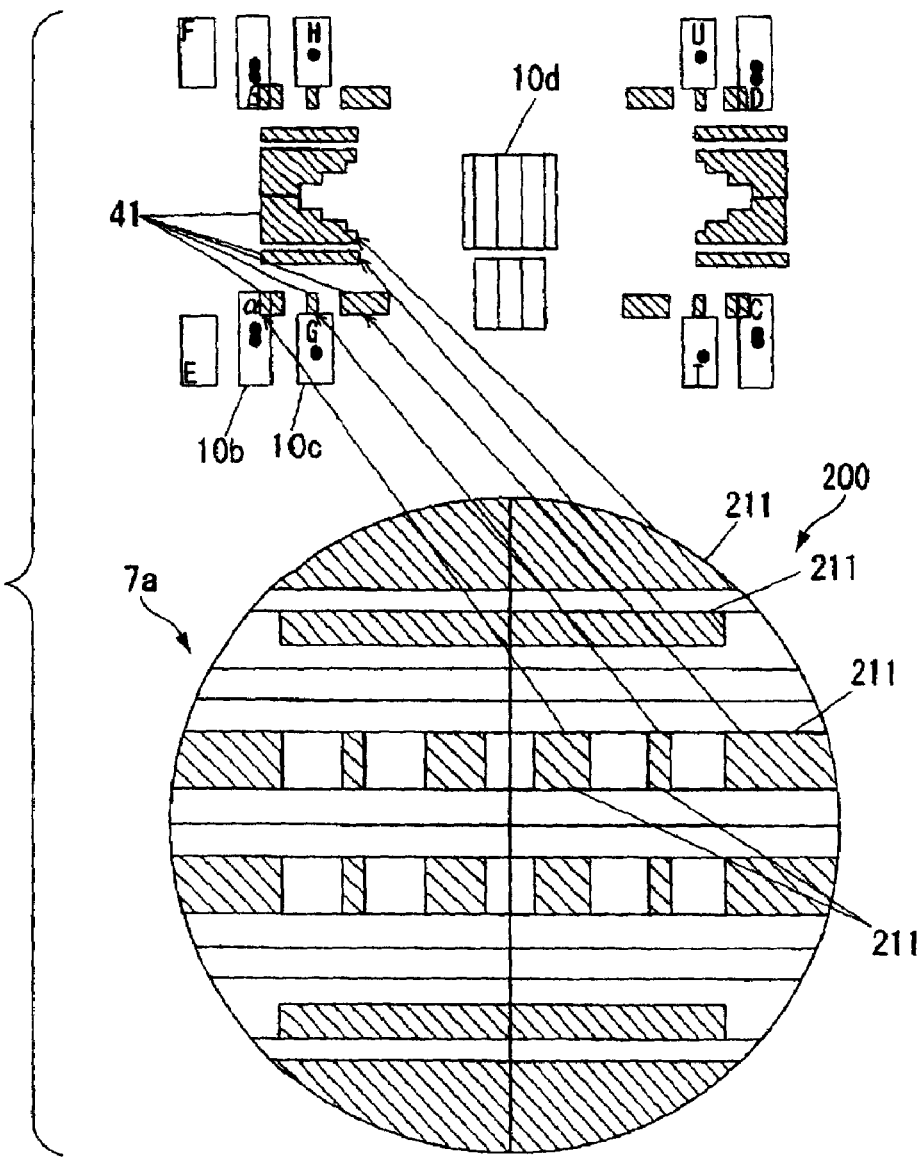
FIG. 30 is a diagram showing the state of the fourth embodiment wherein, when light has been reflected by the L1 layer, which is a non-condensing face, and has been separated into light fluxes by the main tracking areas of the DVD hologram, the light fluxes enter a light-receiving sensor.
Figure 31:
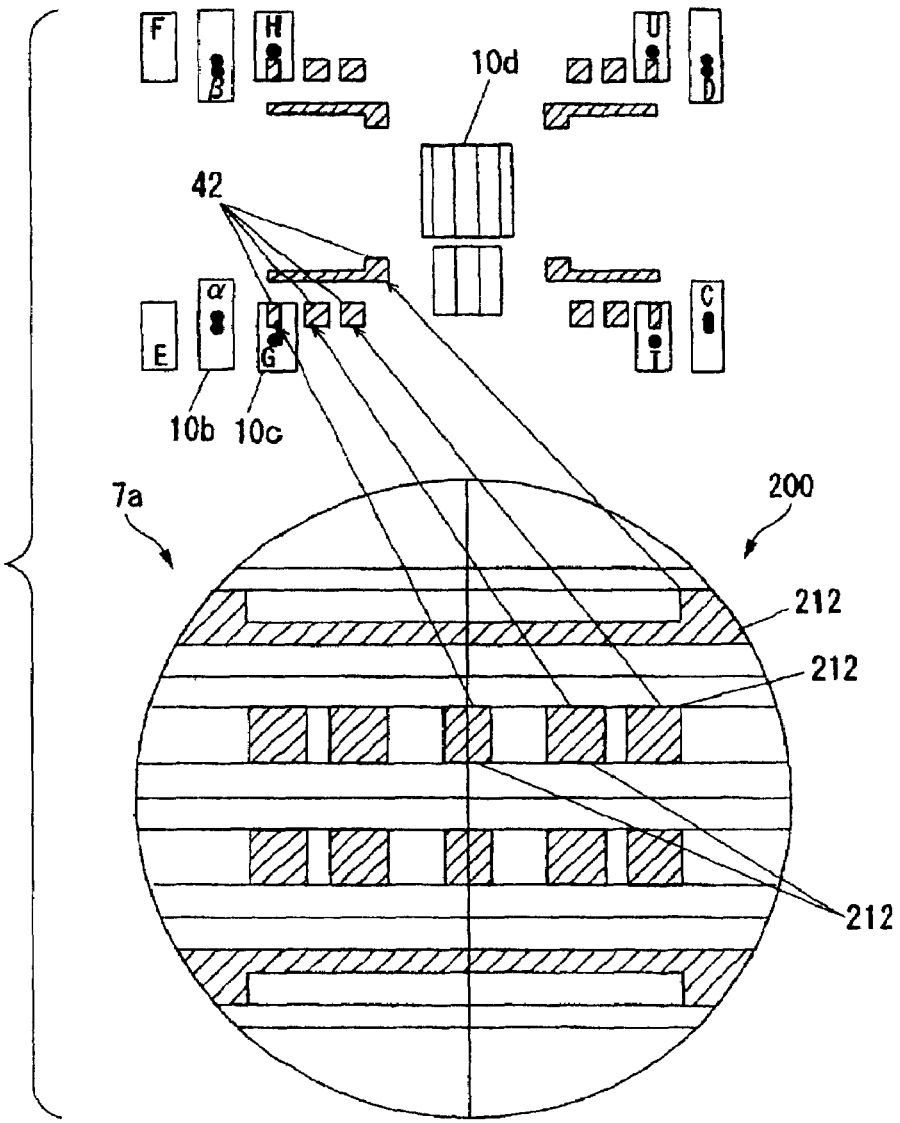
FIG. 31 is a diagram showing the state of the fourth embodiment wherein, when light has been reflected by the L1 layer, which is a non-condensing face, and has been separated into light fluxes by the sub-tracking areas of the DVD hologram, the light fluxes enter a light-receiving sensor.
Figure 32:
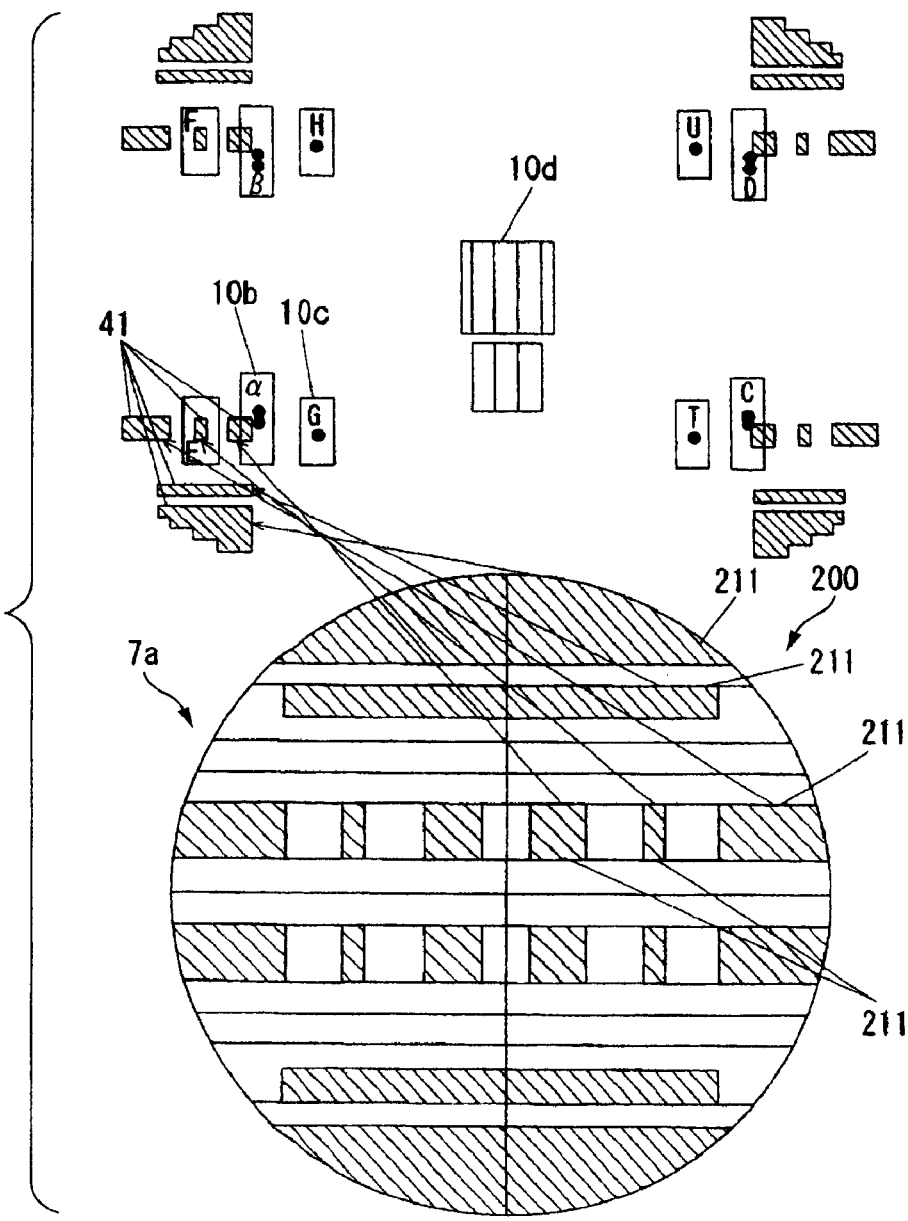
FIG. 32 is a diagram showing the state of the fourth embodiment wherein, when light has been reflected by the L0 layer, which is a non-condensing face, and has been separated into light fluxes by the main tracking areas of the DVD hologram, the light fluxes enter a light-receiving sensor.
Figure 33:
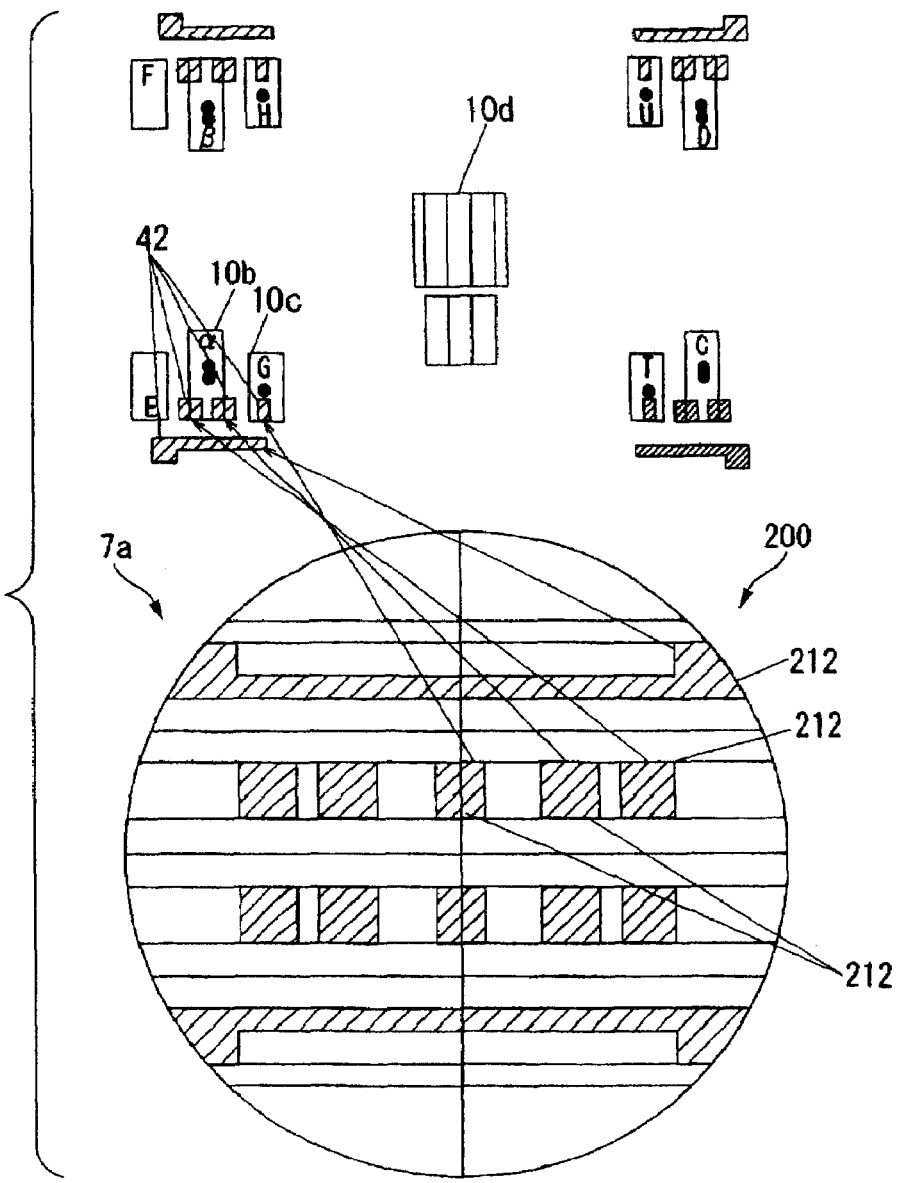
FIG. 33 is a diagram showing the state of the fourth embodiment wherein, when light has been reflected by the L0 layer, which is a non-condensing face, and has been separated into light fluxes by the sub-tracking areas of the DVD hologram, the light fluxes enter a light-receiving sensor.
Figure 34:
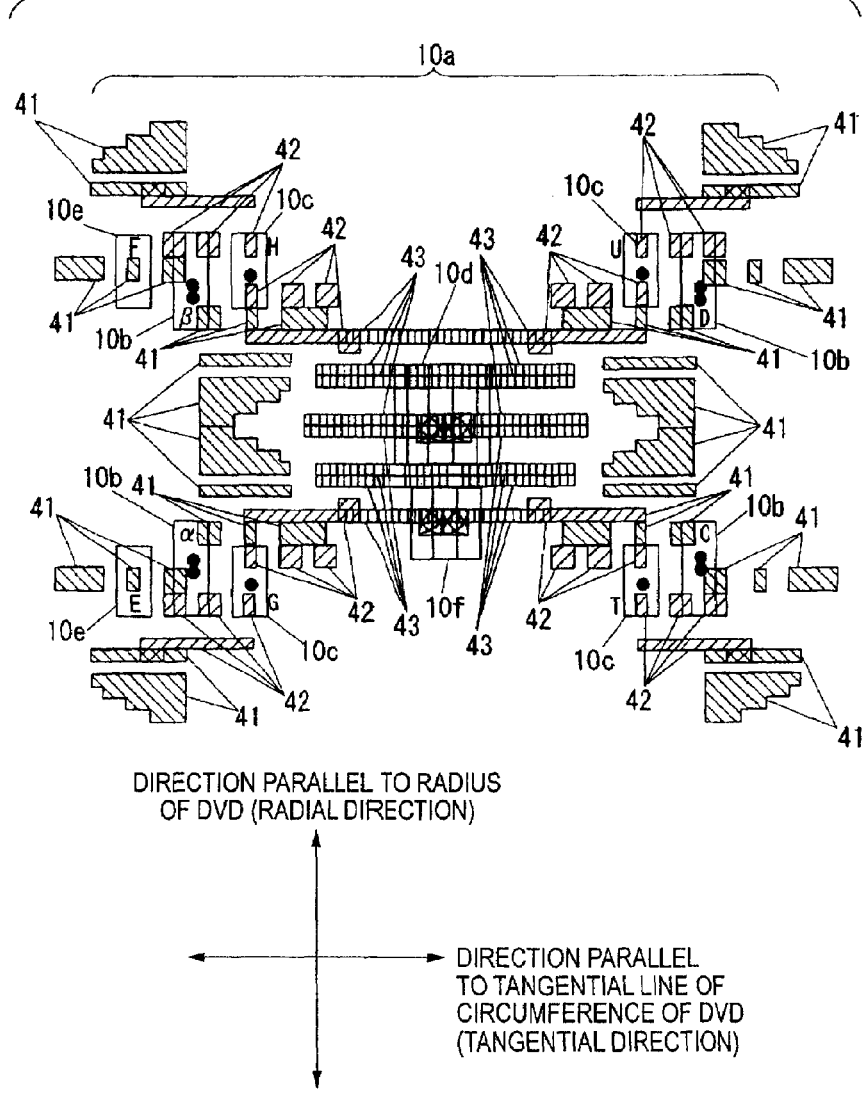
FIG. 34 is a diagram showing a distribution of light fluxes obtained through reflection of light by the data recording face, which is a non-condensing face, according to the fourth embodiment.

A fourth embodiment of the present invention will now be described while referring to the accompanying drawings. FIG. 27 is a diagram showing a division pattern for a DVD hologram according to the fourth embodiment. FIG. 28 is a diagram showing a state in which, after light fluxes have been separated by the main tracking areas of the DVD hologram of the fourth embodiment, these light fluxes enter main tracking light detection faces. FIG. 29 is a diagram showing a state in which, after light fluxes have been separated by the sub-tracking areas of the DVD hologram of the fourth embodiment, these light fluxes enter sub-tracking light detection faces. FIG. 30 is a diagram showing the state wherein, after light has been reflected by an L1 layer, which is a non-condensing face for the fourth embodiment, and has been separated into light fluxes in the main tracking areas of the DVD hologram, the light fluxes thereafter enter a light-receiving sensor. FIG. 31 is a diagram showing a state wherein, after light has been reflected by the L1 layer, which is a non-condensing face for the fourth embodiment, and has been separated into light fluxes in the sub-tracking areas of the DVD hologram, the light fluxes thereafter enter the light-receiving sensor. FIG. 32 is a diagram showing a state wherein, after light has been reflected by an L0 layer, which is a non-condensing face for the fourth embodiment, and has been separated into light fluxes in the main tracking areas of the DVD hologram, the light fluxes thereafter enter the light-receiving sensor. FIG. 33 is a diagram showing a state wherein, after light has been reflected by the L0 layer, which is a non-condensing face for the fourth embodiment, and has been separated into light fluxes in the sub-tracking areas of the DVD hologram, the light fluxes thereafter enter the light-receiving sensor. FIG. 34 is a diagram showing a distribution of light fluxes obtained through reflection by a data recording face, which is a non-condensing face according to the fourth embodiment. The fourth embodiment is a modification of the division pattern for the DVD hologram 7a. Since the arrangement, except for the division pattern for the DVD hologram 7a, is the same as that for the first embodiment, the explanation given for the first embodiment will be applied for the fourth embodiment.

As shown in FIG. 27, in the fourth embodiment, the DVD hologram 7a includes four areas 100, 200, 300 and 400, having almost the same size, that are defined along a first division line 7e extended in the radial direction and a second division line 7f extended in the tangential direction. The areas 100, 200, 300 and 400 respectively include tracking areas 113, 213, 313 and 413 and focus areas 123, 223, 323 and 423, which are defined along division lines in the tangential direction and are alternately arranged.

The focus areas 123, 223, 323 and 423, which are second nearest the center of the DVD hologram 7a in the radial direction, are each divided by the tangential division lines into two segments, i.e., focus areas 121 and 122, 221 and 222, 321 and 322, and 421 and 422. The other focus areas 123, 223, 323 and 423 respectively include the focus areas 121 or 122, 221 or 222, 321 or 322, and 421 or 422. Light fluxes separated by the focus areas 121, 221, 321 and 421 are transmitted to the light-receiving sensor 10 in the focused state. Further, light fluxes separated in the focus areas 122, 222, 322 and 422 enter the light-receiving sensor 10 in the non-focused state. It should be noted that the focusing state got light fluxes may be inverted between the focus areas 121, 221, 321 and 421 and the focus areas 122, 222, 322 and 422.

The tracking areas 114, 213, 313 and 413, which are nearest the center of the DVD hologram 7a in the radial direction, include main tracking areas 111, 211, 311 and 411 and sub-tracking areas 112, 212, 312 and 412, which are defined along the division lines for the radial line and are arranged alternately. The same width in the radial direction is employed for the main tracking areas 111, 211, 311 and 411 and the sub-tracking areas 112, 212, 312 and 412. The tracking areas 113, 213, 313 and 413, which are farthest from the center of the DVD hologram 7a in the tangential direction, are employed as the main tracking areas 111, 211, 311 and 411. Further, the tracking areas that are second closest to the center of the DVD hologram 7a in the radial direction include: the main tracking areas 111, 211, 311 and 411 and the sub-tracking areas 112, 212, 312 and 412, which are defined along the division lines extended in the radial direction and along the division lines extended in the tangential direction. Since a large amount of tracking information is included in the peripheral portion of the DVD hologram 7a in the radial direction, light reflected by this area enters the main tracking light detection faces 10b, so that the output of a tracking control signal can be increased. The tracking areas 113, 213, 313 and 413, which are farthest from the center of the DVD hologram 7a in the radial direction, are employed as the main tracking areas 111, 211, 311 and 411.

Assume that light is converged at and reflected by the DVD 9, and is then separated into light fluxes through the main tracking areas 211 that are second nearest and the main tracking areas 211 that are farthest from the center of the DVD hologram 7a in the radial direction. In this case, as shown in FIG. 28, as spots 27b, these light fluxes are transmitted, in substantially the focused state, to a position indicated by "●" near the center of the α main tracking light detection face 10b. Further, when light is converged at and reflected by the DVD 9, and is then separated into light fluxes through the main tracking areas 111 that are nearest the center of the DVD hologram 7a in the radial direction, these light fluxes are transmitted, as a spot 27, in substantially the focused state, to a radially inward position indicated by "●" on the a main tracking light detection face 10b. In ether case, all the light fluxes separated by the main tracking areas 211 of the area 200 enter the main tracking light detection face 10b. The area 200 and the α main tracking light detection face 10b intersect each other in the radial direction and in the tangential direction.

Further, as shown in FIG. 29, light fluxes separated by the sub-tracking areas 212 are transmitted, as a spot 27a, in substantially the focused state, almost to a center position indicated by "●" of the G sub-tracking light detection face 10c. The area 200 and the G sub-tracking light detection face 10c intersect each other in the radial direction and in the tangential direction. The difference in the incident positions of the spot 27 and the spot 27a in the radial direction is substantially equal to the difference in the length in the radial direction between the main tracking light detection face 10b and the sub-tracking light detection face 10c.

When a laser beam is reflected by a non-condensing data recording face, the following process is performed. In FIG. 30, a laser beam reflected by the L1 layer, which is a non-condensing face, is separated in the main tracking areas 211 of the area 200, and instead of being condensed to a point, the light is dispersed and transmitted in the non-focused state to the light-receiving sensor 10. The incident position is between the main tracking light detection face 10b and the DVD focus light detection face 10d, and a part of the light enters the main tracking light detection face 10b. The individual spots 41 correspond to the main tracking areas 211. And similarly, in FIG. 31, a laser beam reflected by the L1 layer, which is a non-condensing face, is separated in the sub-tracking areas 212 of the area 200, and without being condensed to a point, the light is dispersed and transmitted in the non-focused state to the light-receiving sensor 10. The incident position is between the sub-tracking light detection face 10c and the DVD focus light detection face 10d, and a part of the light enters the sub-tracking light detection face 10c. The individual spots 42 correspond to the sub-tracking areas 212.

On the other hand, while referring to FIG. 32, a laser beam reflected by the L0 layer, which is a non-condensing face, is separated in the main tracking areas 211 of the area 200, and instead of being condensed to a point, the light is dispersed and transmitted in the non-focused state to the light-receiving sensor 10. The incident position is the opposite side to the DVD focus light detection face 10d, and part of light enters the main tracking light detection face 10b. The individual spots 41 correspond to the main tracking areas 211. And similarly, in FIG. 33, a laser beam reflected by the L0 layer, which is a non-condensing face, is separated in the sub-tracking areas 212 of the area 200, and instead of being condensed to a point, the light is dispersed and is transmitted in the non-focused state to the light-receiving sensor 10. The incident position is the side opposite the DVD focus light detection face 10d, and part of the light enters the sub-tracking light detection face 10c. The spots 42 correspond to the sub-tracking areas 212.

When light is reflected by the non-condensing data recording face, the light is separated into light fluxes by the main tracking areas 211 that are nearest the center of the DVD hologram 7a in the radial direction and that are nearest the center in the tangential direction, and these light fluxes enter the main tracking light detection faces 10b. Further, when light is reflected by the non-condensing data recording face, the light is separated into light fluxes by the sub-tracking areas 212 that are nearest the center of the DVD hologram 7a in the radial direction and that are nearest the center in the tangential direction, and the light fluxes enter the sub-tracking light detection faces 10c. In addition, when light is reflected by the L0 layer 9a, which that is a non-condensing face, light is separated into light fluxes by the main tracking areas 211 that are nearest the center of the DVD hologram 7a in the radial direction and that are second nearest the center in the tangential direction, and the light fluxes enter the center portion of the CD sub-tracking light detection face 10e in the tangential direction. The radial width of a spot 41, which is transmitted by the main tracking area 211 that is nearest the center of the DVD hologram 7a in the radial direction, is substantially equal to the radial width of a spot 42 on the same row, which is transmitted by the sub-tracking area 212. This width is set equal to or smaller than the difference in the lengths, in the radial direction, between the main tracking light detection face 10b and the sub-tracking light detection face 10c. In a case wherein a laser beam is reflected by the non-condensing data recording face to transmit light fluxes to the main tracking light detection face 10b, the sub-tracking light detection face 10c and the CD sub-tracking light detection face 10e, light enters the light detection face 10a, while the entire width in the radial direction is maintained when light fluxes have been separated by the main tracking areas 211 or the sub-tracking areas 212.

On the other hand, when a laser beam is reflected by the non-condensing data recording face, and light fluxes are separated by the main tracking areas 211 and the sub-tracking areas 212 that are second nearest the center of the DVD hologram in the radial direction, these light fluxes do not enter any light detection face 10a. Therefore, a defect does not occur due to an unbalanced quantity of light that enters the main tracking light detection face 10b and the sub-tracking light detection face 10c. It should be noted that this unbalanced problem is the result of a variance of a DVD 9 having a two layer data recording face or a variance of the optical system, and the above defect occurs for a case wherein the tracking areas are divided into the main tracking areas and the sub-tracking areas along the division lines. Therefore, a defect for a case, as in the first embodiment, wherein recording for the L0 layer 9a is performed and then, the process jumps to the L1 layer 9b to initiate the recording of the L1 layer 9b, or a defect for a case, as in the second embodiment, wherein the filter 22 is employed, does not occur.

As shown in FIG. 34, the light flux distribution is established by using all the main tracking areas 111, 211, 311 and 411, the sub-tracking areas 112, 212, 312 and 412, the main tracking light detection faces 10b, sub-tracking light detection faces 10c and the CD sub-tracking light detection faces 10e.

When the division lines of the DVD hologram 7a in the tangential direction must be employed to divide the tracking areas 113, 213, 313 and 413 into the main tracking areas 111, 211, 311 and 411 and the sub-tracking areas 112, 212, 312 and 412, it is important that light fluxes separated in the areas by the reflection of light on the non-condensing data recording face should not enter the light detection faces 10a. To ensure this, the tracking areas 113, 213, 313 and 413 must merely be arranged, in the peripheral portion of the DVD hologram 7a, in the radial direction.

According to the fourth embodiment, when multiple spots, such as the spots 27 and the spots 27b, are condensed on the main tracking light detection face 10b, only the minimum required light fluxes can enter the light detection face 10a. Further, also in the fourth embodiment, the light detection faces 10a are so arranged that the spots 41 and 42 do not enter the tracking light detection faces 10b, the sub-tracking light detection faces 10c and the DVD focus light detection face 10d, other than a predetermined main tracking light detection face 10b and a predetermined sub-tracking light detection face 10c. Further, the light detection faces 10a are also so arranged that the spots 43 do not enter the main tracking light detection faces 10b, the sub-tracking light detection faces 10c and the CD sub-tracking light detection faces 10e. Furthermore, although not shown, the optical system is so structured that a laser beam that passes through without being diffracted by the DVD hologram 7a does not enter any one of the DVD focus light detection face 10d, the main tracking light detection face 10b and the sub-tracking light detection face 10c. In addition, the light detection faces 10a are so located that a laser beam that is diffracted as a −1-order light by the DVD hologram 7a does not enter any one of the DVD focus light detection face 10d, the main tracking light detection face 10b and the sub-tracking light detection face 10c.

As described above, according to the optical pickup device of the fourth embodiment, when data recording or data reproduction is performed by condensing a laser beam at a predetermined data recording face of an optical disk having a data recording face formed of a plurality layers, a constant ratio is maintained between the output of the main tracking light detection face and the output of the sub-tracking light detection face to receive light reflected by a portion other than the data recording face. Therefore, the reflected light can be substantially canceled as a tracking control signal, and the offset can be minimized. Thus, stable recording and reproduction can be performed for an optical disk having a data recording face formed of a plurality of layers.

Fifth Embodiment

Figure 35:
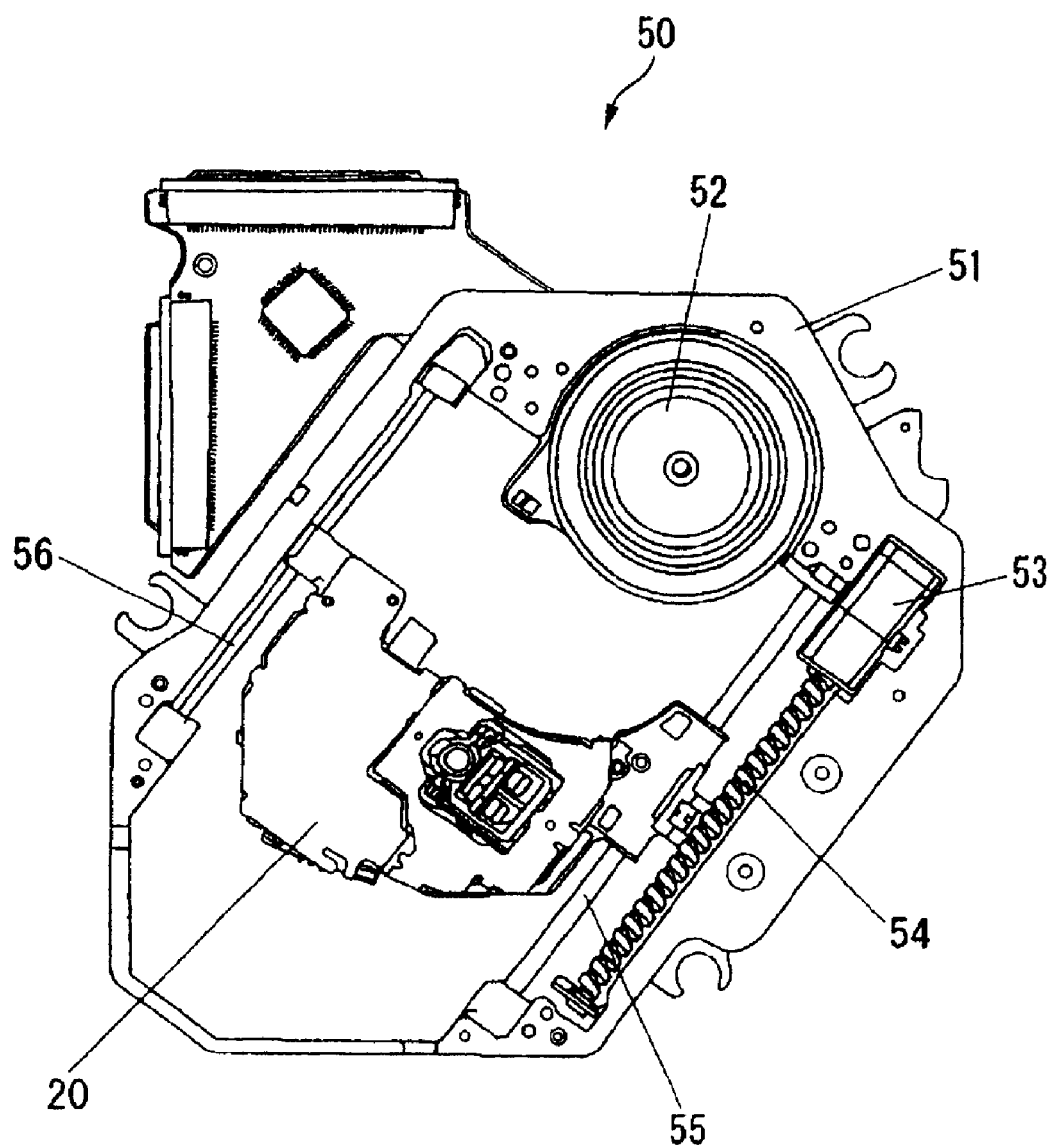
FIG. 35 is a diagram showing the structure of an optical pickup module according to a fifth embodiment of the present invention.
Figure 36:
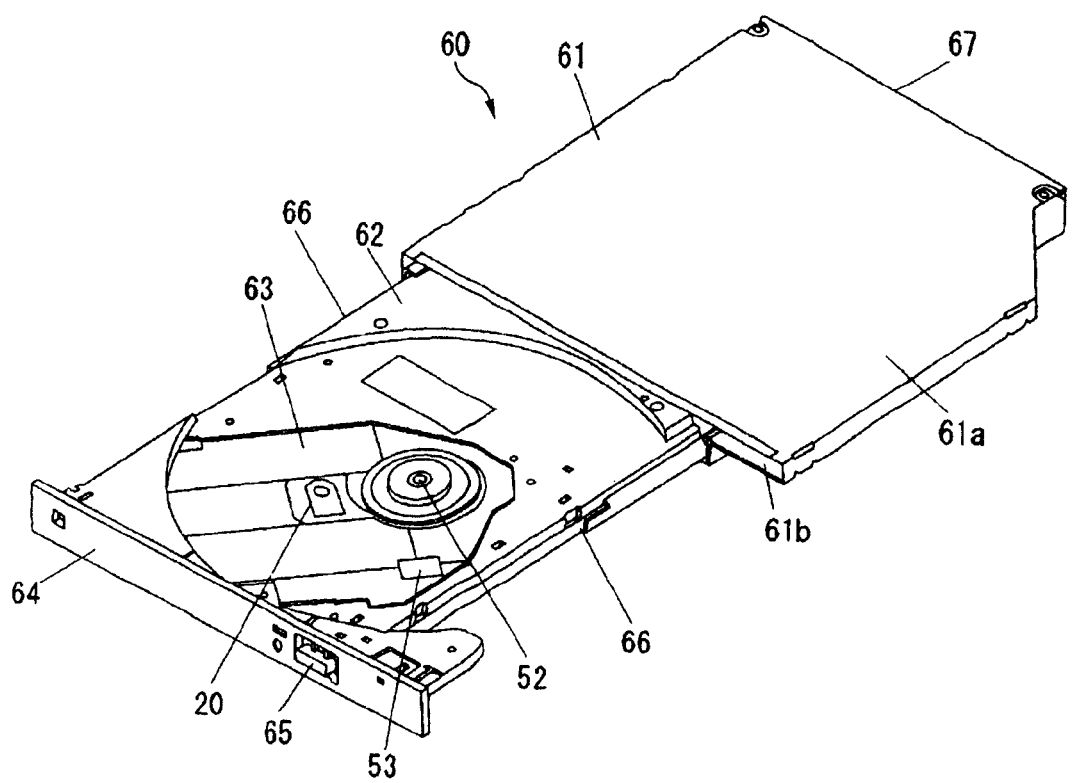
FIG. 36 is a diagram showing the arrangement of an optical disk apparatus according to the fifth embodiment.
Figure 37:
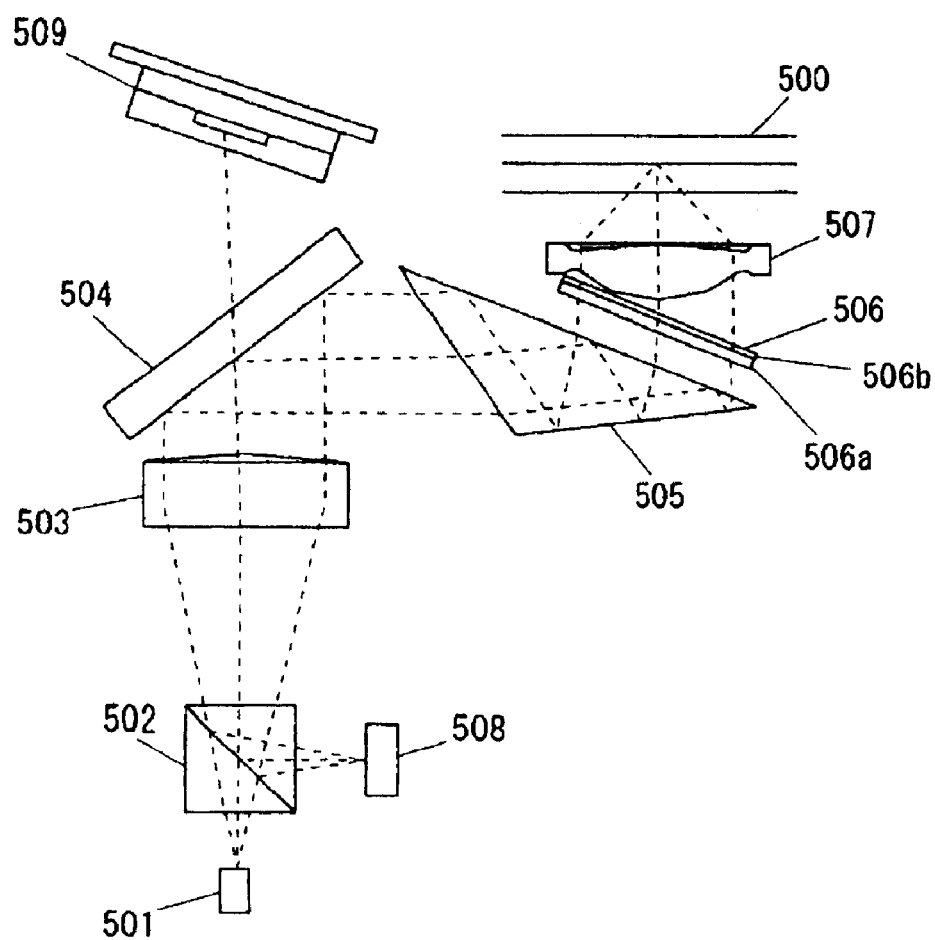
FIG. 37 is a diagram showing the structure of the optical system of a conventional optical pickup device.
Figure 38:
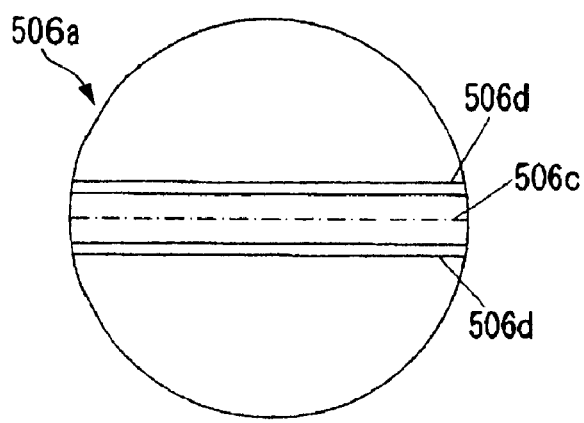
FIG. 38A is a diagram showing example divided areas in a division pattern for a conventional hologram.
FIG. 38B is a diagram showing an example in which many more areas are divided.
FIG. 38C is a diagram showing an example wherein only peripheral portions are defined as divided areas.
Figure 38:
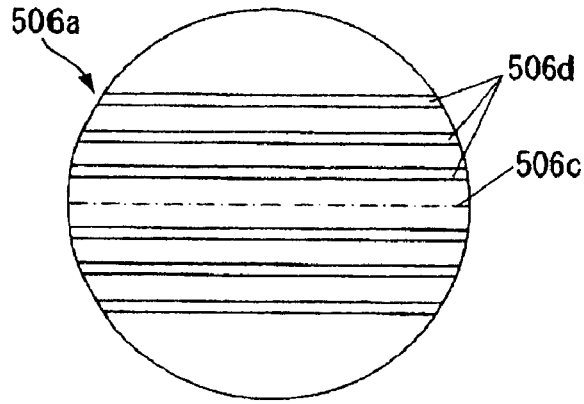
Figure 38:
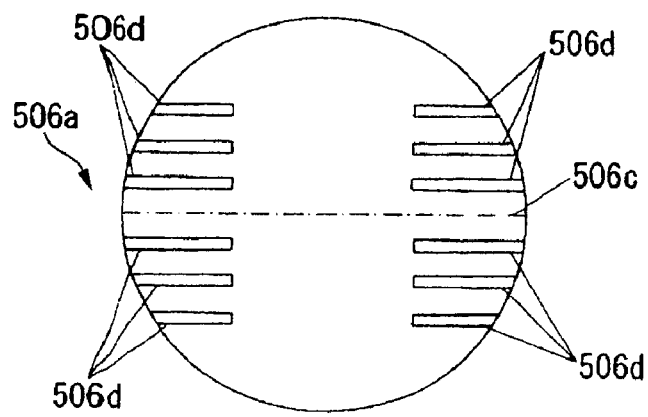
Figure 39:
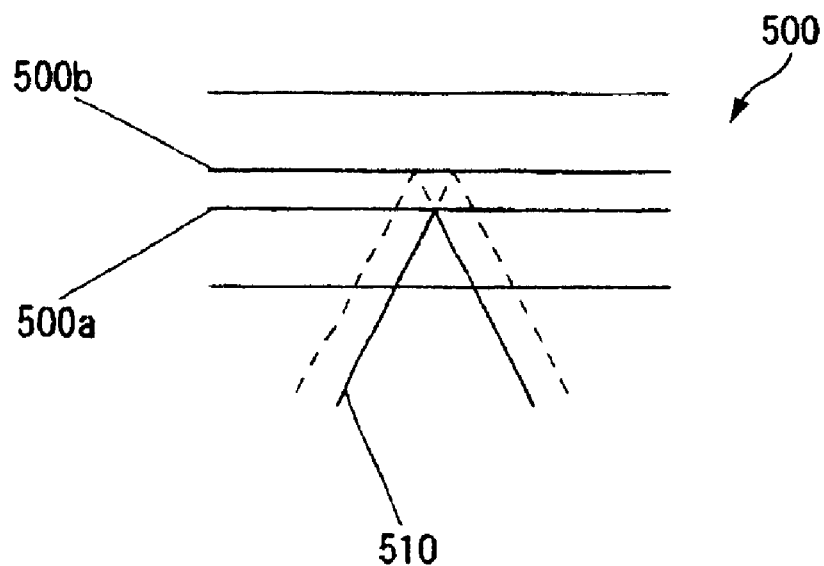
FIG. 39A is a diagram showing the state wherein a laser beam is reflected by the front data recording face of an optical disk having a two layer data recording face.
FIG. 39B is a diagram showing the state wherein a laser beam is reflected by the rear data recording face.
Figure 39:
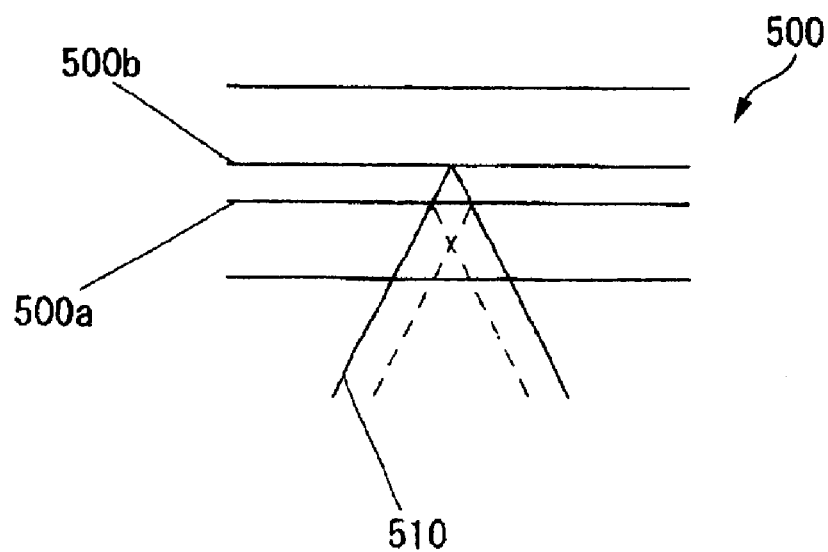

A fifth embodiment of the present invention will now be described while referring to the accompanying drawings. FIG. 35 is a diagram showing the structure of an optical pickup module according to the fifth embodiment. FIG. 36 is a diagram showing the structure of an optical disk apparatus according to the fifth embodiment. An optical pickup device as explained in the first to the fourth embodiment is mounted on the optical disk apparatus for the fifth embodiment.

The drive mechanism of an optical disk apparatus 60, which drives a DVD 9, a CD 9e and an optical pickup device 20, is called an optical pickup module 50. A base 51 is the framework for the optical pickup module 50, and the other components are fixed, directly or indirectly, to the base 51.

A spindle motor 52, which includes a turn table on which the DVD 9 or the CD 9e is to be placed, is fixed to the base 51. The spindle motor 52 generates a rotational force for rotating the DVD 9 or the CD 9e.

A feed motor 53 is fixed to the base 51. The feed motor 53 generates a rotational force required by the optical pickup device 20 to travel between the inner circumference and the outer circumference of the DVD 9 or the CD 9e. A stepping motor or a DC motor is employed as the feed motor 53. A screw shaft 54 has a spiral groove, and is connected to the feed motor 53 directly or via several gears. In the fifth embodiment, the screw shaft 53 is directly connected to the feed motor 53. Guide shafts 55 and 56 are fixed to the base 51, at their ends, via a support member, and movably support the optical pickup device 20. The optical pickup device 20 includes a rack that has guide teeth for engaging the groove in the screw shaft 54. Since the rack converts into a linear force the rotational force of the feed motor 53 that is transmitted to the screw shaft 54, the optical pickup device 20 can travel between the inner circumference and the outer circumference of the DVD 9 or the CD 9e.

The optical pickup device 20 has been explained in the first to the fourth embodiments. The optical pickup device 20, at the least, performs data recording or reproduction for the DVD 9 or the CD 9e, and emits a laser beam to the DVD 9 or the CD 9e. The control mechanism that constitutes the support member adjusts the inclination of the guide shafts 55 and 56, so that the laser beam emitted by the optical pickup device 20 strikes the DVD 9 or the CD 9e at a right angle.

An upper housing 61a and a lower housing 61b are securely combined, using screws, to form a housing 61. A tray 62 is so attached to the housing 61 that it is retractable. The optical pickup module 50, to which a cover 63 is attached, is mounted on the tray 62 from below. In the cover 63 is an opening, through which part of the optical pickup device 20, including an object lens 8, and the turn table of the spindle motor 52 are visible. In this embodiment, the feed motor 53 is also visible through the opening. A bezel 64 is located at the front end face of the tray 62, so that, when the tray 62 is stored in the housing 61, the bezel 64 closes the slot for the tray 62.

An ejection switch 65 is provided for the bezel 64. And by pressing the ejection switch 65, the tray 62 can be disengaged and extracted from the housing 61. Rails 66 are slidably attached to both sides of the tray 62 and inside the housing 61.

A circuit board (not shown) is internally provided for the housing 61 and the tray 62, and an IC for signal processing and a power circuit are mounted thereon. An external connector 67 is connected to a power/signal line provided for an electronic apparatus, such as a computer. Power is supplied to the optical disk apparatus 60 via the external connector 67, which can also be employed for the transmission of an external electric signal to the optical disk apparatus 60 or the transmission to an external electronic apparatus of an electric signal generated by the optical disk apparatus 60.

As described above, the optical disk apparatus for the fifth embodiment includes the optical disk device explained in the first to the fourth embodiments. According to the optical pickup device of the first to the fourth embodiments, when data recording or data reproduction is performed by condensing a laser beam at a predetermined data recording face of an optical disk having a data recording face formed of a plurality layers, a constant ratio can be maintained between the output of the main tracking light detection face and the output of the sub-tracking light detection face to receive light reflected by a the portion other than the data recording face. Therefore, the reflected light can be substantially canceled as a tracking control signal, and the offset can be minimized. As a result, the optical disk apparatus of the fifth embodiment can perform stable recording and reproduction for an optical disk having a data recording face formed of a plurality of layers.

As described above, for the optical pickup device of the invention, data recording and reproduction can stably be performed for an optical disk having a data recording face formed of a plurality of layers. Therefore, the optical pickup device of this invention is very useful as an optical disk apparatus. Further, since the optical disk apparatus of the invention can stably perform data recording and reproduction for an optical disk having a data recording face formed of a plurality of layers, this is a useful optical disk apparatus that can be used, for example, for a computer or a DVD recorder.

This application based upon and claims the benefit of priority of Japanese Patent Application No 2005-254792 filed on May 9, 2002, Japanese Patent Application of the No 2006-108463 filed on Jun. 4, 2011, the contents of which are incorporated herein by reference in its entirety.

What is claimed is:

1. An optical pickup device condensing a laser beam toward a data recording face of an optical disk, recording data in the optical disk, and reproducing data from the optical disk, the optical pickup device comprising:

a light source configured to emit a laser beam toward the optical disk;

a light-receiving sensor that has a main tracking light detection portion and a sub-tracking light detection portion, the main tracking light receiving, of light reflected by the data recording face of the optical disk, light that is used for tracking control of the optical pickup device, and the sub-tracking light detection portion receiving light that is used as auxiliary light for tracking control; and a hologram that includes a tracking area having a main tracking area and a sub-tracking area, the main tracking area separating a light flux that impinges on the main tracking light detection portion from the light reflected by the data recording face of the optical disk, the sub-tracking area separating a light flux that impinges on the sub-tracking light detection portion from the light reflected by the data recording face, the main tracking area and the sub-tracking area being defined by a tangential division line extended in a tangential direction, the tangential direction being parallel to a line tangential to the circumference at a light condensing position of the optical disk, wherein the tracking area of the hologram is defined as the main tracking area and the sub-tracking area by a radical division line, the radical division line being extended in a radial direction that parallels a radius of the optical disk at the light condensing position, and wherein the main tracking area and the sub-tracking area have the same width in the radial direction.

2. The optical pickup device according to claim 1, wherein the optical disk is a DVD having a data recording face formed of a plurality of layers.

3. The optical pickup device according to claim 1, wherein the light-receiving sensor includes:

a focusing light detection portion configured to receive, of the light reflected by the data recording face of the optical disk, the light that is used for the focusing control of the optical pickup device;

wherein the hologram includes a focusing area configured to separate a light flux that enters the focusing light detection portion, from the light reflected by the data recording face of the optical disk; and wherein the focusing area and the tracking area are defined by the tangential division line.

4. The optical pickup device according to claim 3, further comprising:

a diffraction grating, for diffracting a laser beam emitted by a light source to a second optical disk, and for separating the laser beam to obtain a 0-order light flux or ±1-order light fluxes used by the optical pickup device to perform tracking control;

a second light-receiving sensor, having a second main tracking light detection portion, to receive the 0-order light included in light reflected by a data recording face of the second optical disk, a second sub-tracking light detection portion, to receive one of a +1-order light and a −1-order light, and a third sub-tracking light detection portion, to receive the other light, either a +1-order light or a −1-order light; and a second hologram, having a second tracking area, in which light reflected by the data recording face of the second optical disk is to be separated to obtain a light flux that enters the second main tracking light detection portion, or light fluxes that enter the second sub-tracking light detection portion and the third sub-tracking light detection portion.

5. The optical pickup device according to claim 4, wherein the second optical disk is a CD.

6. The optical pickup device according to claim 4, wherein the second light-receiving sensor includes a second focus light detection portion, for receiving light that is included in light reflected by the data recording face of the second optical disk and that is used for focus control of the optical pickup device; and wherein the second hologram has a second focus area, in which light reflected by the data recording face of the second optical disk is to be separated to obtain a light flux that enters the second focus light detection portion.

7. The optical pickup device according to claim 4, wherein the light-receiving sensor serves as the second light-receiving sensor;

wherein the main tracking light detection portion of the light-receiving sensor serves as the second main tracking light detection portion of the second light-receiving sensor; and wherein the sub-tracking light detection portion of the light-receiving sensor also serves as the second sub-tracking light detection portion of the second light-receiving sensor.

8. The optical pickup device according to claim 7, wherein, when data recording or data reproduction is performed by condensing a laser beam at a predetermined data recording face of an optical disk that has a data recording face formed of a plurality of layers, and when light reflected by a portion other than the predetermined data recording face passes through a specific portion in a tracking area located in the center of the hologram in the radial direction, the light thereafter enters the second main tracking light detection portion; and wherein, when the light passes through another portion in the tracking area, the light enters either the second sub-tracking light detection portion or the third sub-tracking light detection portion.

9. The optical pickup device according to claim 8, wherein, when data recording or data reproduction is performed by condensing a laser beam at a predetermined data recording face of an optical disk that has a data recording face formed of a plurality of layers, and when light reflected by a portion other than the predetermined data recording face passes through the main tracking area that is nearest the center of the hologram in the radial direction and that is second nearest the center in the tangential direction, the light thereafter enters the center of the third sub-tracking light detection portion in the tangential direction.

10. The optical pickup device according to claim 7, wherein, when data recording or data reproduction is performed by condensing a laser beam at a predetermined data recording face of an optical disk that has a data recording face formed of a plurality of layers, and when light reflected by a portion other than the predetermined data recording face is received by the second main tracking light detection portion and by the second and the third sub-tracking light detection portions, a ratio of a quantity of light for the second main tracking light detection portion to the sum of quantities of light for the second and third sub-tracking light detection portions is fixed.

11. The optical pickup device according to claim 1, wherein the tracking area is located in the center in the radial direction of the hologram.

12. The optical pickup device according to claim 11, wherein, when data recording or data reproduction is performed by condensing a laser beam at a predetermined data recording face of an optical disk that has a data recording face formed of a plurality of layers, a predetermined light reflected by a portion, other than the predetermined data recording face, enters the main tracking light detection portion when the predetermined light passes through a specific area in the tracking area, or the predetermined light enters the sub-tracking light detection portion when the predetermined light passes through another area in the tracking area.

13. The optical pickup device according to claim 11, wherein the tracking area in which, when data recording or data reproduction is performed by condensing a laser beam at a predetermined data recording face of an optical disk that has a data recording face formed of a plurality of layers, light reflected by the predetermined data recording face enters the main tracking light detection portion is provided in a peripheral portion of the hologram, in the radial direction.

14. The optical pickup device according to claim 13, wherein, when data recording or data reproduction is performed by condensing a laser beam at a predetermined data recording face of an optical disk for which that the data recording face is formed of a plurality of layers, light reflected by a portion other than the predetermined data recording face enters an area, of the main tracking light detection portion, that is provided in a peripheral portion of the hologram in the radial direction, outside the light detection portions of the light receiving sensor.

15. The optical pickup device according to claim 11, wherein, when data recording or data reproduction is performed by condensing a laser beam at a predetermined data recording face of an optical disk that has a data recording face formed of a plurality of layers, and when light reflected by a portion other than the predetermined data recording face passes through a main tracking area that is nearest the center of the hologram in the radial direction and that is nearest the center in the tangential direction, the light is guided to the main tracking light detection portion.

16. The optical pickup device according to claim 11, wherein, when data recording or data reproduction is performed by condensing a laser beam at a predetermined data recording face of an optical disk that has a data recording face formed of a plurality of layers, and when light reflected by a portion other than the predetermined data recording face passes through a sub-tracking area that is nearest the center of the hologram in the radial direction and that is nearest the center in the tangential direction, the light is guided to the sub-tracking light detection portion.

17. The optical pickup device according to claim 11, wherein the tracking area in which the main tracking area and the sub-tracking area are defined along the tangential division line in the tangential direction is arranged in a peripheral portion of the hologram in the radial direction.

18. The optical pickup device according to claim 1,
wherein the main tracking light detection portion and the sub-tracking light detection portion of the light-receiving sensor are arranged in parallel, in the tangential direction; and
wherein, when data recording or data reproduction is performed by condensing a laser beam at a predetermined data recording face of an optical disk that has a data recording face formed of a plurality of layers, a position at which the light flux separated in the main tracking area enters the main tracking light detection portion is shifted, radially, to a position whereat the light flux separated in the sub-tracking area enters the sub-tracking light detection portion.

19. The optical pickup device according to claim 1, wherein, when data recording or data reproduction is performed by condensing a laser beam at a predetermined data recording face of an optical disk that has a data recording face formed of a plurality of layers, and when light reflected by a portion other than the predetermined data recording face is received on the main tracking light detection portion and the sub-tracking light detection portion, a ratio of a quantity of light for the main tracking light detection portion to that for the sub-tracking light detection portion is fixed.

20. The optical disk apparatus comprising an optical pickup device according to claim 1.

* * * * *